United States Patent [19]

Ozaki et al.

[11] 4,206,981
[45] Jun. 10, 1980

[54] TELECINE PROJECTOR

[75] Inventors: Yoshio Ozaki, Tokyo; Shuichi Ohta, Fujimi, both of Japan

[73] Assignee: Sony Corporation, Tokyo, Japan

[21] Appl. No.: 790,930

[22] Filed: Apr. 26, 1977

[30] Foreign Application Priority Data

Apr. 30, 1976 [JP] Japan .................................. 51-49717

[51] Int. Cl.² ............................................ G03B 31/00
[52] U.S. Cl. ..................................... 352/14; 352/194; 352/159
[58] Field of Search ................... 352/14, 173, 180, 72, 352/157, 194, 159

[56] References Cited

U.S. PATENT DOCUMENTS

| | | | |
|---|---|---|---|
| 1,912,892 | 6/1933 | Eitzen | 352/14 |
| 2,712,771 | 7/1955 | Isom | 352/194 |
| 2,834,832 | 5/1958 | Somers | 352/191 |
| 2,906,584 | 9/1959 | Hammer et al. | 352/14 |
| 2,982,172 | 5/1961 | Berkenhoff | 352/14 |
| 3,224,828 | 12/1965 | Chytil | 352/159 |
| 3,244,469 | 4/1966 | Hennessey et al. | 352/14 |
| 3,428,395 | 2/1969 | Mitchell | 352/194 |
| 3,439,981 | 4/1969 | Nemeth | 352/194 |
| 3,481,662 | 12/1969 | Procop | 352/194 |
| 3,545,852 | 12/1970 | Winkler | 352/173 |
| 3,565,521 | 2/1971 | Butler | 352/180 |
| 3,597,056 | 8/1971 | Sasaki | 352/14 |
| 3,672,751 | 6/1972 | Martin | 352/180 |
| 3,836,239 | 9/1974 | Bunoschuh et al. | 352/157 |
| 3,870,406 | 3/1975 | Nebbia | 352/159 |
| 3,938,885 | 2/1976 | Scholz | 352/14 |
| 3,969,021 | 7/1976 | Bode | 352/14 |
| 4,105,306 | 8/1978 | Utsumi | 352/14 |

FOREIGN PATENT DOCUMENTS

2234602 1/1974 Fed. Rep. of Germany ............. 352/14

Primary Examiner—Monroe H. Hayes
Attorney, Agent, or Firm—Lewis H. Eslinger; Alvin Sinderbrand

[57] ABSTRACT

A telecine projector includes film supply and take-up means; a film constant-speed drive means for advancing the film at an arbitrary predetermined constant speed past a magnetic transducer; a shutter for intermittently illuminating the film at a predetermined constant rate; intermittent film advancing means for advancing the film past the shutter; a film slack detecting means for detecting whether slack in the film between the film advancing means and the film constant drive means exceeds a predetermined amount; and control means for controlling the advancing operation of the film advancing means in accordance with the output of the film slack detecting means. The film can be intermittently advanced in accordance with a film running speed which is arbitrarily predetermined while the shutter operates at the video field frequency. Fast motion reproduction and slow motion reproduction are possible. A guide is provided to prevent the film slack detecting means from falsely indicating an excess of slack upon the occurrence of a splice in the film.

7 Claims, 74 Drawing Figures

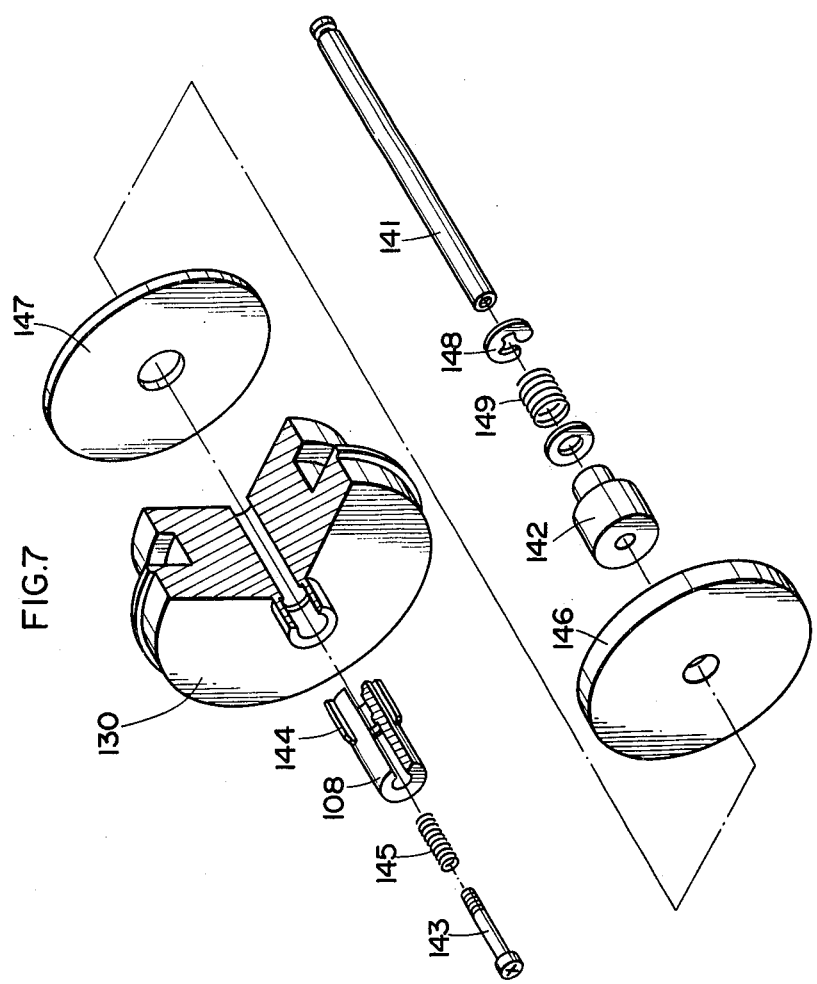

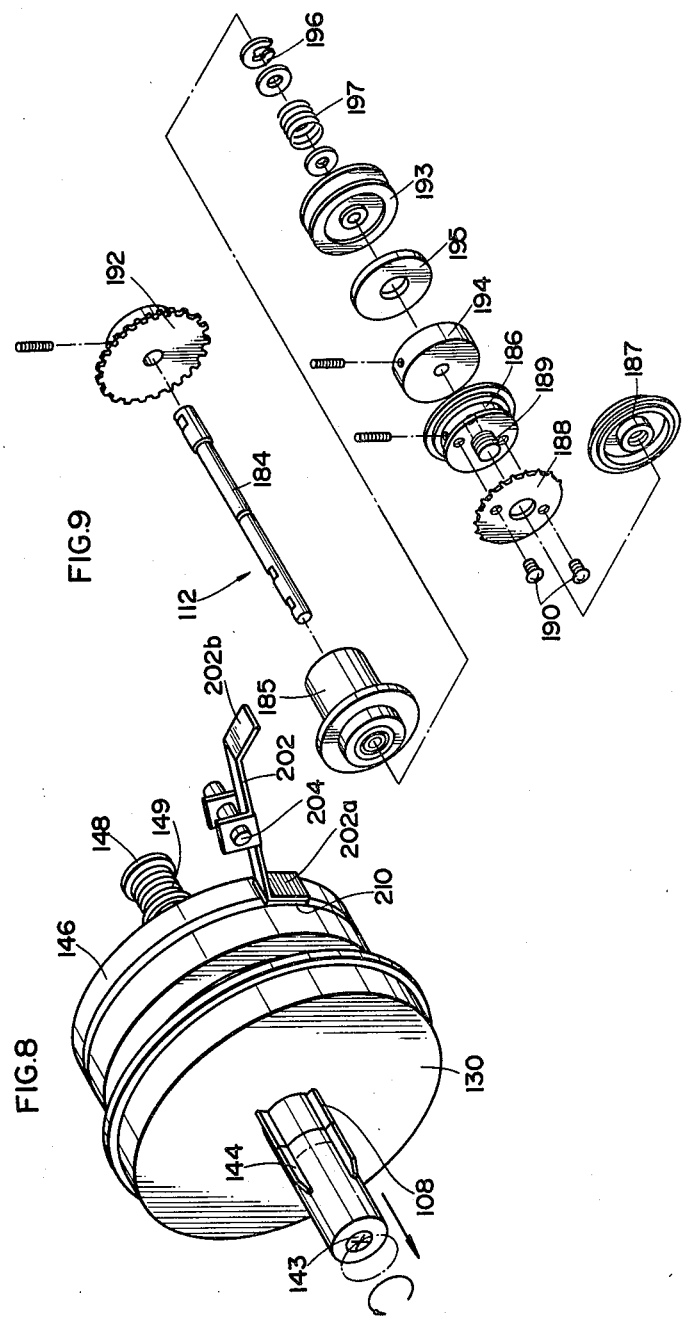

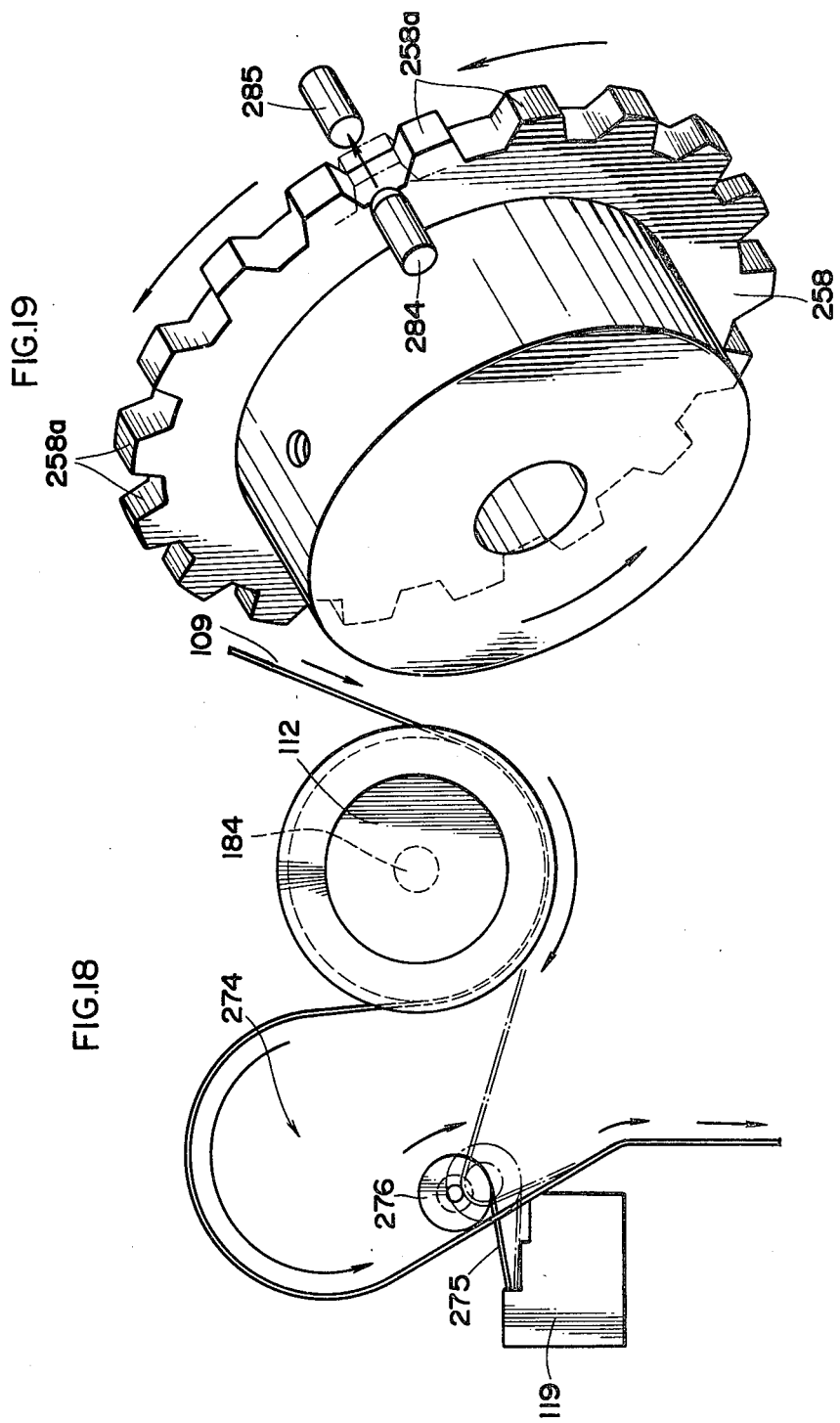

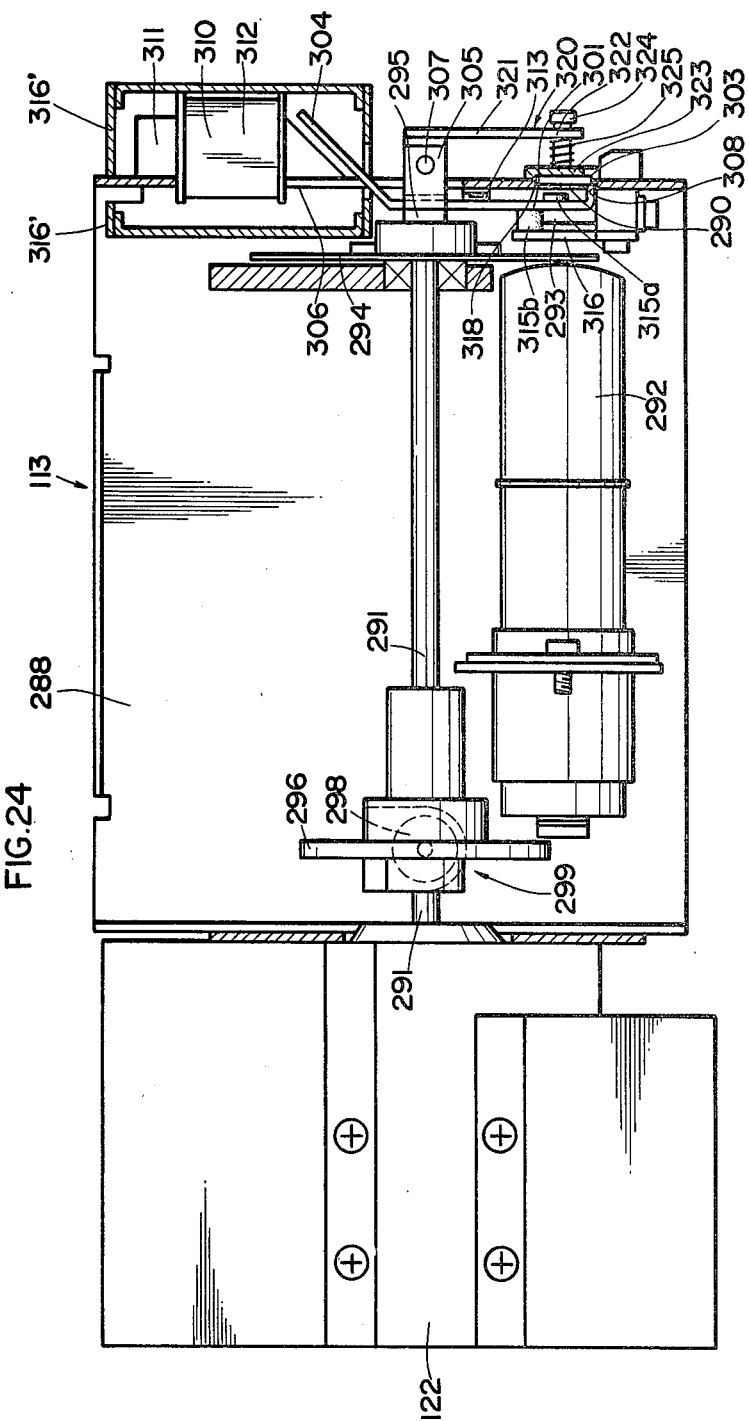

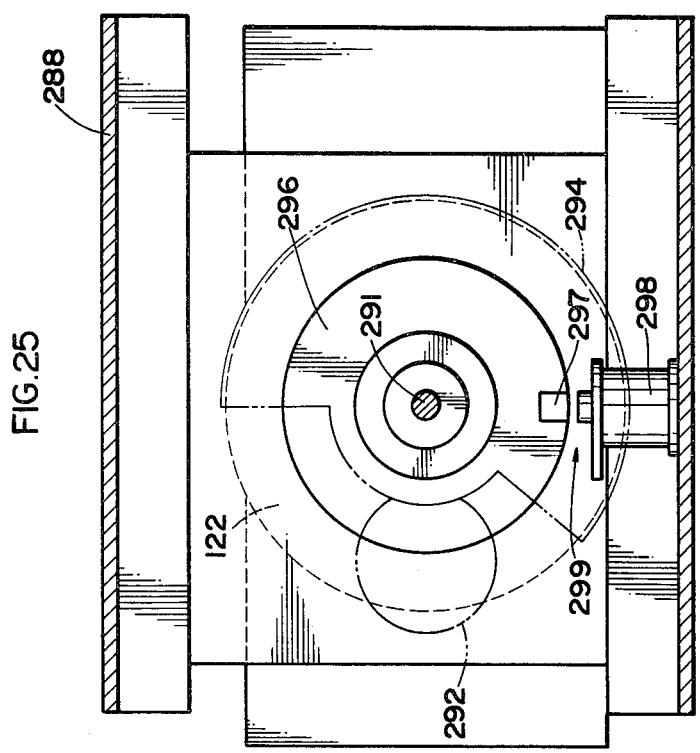

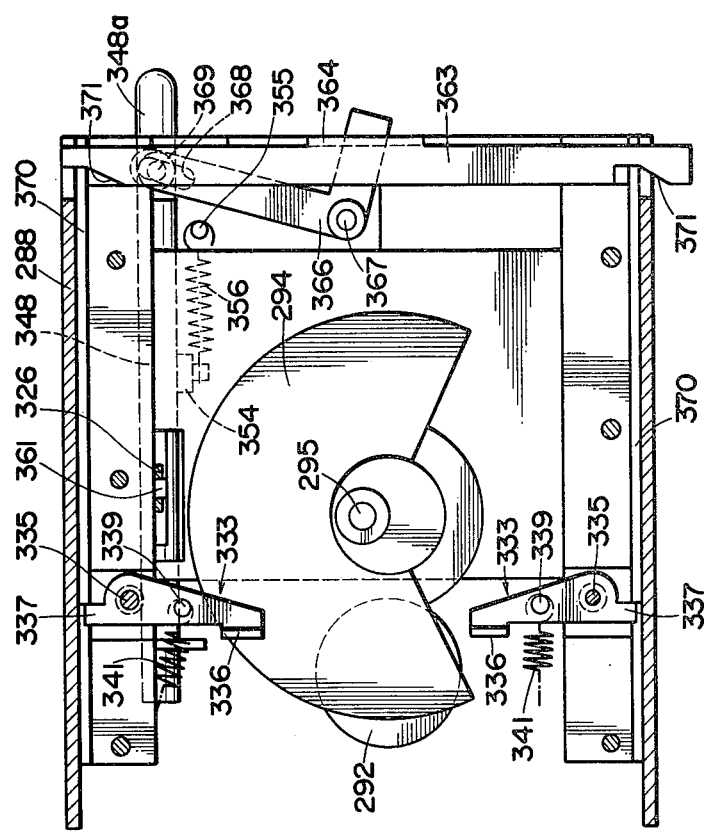

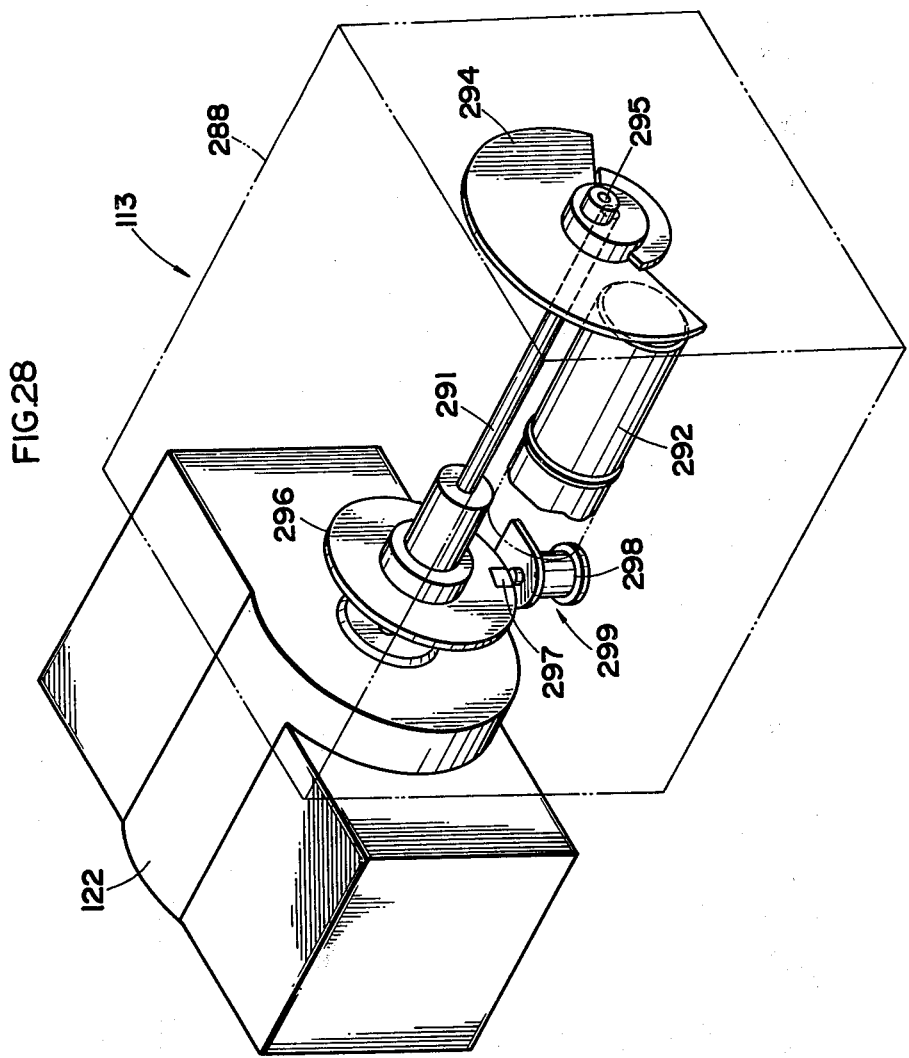

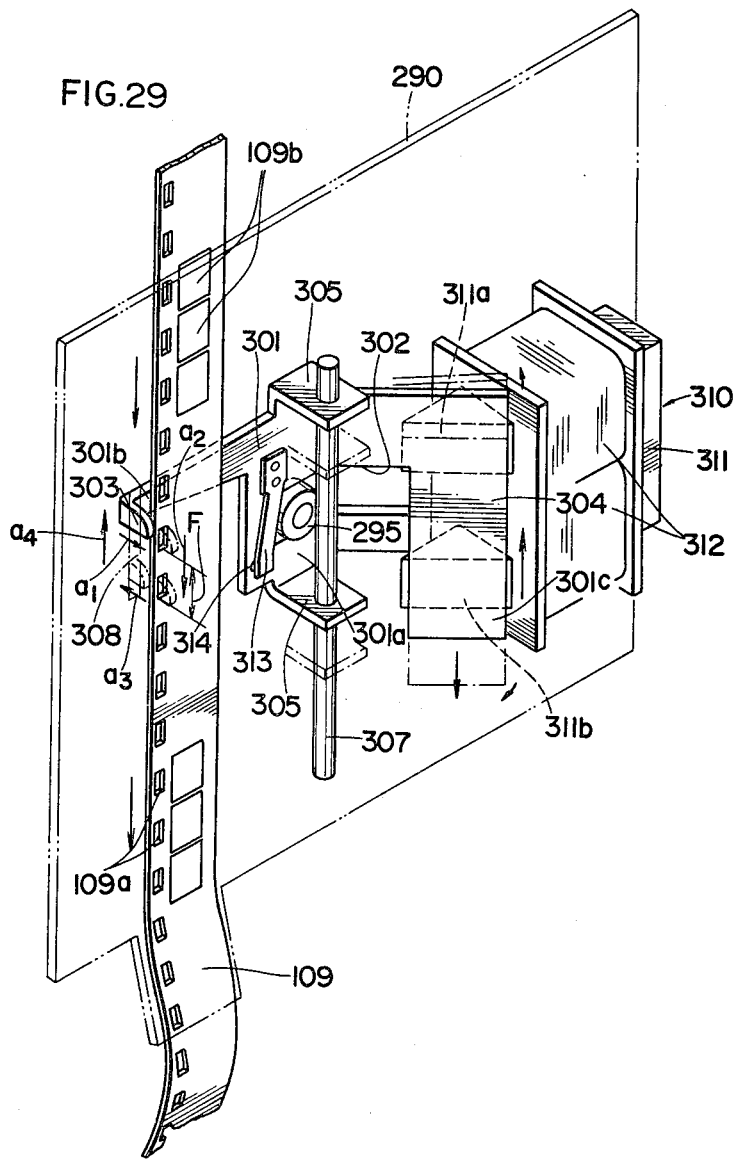

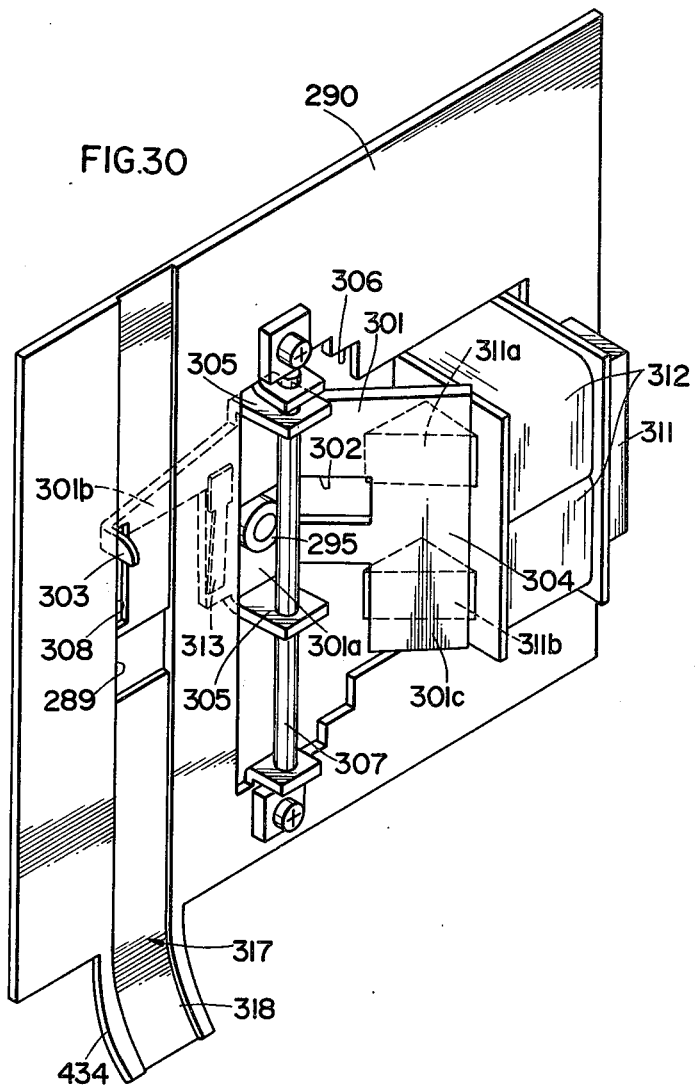

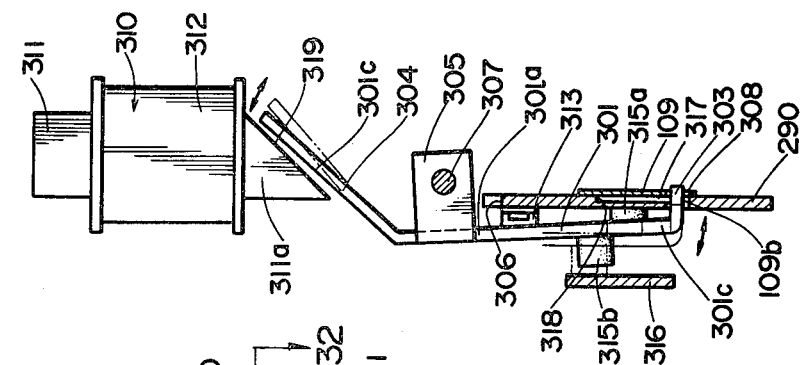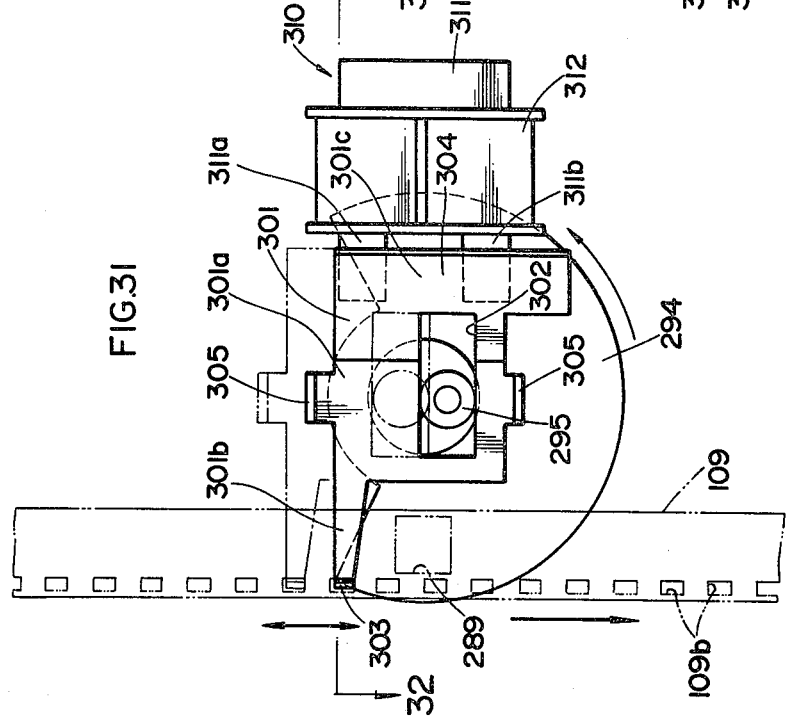

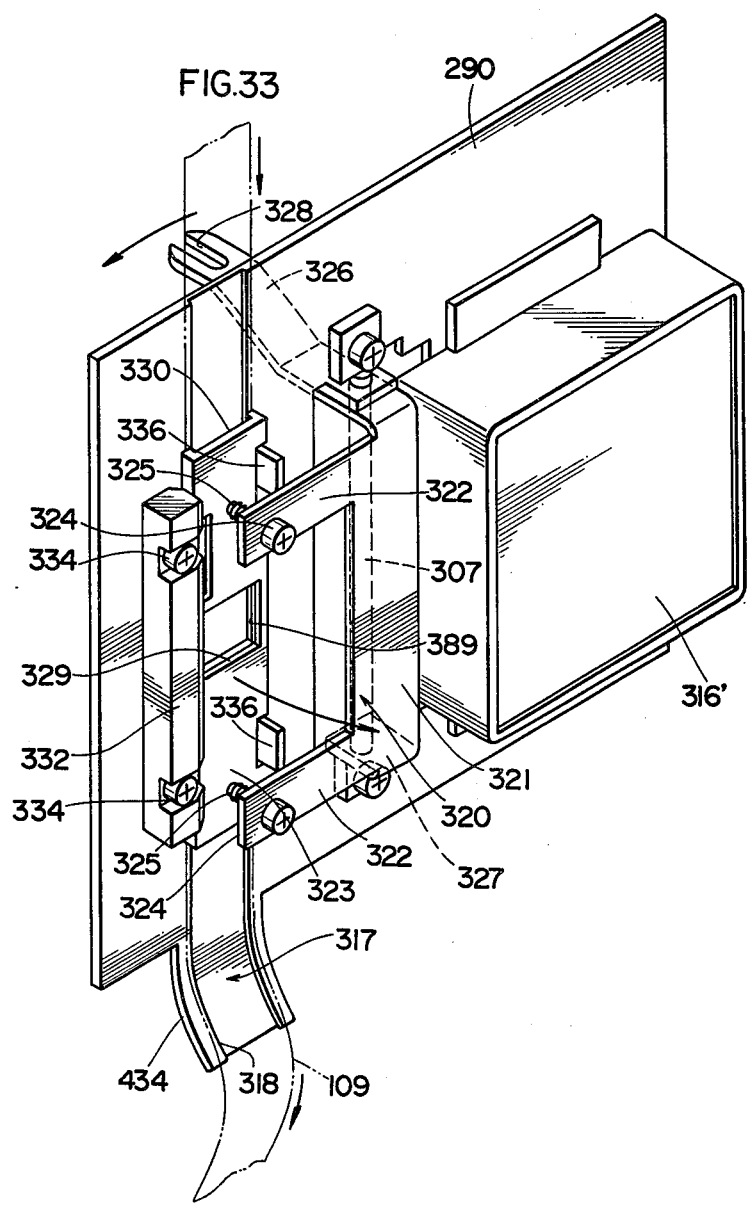

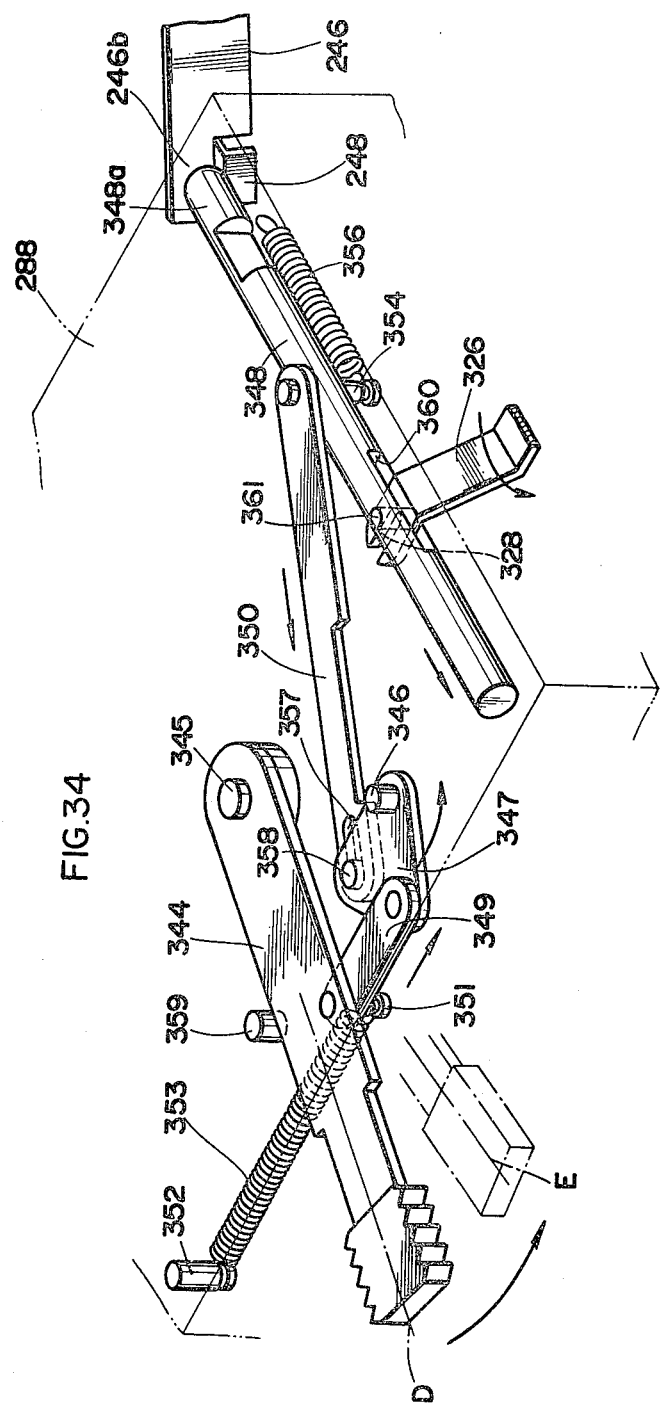

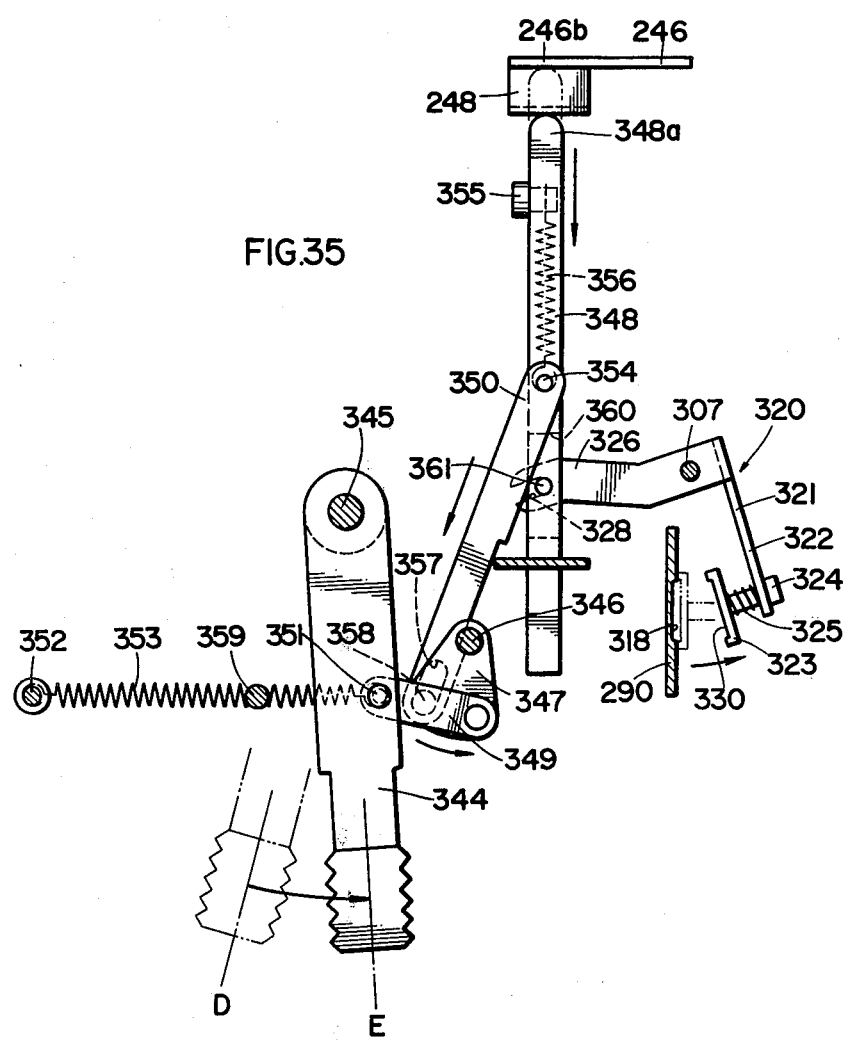

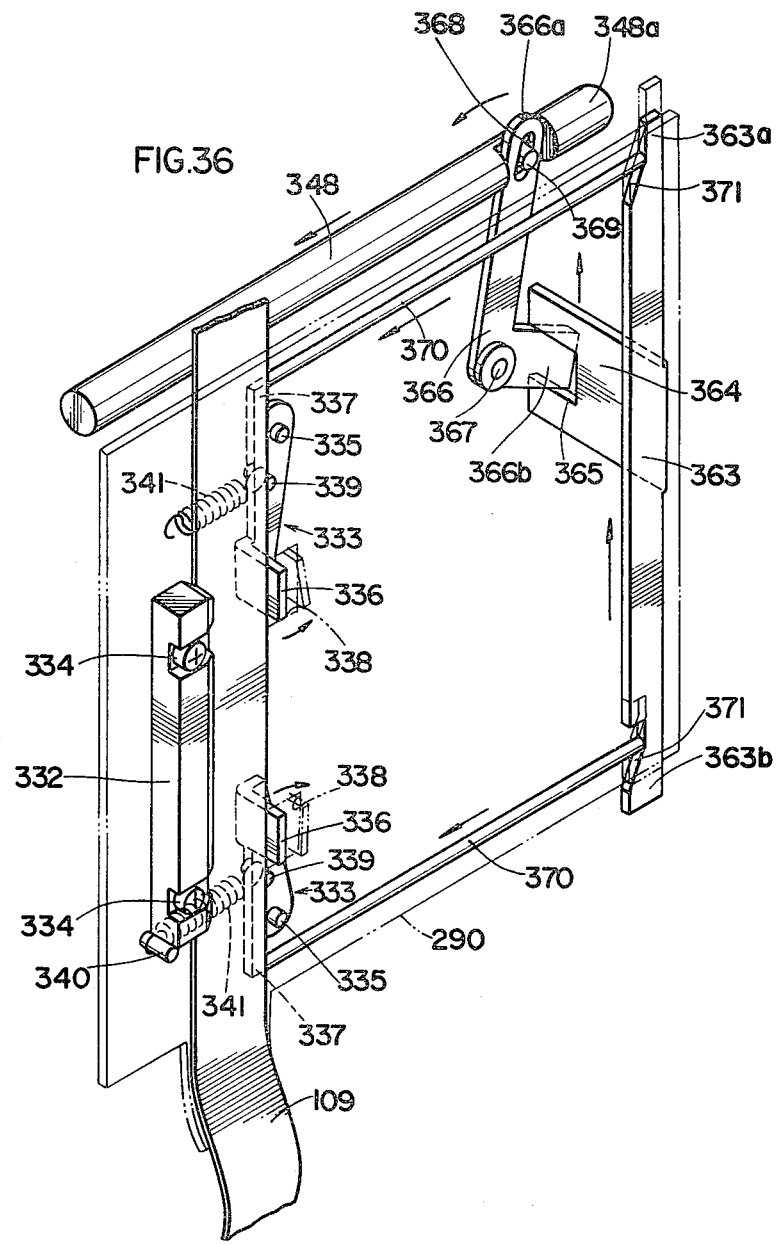

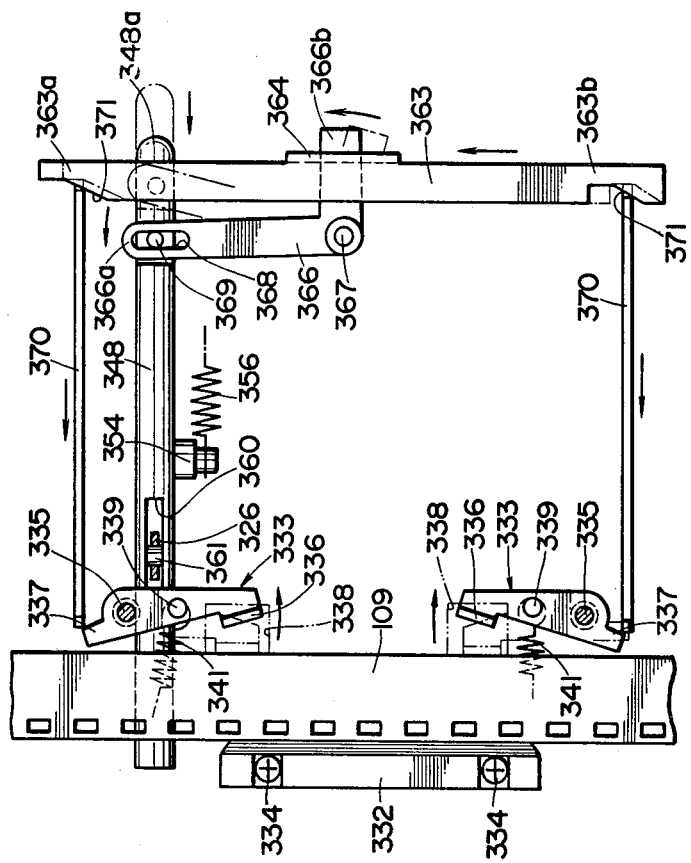

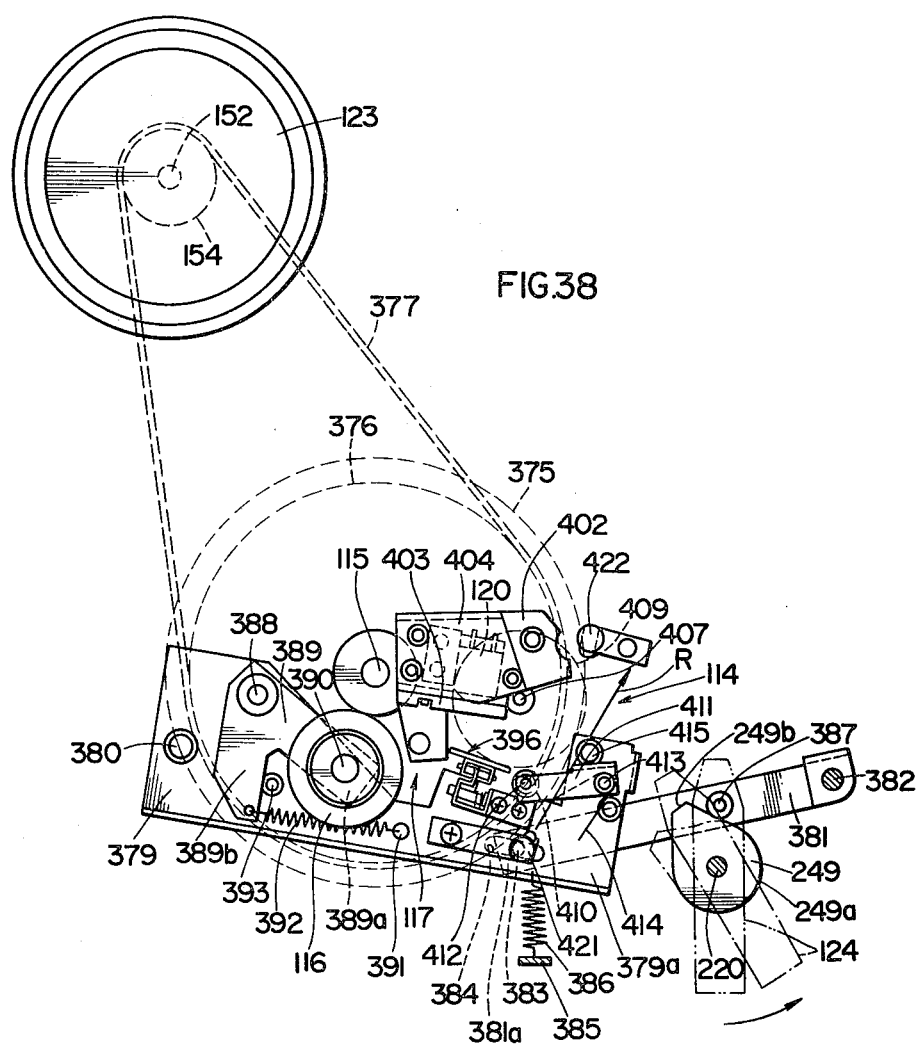

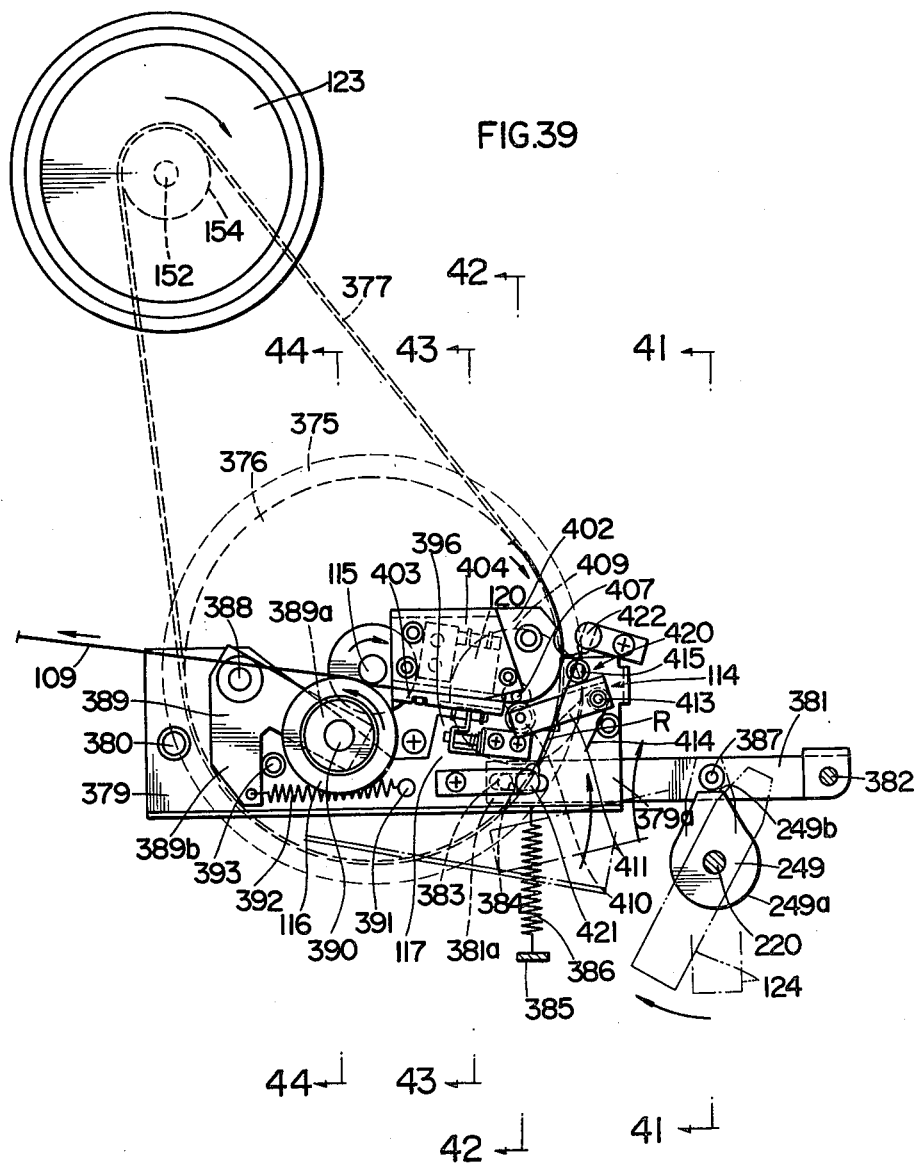

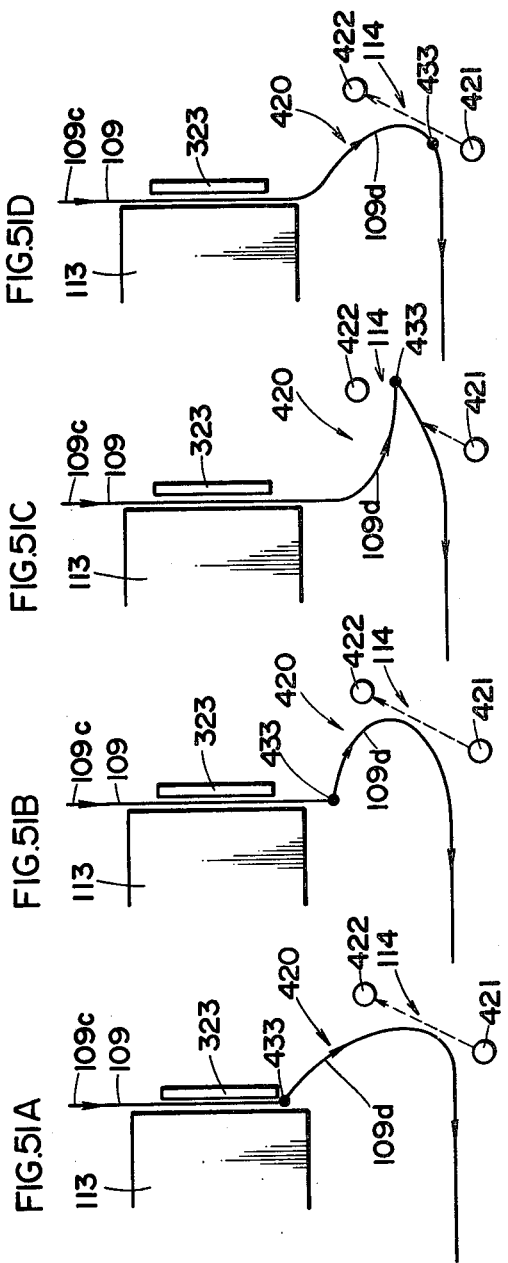

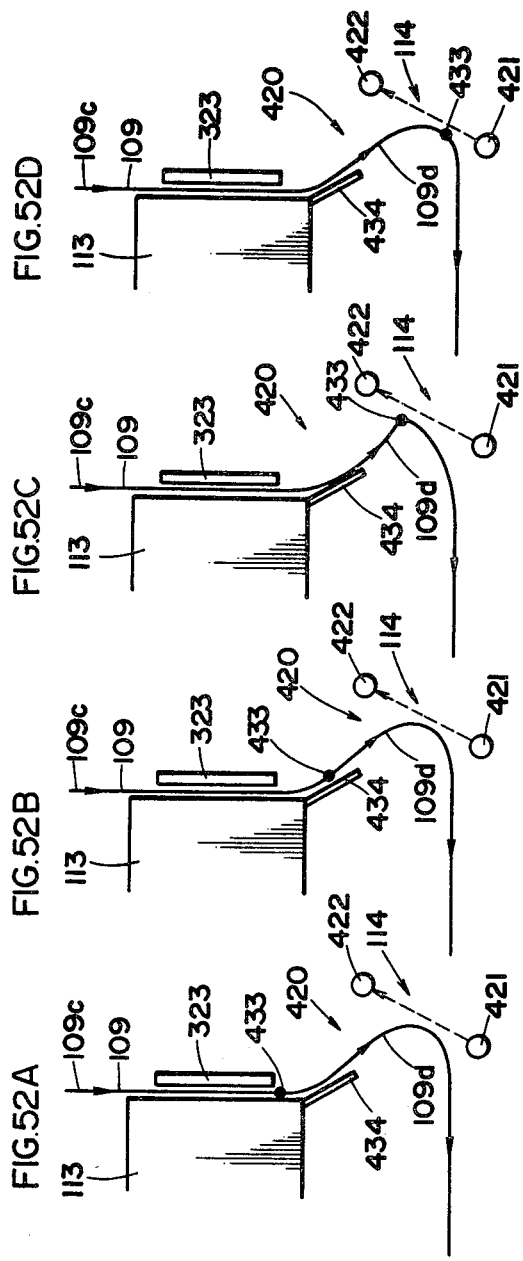

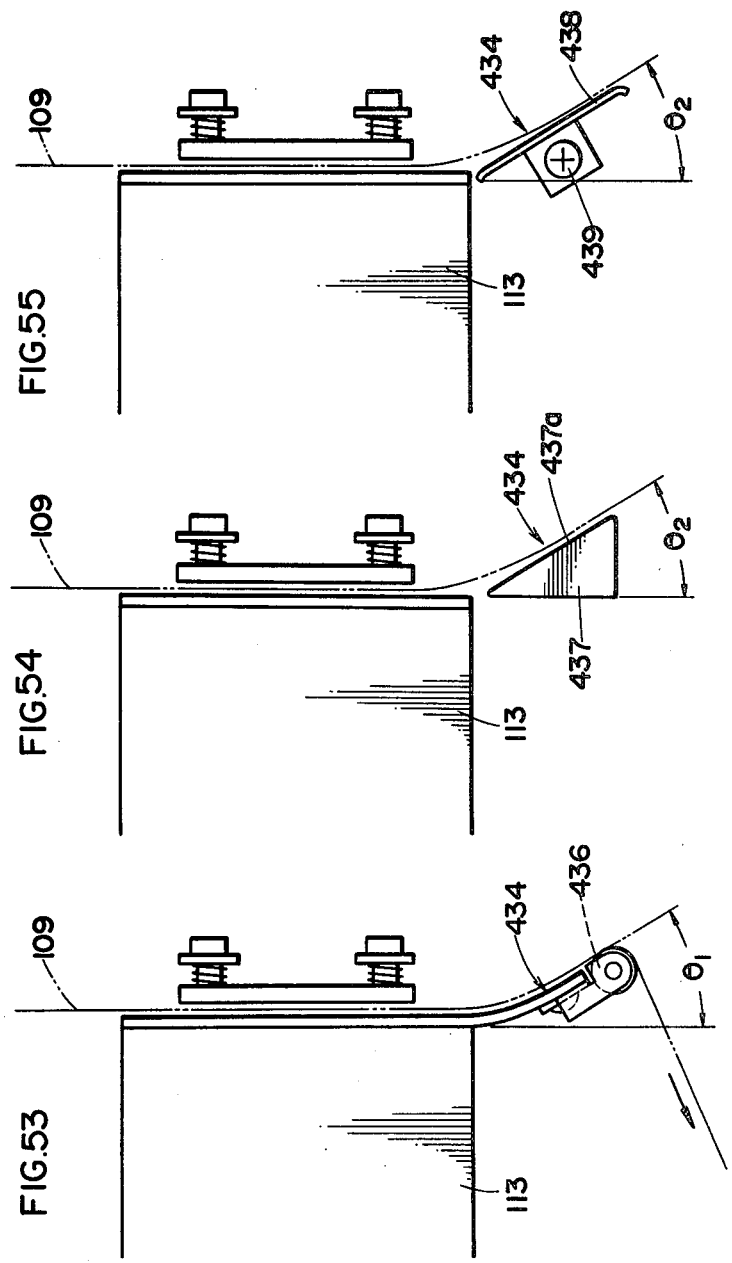

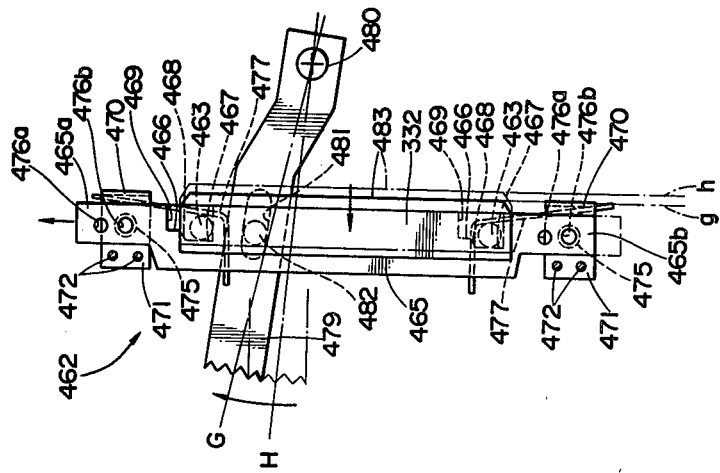
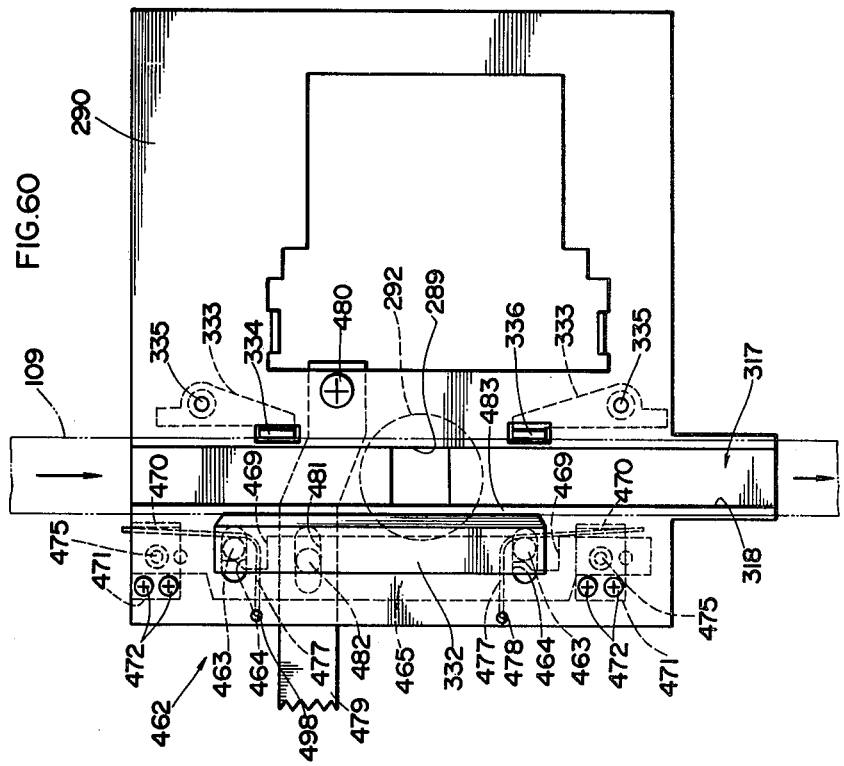

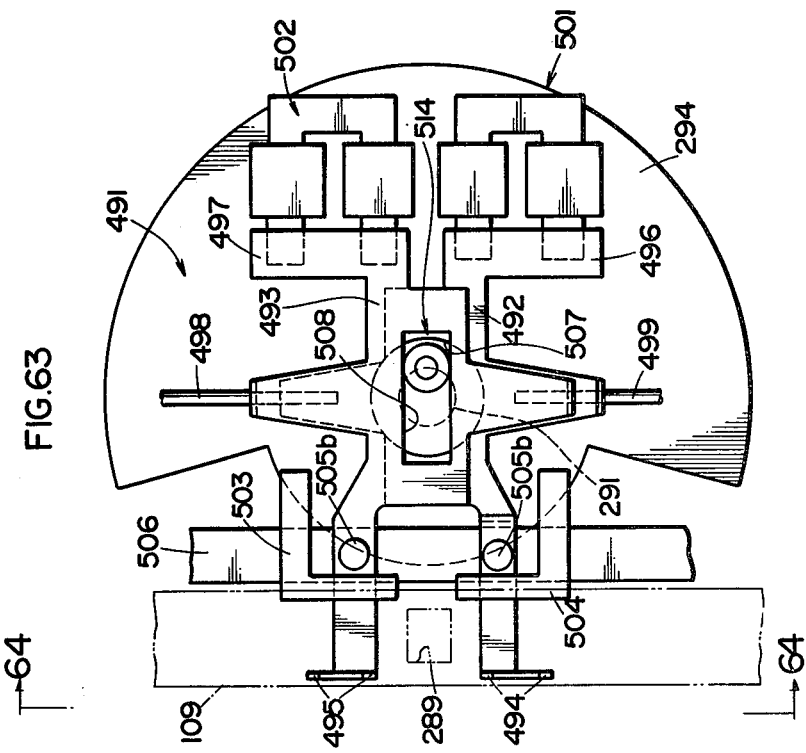
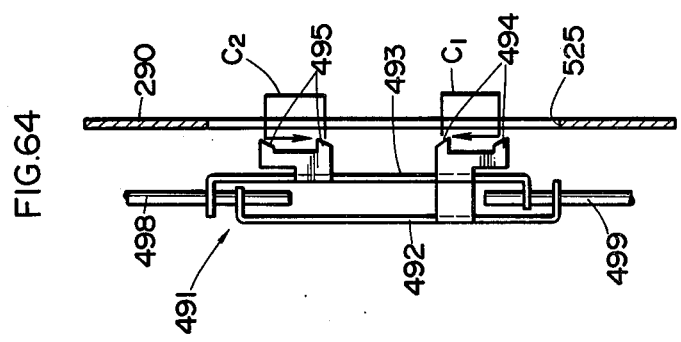

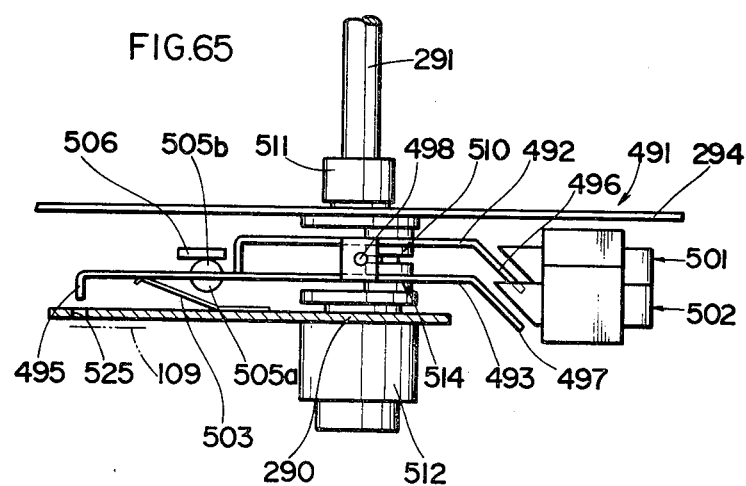
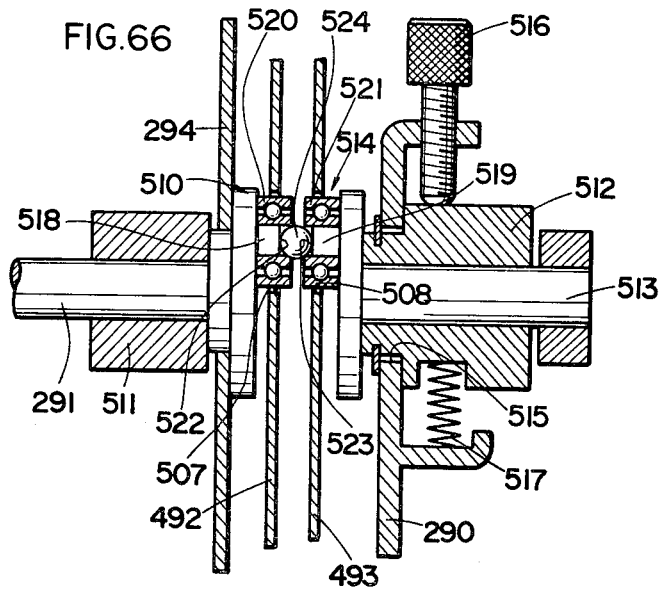

TELECINE PROJECTOR

BACKGROUND OF THE INVENTION

1. Field of the Invention

This invention relates to a motion picture projector, and more particularly to a telecine projector by which a film can be advanced at an arbitrary preselected speed and projected at a speed corresponding to the video field rate.

2. Description of the Prior Art

Generally, the film advance rates of a cinema film and an 8 mm-film are 24 frames per second or 18 frames per second. A field frequency of a television signal is sixty fields per second for the NTSC system, and fifty fields per second for the SECAM or PAL system.

A so-called "telecine projector" is required for reproducing the picture of the cinema film or 8 mm film on the screen of a television receiver.

Classifying roughly, there are an intermittent type and a continuous type of telecine projector. For example, a so-called ⅔ pull-down method telecine projector of the intermittent type is widely used in conjunction with the NTSC system. In the ⅔ pull-down method, one film-frame is advanced and held for two television fields and then the next frame is advanced and held for three television fields. It is in principle impossible to effect fast motion reproduction or slow motion reproduction or to use film at a rate other than 24 frames per second. Therefore, a telecine projector of the continuous type is used for the fast motion reproduction and the slow-motion reproduction.

There are a rotary mirror and a rotary prism types of the telecine projector of the continuous type. In both types, the picture on the running film is supplied to a television camera as a still picture which is converted to a television signal. Fast motion reproduction or slow-motion reproduction can be effected by changing the film running speed.

However, the rotary mirror type and the rotary prism type have the disadvantage of wow in the film running and of picture distortion due to the fluctuation of the film advance pitch. The picture becomes distorted due to the inacurracy of the rotary prism in the rotary prism type. Moreover, the color of the picture becomes deteriorated due to the dispersive property of the prism disposed in the optical system. The projector of the rotary mirror type is complicated in construction. Moreover, the rotary mirror type projector has the same disadvantage as the projector of the rotary prism type in picture distortion.

OBJECTS AND SUMMARY OF THE INVENTION

Accordingly, it is one object of this invention to provide a projector in which a film can be intermittently advanced in accordance with a film running speed which is arbitrarily predetermined.

Another object of this invention is to provide a projector in which audio signals can be well reproduced without fluttering noise.

A further object of this invention is to provide a projector in which the film running speed can be exactly controlled.

A still further object of this invention is to provide a projector of simple construction in which a film advancing means can be exactly controlled.

A still further object of this invention is to provide a projector in which a film advancing means can be smoothly operated without a large loading force.

A still further object of this invention is to provide a projector in which a film supply sprocket is aided in rotation, and thereby the film can be surely supplied to the film advancing means.

A still further object of this invention is to provide a projector in which unexpected damage the film in the film running path is prevented.

A still further object of this invention is to provide a projector in which misoperation of the film slack detecting means can be prevented in the film slacking portion.

A still further object of this invention is to provide a projector in which the film running mode can be securely changed over from the FWD mode to the REW mode.

A still further object of this invention is to provide a projector in which the film can be advanced in either the forward and backward directions.

A still further object of this invention is to provide a projector in which the film frame can be exactly registered with the aperture both when the film is advanced in the forward direction and when the film is advanced in the backward direction.

In accordance with an aspect of this invention, a telecine projector includes film supply and take-up means, film constant-speed drive means for advancing the film at an arbitrary predetermined constant speed, a shutter for permitting intermittent illumination of the film at a predetermined constant rate, intermittent film advancing means operatively linked to the shutter for advancing the film past the shutter during the intervals between the intermittent illuminations, film slack detecting means for detecting slack in a loop of film formed between the constant-speed drive means and the intermittent film advancing means, and control means selectively enabling and disabling the intermittent film advancing means depending on whether the slack in the loop of film exceeds a predetermined amount. While the shutter operates at the video field rate (50 or 60 per second) and the film constant-speed drive means advances the film at, for instance, 24 frames per second, the intermittent film advancing means is controlled by the detected amount of slack so as to advance the film past the shutter at substantially the same average rate of speed as the film constant-speed drive means. The projector can include a guide member to assist in forming the loop of film so that an irregularity, such as a splice, in the film will not cause misoperation of the intermittent film advancing means. The projector can also include an urgent stop switch between the film supply means and the intermittent film advancing means for disabling the latter whenever the tension in the film between the film supply means and the intermittent film advancing means exceeds a predetermined amount. The film slack detecting means preferably includes a photo emitter and photo detector for detecting whether the loop of film between the intermittent film advancing means and the film constant-speed drive means intercepts a beam of light. The photo detector can be movably mounted with a capstan and pinch roller of the film constant-speed drive means so that upon the selection of a rewind mode a portion of the film slack detecting means will be displaced when the capstan and pinch roller seperate, and the film slack detecting means is rendered inoperative.

The above and other objects, features and advantages of this invention will be apparent in the following detailed description of illustrative embodiments which are to be read in connection with the accompanying drawings.

BRIEF DESCRIPTION OF THE DRAWINGS

FIG. 7 is an exploded perspective view of a reel shaft part in the telecine projector;

FIG. 8 is a perspective view of a reel mount part in the telecine projector;

FIG. 9 is an exploded perspective view of a film supply sprocket part in the telecine projector;

FIG. 18 is a front view of a film urgent stop switch in the telecine projector;

FIG. 19 is an enlarged perspective view of a ladder wheel in the telecine projector;

FIG. 24 is a cross-sectional view taken along the line 24—24 of FIG. 21;

FIG. 25 is a cross-sectional view taken along the line 25—25 of FIG. 21;

FIG. 26 is a cross-sectional view taken along the line 26—26 of FIG. 21;

FIG. 28 is a perspective view of an electric motor part in the film advancing apparatus;

FIG. 29 and FIG. 30 are perspective views of a shuttle drive mechanism in the film advancing apparatus;

FIG. 31 is a front view showing the relationship between the shuttle and the film in the film advancing apparatus;

FIG. 32 is a cross-sectional view taken along the line 32—32 of FIG. 31;

FIG. 33 is a perspective view of a film pushing device in the film advancing apparatus;

FIG. 34 is a perspective view of a film gate operating mechanism;

FIG. 35 is a plan view of the film gate operating mechanism;

FIG. 36 is a perspective view of a film side pushing member in the film advancing apparatus;

FIG. 37 is a front view of the film side pushing member;

FIG. 38 and FIG. 39 are front views of a film constant drive mechanism in the telecine projector;

FIG. 51A to FIG. 51D are schematic side views illustrating a possible misoperation of the film slack detecting device;

FIG. 52A to FIG. 52D are schematic side views illustrating the operation of the film slack detecting device according to one embodiment of this invention'

FIG. 53 to FIG. 55 are side views of various modifications of film guide members in the film slacking portion of the telecine projector;

FIG. 60 is a front view of a film format change-over apparatus;

FIG. 61 is a front view illustrating the method for adjustment of a film side guide in the film format change-over apparatus;

FIG. 63 is a front view of a modification of the film advancing apparatus;

FIG. 64 is a side view taken along the line 64—64 of FIG. 63;

FIG. 65 is a front view of FIG. 63;

FIG. 66 is an enlarged cross-sectional view of a crank part for advancing the film;

DESCRIPTION OF THE PREFERRED EMBODIMENTS

A telecine projector according to one embodiment of this invention will be described with reference to the drawings, in which an 8 mm or a 16 mm film of the magnetic sound recording type is used.

Figure 1:
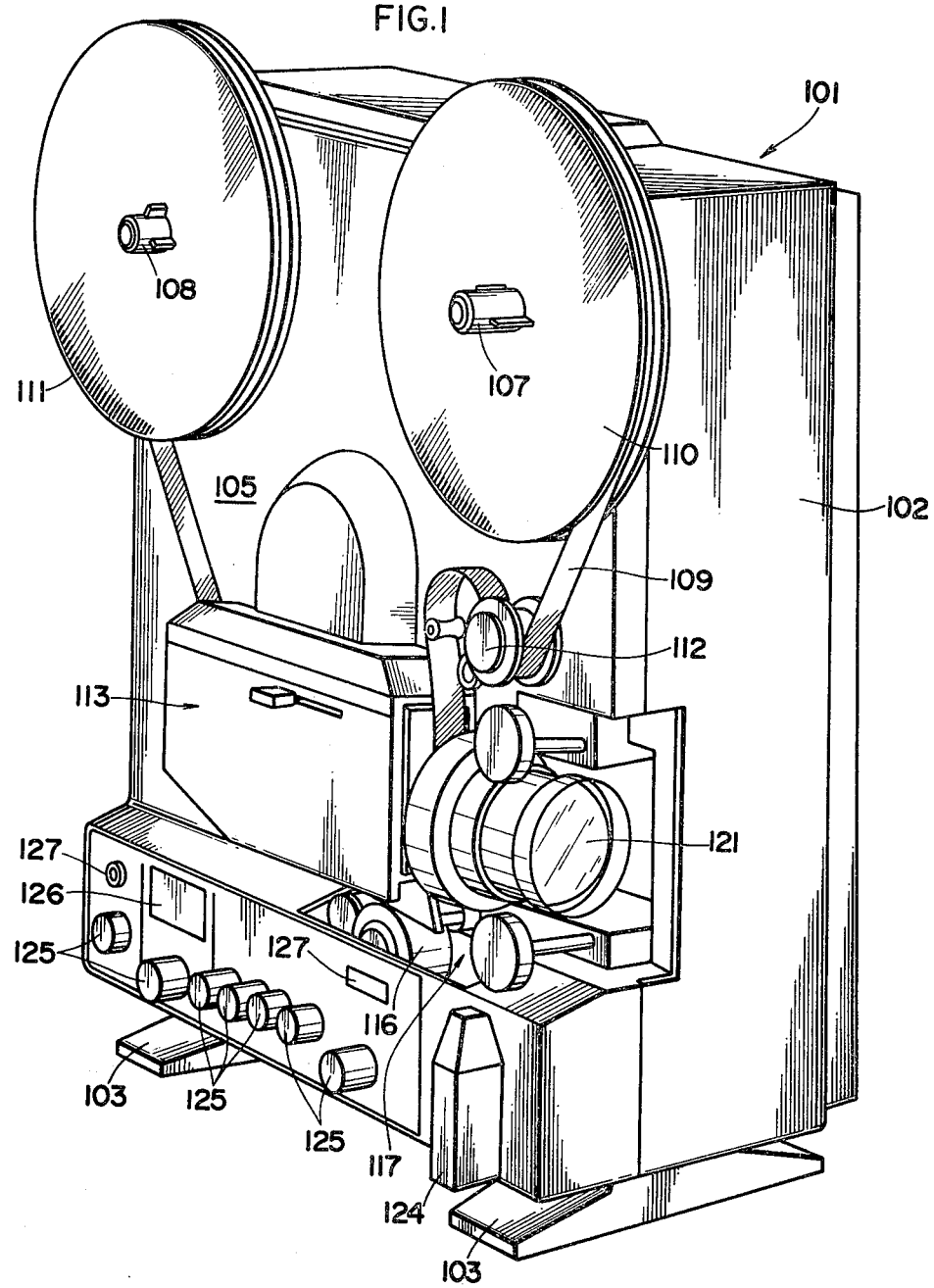
FIG. 1 is a perspective view of the whole of a telecine projector according to one embodiment of this invention.

First, an outline of a telecine projector 101 will be described with reference to FIG. 1 and FIG. 2.

A vertical cabinet 102 is supported by a pair of stands 103. A base plate 104 is mounted in the cabinet 102. A cover 105 is demountably attached to the cabinet 102. Different mechanisms and parts to be described hereafter are all mounted on the base plate 104.

A supply reel shaft 107 and a take-up reel shaft 108 are horizontally supported on the base plate 104 at the upper portion of the base plate 104. The reel shafts 107 and 108 pass through the cover 105. A supply reel 110 and take-up reel 111 and demountably fitted to the reel shafts 107 and 108, respectively. A film 109 is wound on the reels 110 and 111.

On the base plate 104, a supply sprocket 112 is arranged in the film path under the supply reel 110 and engaged with perforations of the film 109 to rotate. A film advancing apparatus 113 for intermittently advancing the film 109 is arranged under the supply sprocket 112. A film-slack detecting device 114 is disposed under the film advancing apparatus 113 so as to detect the slack of the film 109 which may take place with the action of the film advancing apparatus 113. At the left side of the film-slack detecting device 114, a film constant drive mechanism 117 is disposed for running the film 109 at a predetermined speed. The film constant drive mechanism 117 includes a capstan 115 and a pinch roller 116. A rotatable take-up sprocket 118 engaged with perforations of the film 109 is arranged at the left side of the film constant drive mechanism 117 and under the take-up reel 111. A film urgent stop switch 119 is disposed between the supply sprocket 112 and the film advancing apparatus 113. When the film 109 is abnormally tensioned between the supply sprocket 112 and the film advancing apparatus 113, urgent stop switch 119 is actuated and the film running is urgently stopped. A recording/reproducing magnetic head 120 is attached near the film advancing apparatus 117. An optical system 121 is arranged at the right side of the film advancing apparatus 113. An electric motor 122 for the film advancing apparatus 113 is mounted at the left side of the latter. And another electric motor 123 for driving the film 109 is mounted at the central portion of the base plate 104. An actuating knob 124 for change over of the telecine projector 101 into the film forwarding (FWD) mode or the film rewind (REW) mode is attached to the right lower end portion of the cover 105. Different adjusting knobs 125, a meter 126, and an indicating lamp 127 are further arranged in the lower end portion of the cover 105.

Reel mounts 129 and 130 are attached to the reel shafts 107 and 108, respectively and they are alternatively driven through an idler mechanism 131 by the electric motor 123 which further drives the capstan 115. The reel mounts 129 and 130 are correlated with a brake mechanism 132. A ladder chain 133 is wound on the sprockets 112 and 118. Film pushing rollers 134 and 135 are arranged adjacent to the sprockets 112 and 118, and a film guide roller 136 is arranged above the film pushing roller 135.

Figure 2:
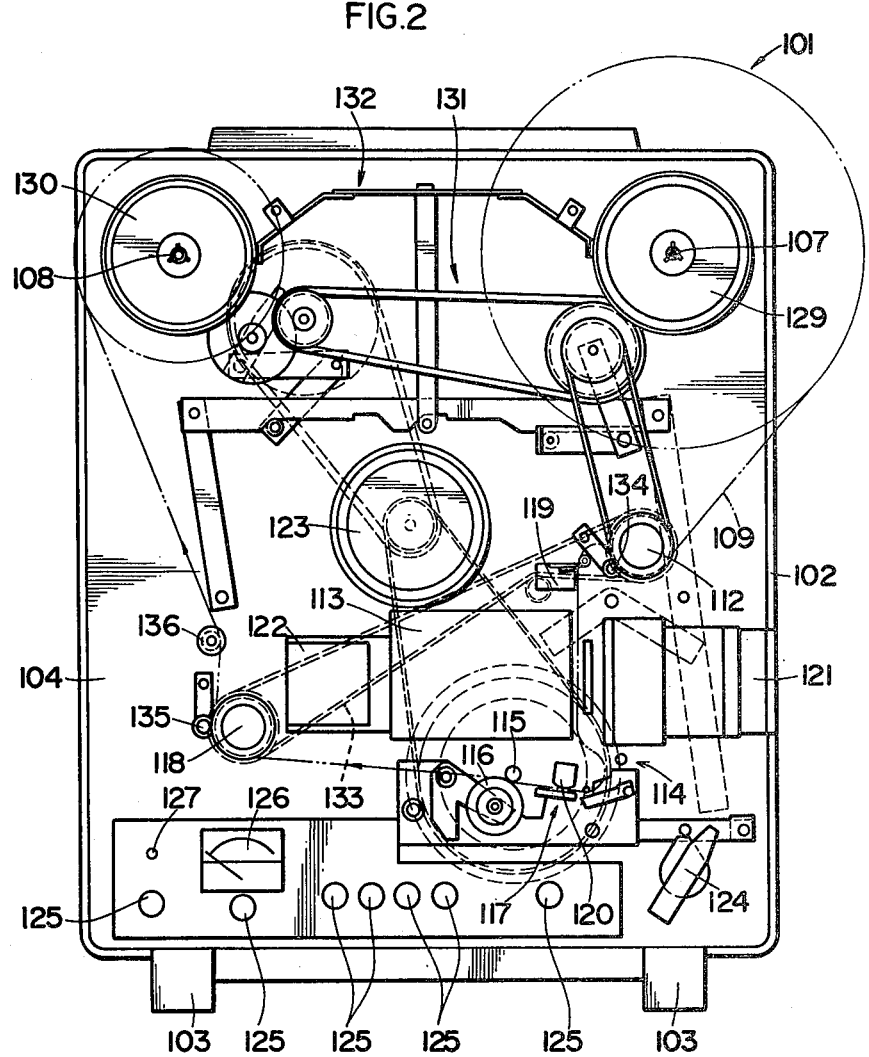
FIG. 2 is a front view of the whole of the telecine projector of FIG. 2, in which a cover is removed.

In the use of the telecine projector 101, the reels 110 and 111 are fitted to the reel shafts 107 and 108, and as shown in FIG. 2, the film 109 is threaded through the supply sprocket 112, the film urgent stop switch 119, the film advancing apparatus 113, the film-slack detecting device 114, the film drive mechanism 117, the take-up sprocket 118 and the guide roller 136, in the film running path.

When the picture on the film 109 is reproduced in a television receiver, electric power is supplied to the telecine projector 101, and then the actuating knob 124 is rotated from the stop position to the FWD position. The motor 122 rotates to drive the film advancing apparatus 113. And the motor 123 rotates to drive the capstan 115, and to drive the take-up reel mount 130 through the idler mechanism 131. The brake mechanism 132 is released.

With the drive of the take-up reel 111, the film 109 is taken up by the take-up reel 111. The take-up sprocket 118 rotates with the film running. The rotational force of the take-up sprocket 118 is transmitted to the supply sprocket 112 through the ladder chain 133. The film 109 is drawn out from the supply reel 110 with the rotation of the supply sprocket 112. Since the sprockets 118 and 112 rotate at the same peripheral speed, the take-up speed of the film 109 is equal to the draw-out speed of the film 109. The film advancing apparatus 113 works to advance the film 109 with the output signal of the film-slack detecting device 114. The film 109 is intermittently advanced at an arbitrary predetermined rate of frame advance which corresponds to any rate between the zero frequency and the television field frequency (fifty or sixty frames per second). The film 109 fed from the film advancing apparatus 113 is transported at the constant speed by the film constant drive mechanism 117, and take up by the take-up reel 111. In the film advancing apparatus 113, the film 109 is illuminated with light from a lamp which is contained in the film advancing apparatus 113. The image obtained by the transmission of light through the film 109 is transmitted through the optical system 121 to a television image pickup tube (not shown). The picture on the frame of the film 109 is reproduced on the screen of the television receiver. On the other hand, audio signals recorded on the film 109 are reproduced by the magnetic head 120, and are transmitted to the television receiver.

The telecine projector 101 is so designed that the film 109 can be rewound as the film 109 remains threaded in the film running path. For the REW operation, the actuating knob 124 is rotated to the REW position. The supply reel mount 129 is driven through the idler mechanism 131 by the electric motor 123. The film 109 runs in the backward direction, and is taken up by the supply reel 110. In the rewind mode, the brake mechanism 132 is released, the film advancing apparatus 113 is rendered inoperative and film guide roller 136 is released from film pushing member 135 and the pinch roller 116 is separated from the capstan 115 in the film constant drive mechanism. The supply sprocket 112 engaged with the film 109 is rotated with the film running. The rotational force of supply sprocket 112 is transmitted through the ladder chain 133 to the take-up sprocket 118. The film 109 is drawn out from the take-up reel 111 with the rotation of the take-up sprocket 118.

When the operation of the telecine projector 101 is ended, the actuator knob 124 is rotated to the STOP position. The motors 123 and 122 stop. The reel mounts 129 and 130 are braked by the brake mechanism 132.

Next, details of the telecine projector 101 will be described. First, referring to FIG. 3 to FIG. 13, the idler mechanism 131 and constructions associated with the idler mechanism 131 will be described.

A preloading mechanism for preventing the hunting of the reel shafts is provided for the reel shafts 107 and 108, respectively. As apparently shown in FIG. 5 and FIG. 7, the reel shafts 107 and 108 are formed integrally with the reel mounts 129 and 130 at the centers of the latter. The reel mounts 129 and 130 are supported by central shafts 141 so as to be rotatable round the central shafts 141 and slidable in the lengthwise directions of the central shafts 141. The central shafts 141 horizontally pass through bearings 142 fixed to the base plate 104, and are rotatable and slidable in the axial directions, respectively. Screws 143 are attached to top ends of the central shafts 141. Reel pushing members 144 are loosely fitted to the screws 143, and urged to the reel shafts 107 and 108 by compression springs 145 disposed in the reel pushing members 144. Rotary discs 146 and frictional discs 147 such as felt discs are loosely fitted to the central shafts 141 between the reel mounts 129, 130 and the bearing 142. A spring receiving member 148 is attached to another end of the central shaft 141. A compression spring 149 for preloading is loosely fitted to the central shaft 141 between the spring receiving member 148 and the bearing 142. Slippage occurs between the reel mounts 129, 130 and the rotary disc 146.

The central shaft 141 is urged rightward (FIG. 5) by the compression spring 149. Accordingly, the reel mounts 129 and 130 are urged rightward (FIG. 5) through the central shaft 141 the compression spring 145, the reel pushing member 144 and the reels 110 and 111 by the compression spring 149. The rotary disc 146 contacts with the bearing 142. The frictional disc 147 is pressed between the rotary disc 146 and the reel mounts 129 and 130. A REW idler and a FWD idler to be described hereafter are pressed to the circumferences of the rotary discs 146 to drive the latter, respectively. The rotary discs 146 in turn drive frictionally the reel mounts 129 and 130 through the frictional discs 147. In the rotation, a frictional force or preloading force determined by the compression spring 149 is applied to the reel shafts 107 and 108. Accordingly, in the forward running of the film 109 or in the backward running (REW mode) of the film 109, the film 109 is drawn out from the supply reel 110 or the take-up reel 111 against the preloading force. Thus, the hunting when the film is drawn out, can be prevented.

Figure 5:
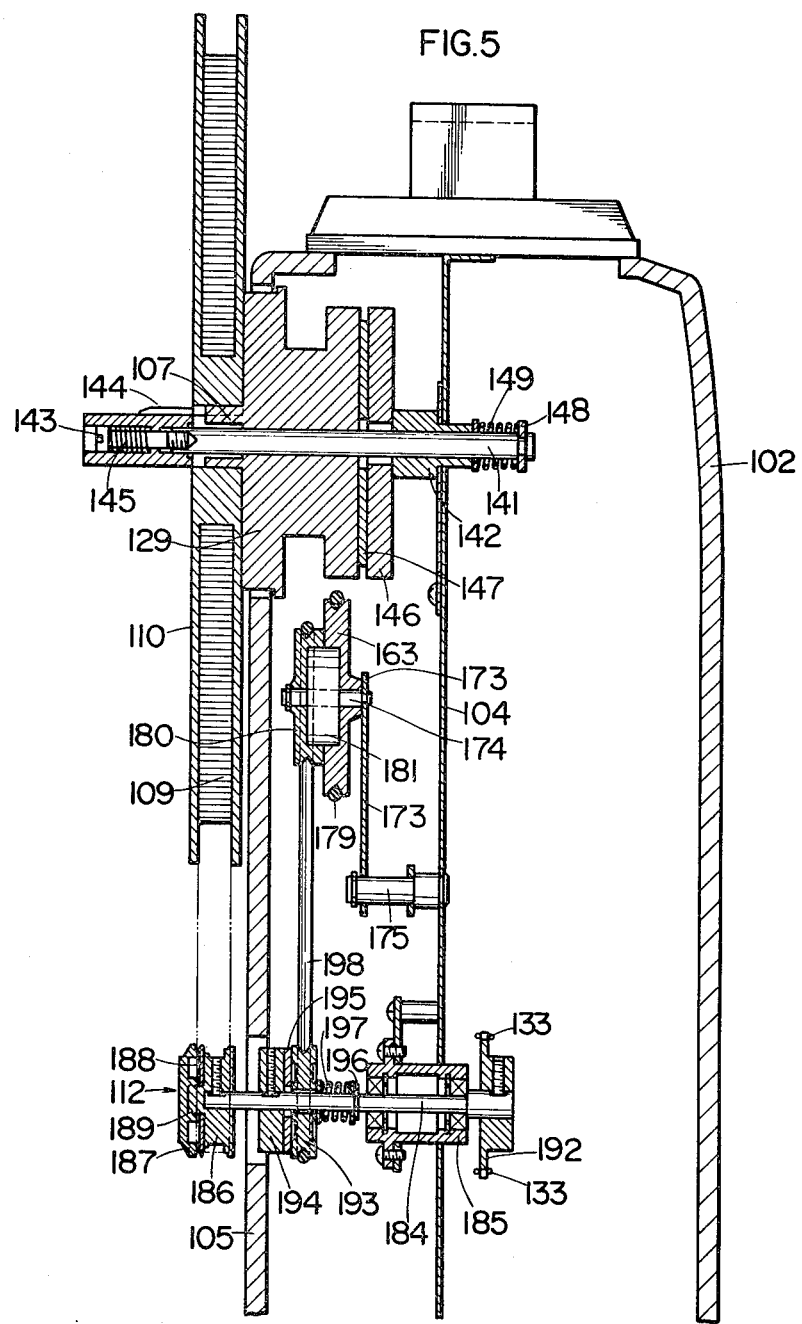
FIG. 5 is a cross-sectional view taken along the line 5—5 of FIG. 4.
Figure 6:
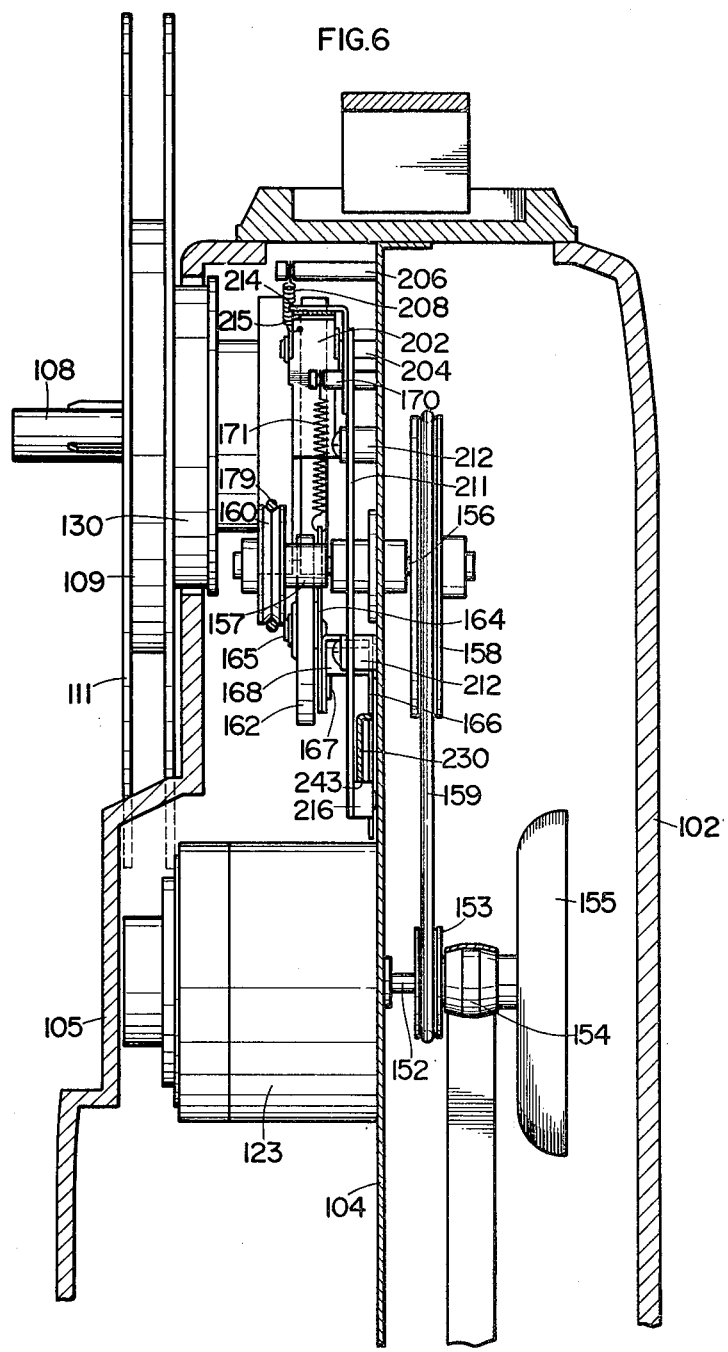
FIG. 6 is a cross-sectional view taken along the line 6—6 of FIG. 4.

As shown in FIG. 6, pulleys 153 and 154 are fixed to a shaft 152 of the motor 123, and a cooling fan 155 is fixed to the top end of the shaft 152. Near the take-up mount 130, an intermediate idler 157 is rotatably supported by a support shaft 156, and faces to the circumference of the rotary disc 146. A pulley 158 is fixed to one end of the support shaft 156. A belt 159 is wound on the pulleys 153 and 158. Another pulley 160 is fixed to another end of the support shaft 156. A FWD idler 162 is arranged between the intermediate idler 157 and the take-up reel mount 130. A REW idler 163 is arranged near the supply reel mount 129. The FWD idler 162 is rotatably supported by an idler shaft 165 fixed on a lever 164. One end of the lever 164 is pivoted to a pin 167 fixed to one end 166a of a V-shaped lever 166 which is supported by a support shaft 168 so as to be rotatable relative to the base plate 104. A roller 169 for cam follower is supported on another end 166b of the V-shaped lever 166. The lever 164 is urged upwardly by a tension spring 171 extended between another end of the lever 164 and a spring receiving pin 170 fixed to the base plate 104. On the other hand, the REW idler 163 is rotatably supported by a pin 174 fixed to one end 173a of another V-shaped lever 173 which is supported by a support shaft 175 so as to be rotatably relative to the base plate 104. A roller 176 for cam follower is supported on another end 173b of the V-shaped lever 173. The V-shaped lever 173 is urged in the clockwise direction (FIG. 4) round the support pin 175 by a tension spring 178 extended between another end 173b of the V-shaped lever 173 and a spring receiving pin 177 fixed to the base plate 104. The REW idler 163 functions also as a pulley. A belt 179 is wound on the pulley 163 and the pulley 160 fixed to the support shaft 156. Another pulley 180 is rotatably supported on one end of the idler shaft 174. As shown in FIG. 5, one-way clutch 181 is arranged between the REW idler 163 and the pulley 180. The clockwise rotation (FIG. 4) of the REW idler 163 is transmitted to the pulley 180 by function of the one-way clutch 181, but the counter-clockwise rotation of the REW idler 163 is prevented from being transmitted to the pulley 180, by function of the one-way clutch 181.

As shown in FIG. 5 and FIG. 9, the film supply sprocket 112 is fixed to one end of a sprocket shaft 184 which is rotatably supported by a bearing 185 fixed on the base plate 104. The film supply sprocket 112 consists of a pair of guide wheels 186 and 187, and a toothed disc 188 interposed between the guide wheels 186 and 187 which are fixed to each other by means of screw 189. The toothed disc 188 is fixed to the one guide wheel 186 by screws 190. The perforations of the film 109 are engaged with the toothed disc 188, guided between the guide wheels 186 and 187. A ladder wheel 192 is fixed to another end of the sprocket shaft 184. The ladder chain 133 is wound on the ladder wheel 192. A pulley 193 is supported on the central portion of the sprocket shaft 184 so as to be rotatable and slidable in the axial direction. At the side of the pulley 193, a rotary disc 194 is fixed on the sprocket shaft 184. A frictional disc 195 such as a felt disc is interposed between the rotary disc 194 and the pulley 193. A compression spring 197 is arranged between the pulley 193 and a spring receiving member 196 fitted to the sprocket shaft 184. Thus, slippage occurs between the pulley 193 and the rotary disc 194. A belt 198 is wound on the pulleys 180 and 193.

Figure 3:
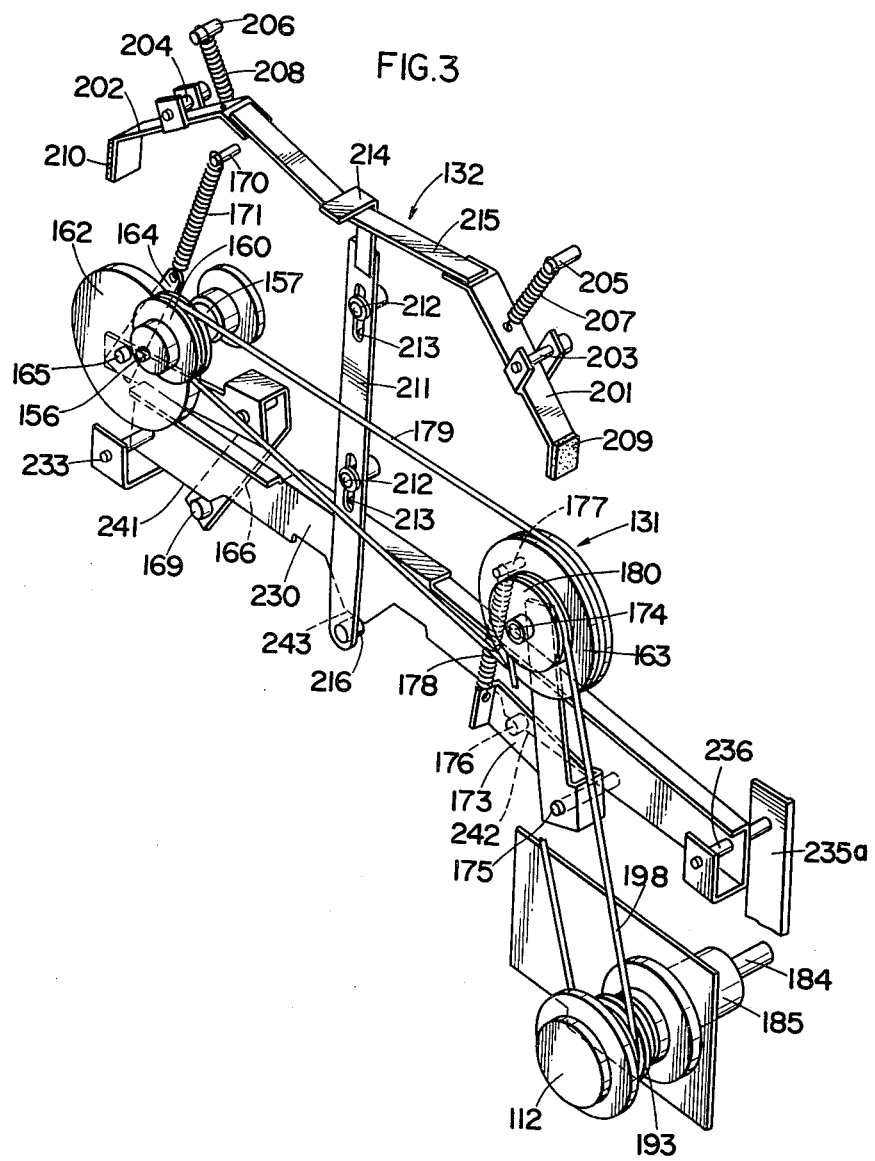
FIG. 3 is a perspective view of an idler mechanism in the telecine projector.
Figure 4:
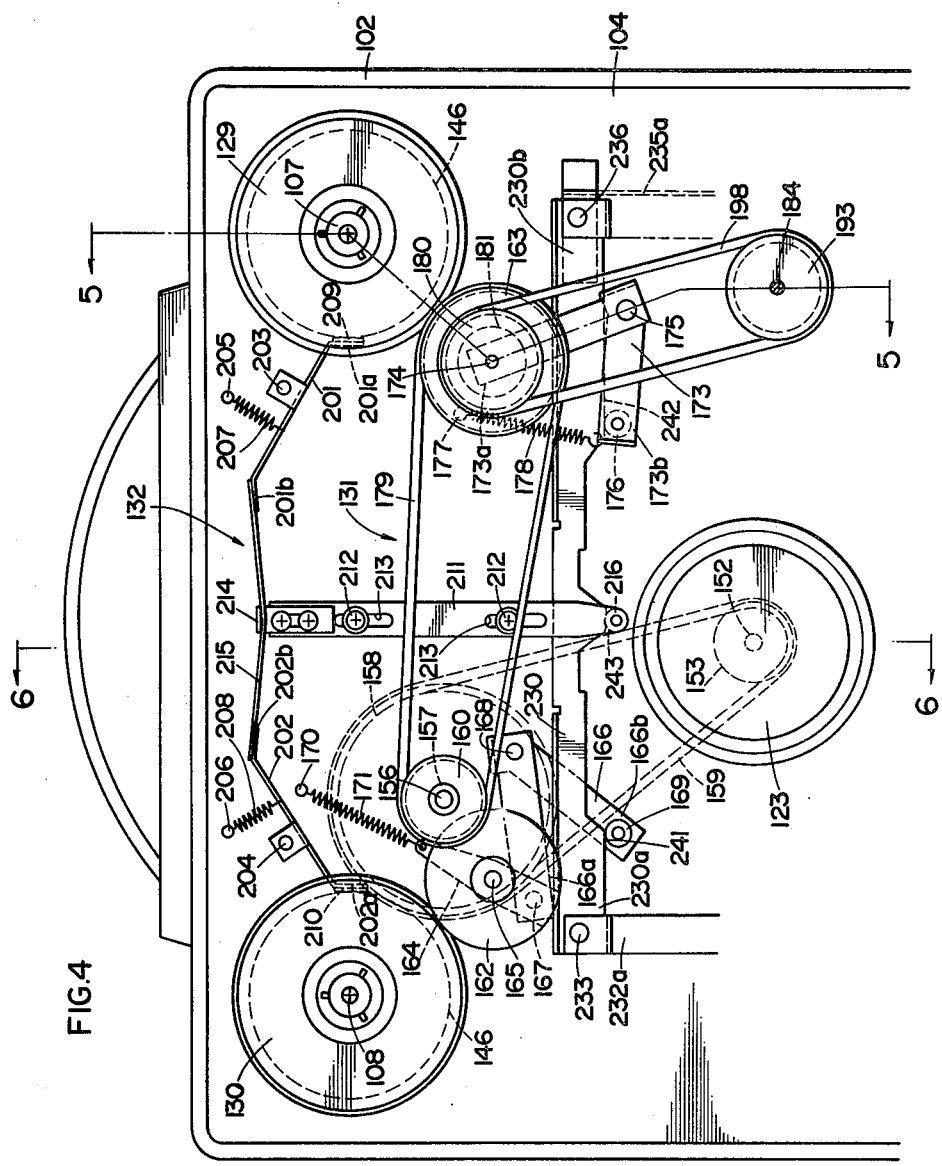
FIG. 4 is a front view of the idler mechanism of FIG. 3.

FIG. 3 and FIG. 4 show the brake mechanism 132. Between the reel mounts 129 and 130, a pair of brake levers 201 and 202 are rotatably supported by a pair of support pins 203 and 204. The brake levers 201 and 202 are urged in the clockwise direction and the counter-clockwise direction by tension springs 207 and 208 extended between the levers 201, 202 and spring receiving pins 205, 206 fixed to the base plate 104, respectively. Brake shoes 209 and 210 fixed to one ends 201a and 202a of the brake levers 201 and 202 are so designed as to be pressed to the circumferences of the rotary discs 146 of the reel mounts 129 and 130, respectively. A brake operating slide 211 is vertically arranged between the brake levers 201 and 202, and is so designed as to be vertically guided by engagement of a pair of oblong holes 213 with pins 212 fixed to the base plate 104. An inverted L-shaped member 214 is fixed to one end of the brake operating slide 211, and is engaged with a leaf spring 215 extended between the other ends 201b and 202b of the brake levers 201 and 202. The ends of the leaf spring 215 are fixed to the other ends 201b and 202b of the brake levers 201 and 202. A cam follower roller 216 is pivoted to the lower end of the brake operating slide 211.

Next, a mode change-over mechanism 219 to be actuated by the actuating knob 124 and constructions associated with the mechanism 219 will be described with reference to FIG. 10, FIG. 11 and FIG. 12.

Figure 13:
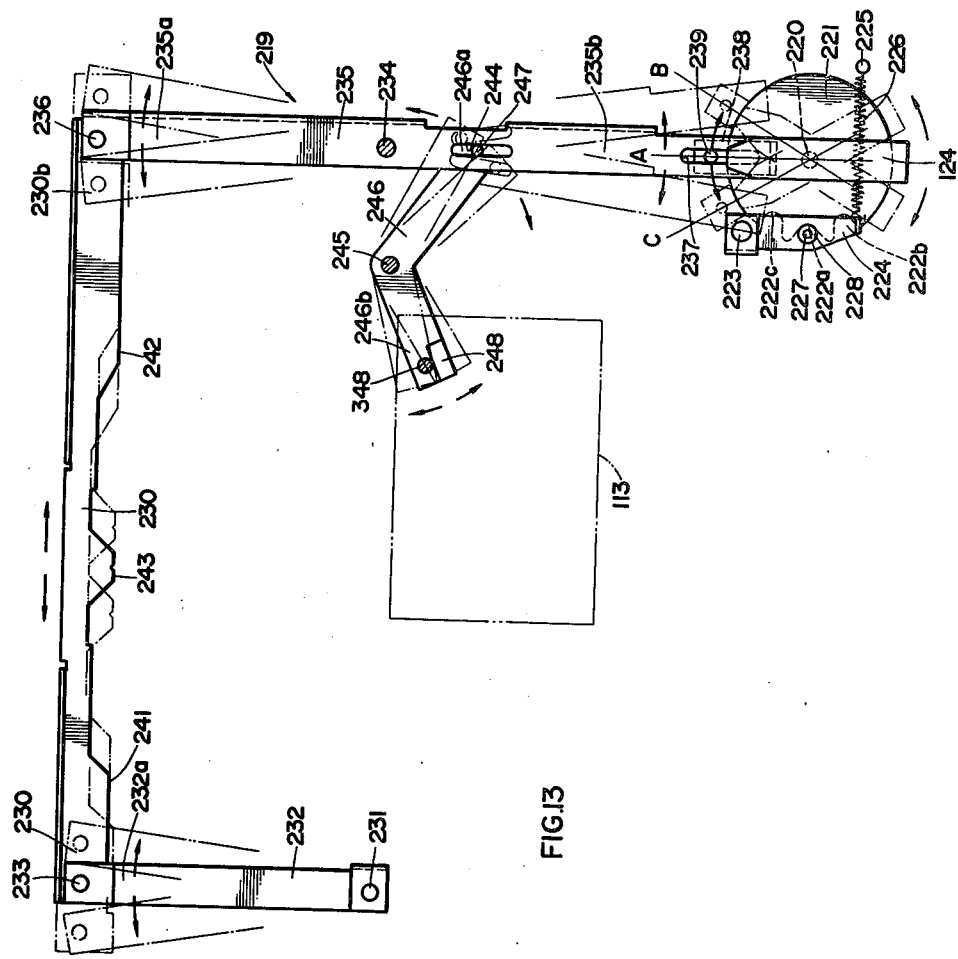
FIG. 13 is a front view of the mode change-over mechanism of FIG. 12.
Figure 14:
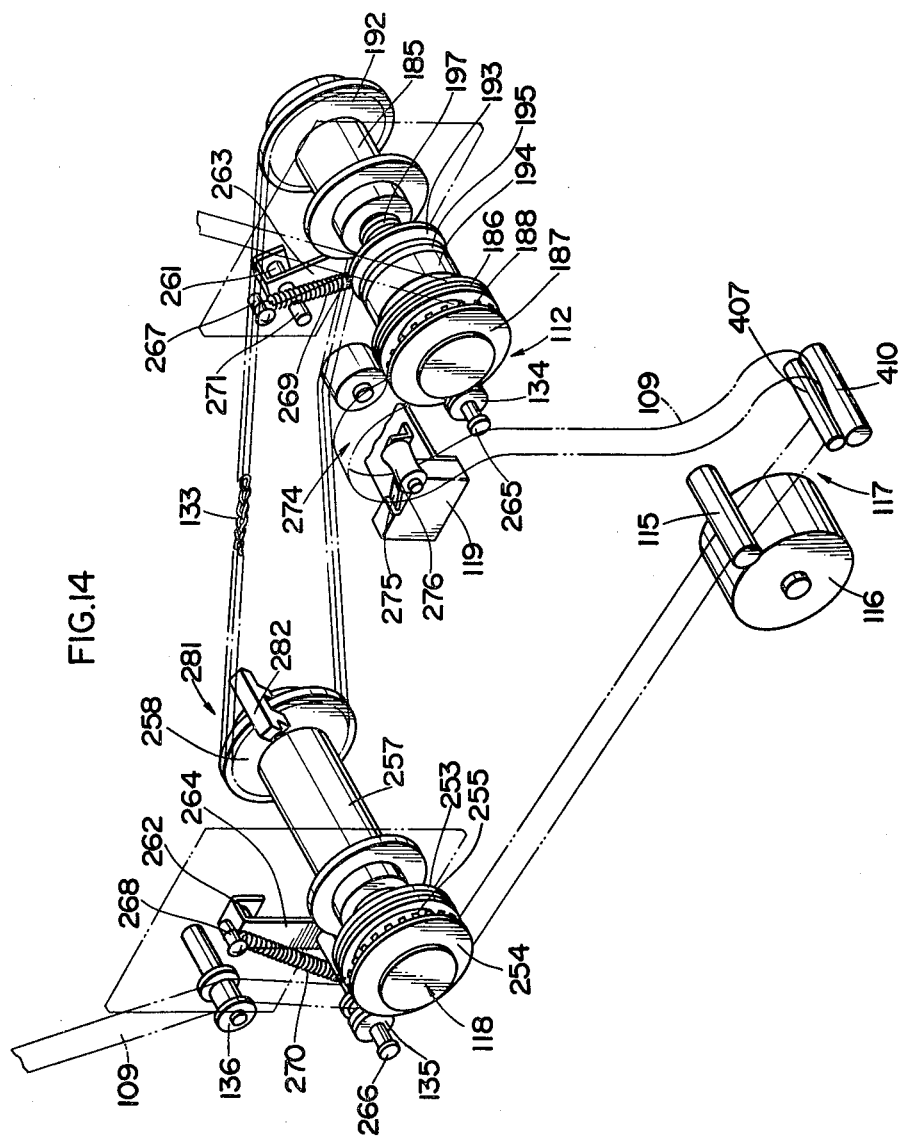
FIG. 14 is a perspective view showing the relationship between the film supply sprocket and a film take-up sprocket.

The actuating knob 124 is fixed to one end of a horizontal actuating shaft 220. Behind the base plate 104, a cam disc 221 is fixed to the shaft 220. Three recesses 222a, 222b and 222c are formed in the cam disc 221. In front of the base plate 104, a stopper lever 224 is rotatably supported by a support pin 223, and is urged in the counter-clockwise direction (FIG. 13) by a tension spring 226 extended between the stopper lever 224 and a spring receiving pin 225 fixed on the base plate 104. A pin 227 fixed on the stopper lever 224 passing through the base plate 104 is pressed into a roller 228 fixed to a top end of the pin 227 to the circumference of the cam disc 221. The roller 228 is so designed as to be engaged selectively with one of the recesses 222a, 222b and 222c. Thus, the cam disc 221, the actuating shaft 220 and the actuating knob 124 are selectively positioned into one of a STOP position A, a FWD position B and a REW position C, as shown in FIG. 13.

A mode change-over slide 230 is horizontally arranged above the rollers 169, 176 and 216. One end 230a of the slide 230 is pivoted to a pin 233 at an upper end 232a of a lever 232 rotatably supported by a support pin 231 in front of the base plate 104. Another end 230b of the slide 230 is pivoted to a pin 236 at an upper end 235a of another lever 235 rotatably supported by a support pin 234 behind the base plate 104. The pin 236 passes through the base plate 104. The lever 235 vertically extends along the base plate 104. The lever 235 is pivoted at its central portion to the pin 234. An oblong hole 237 is made in the lower end portion 235b of the lever 235, and is engaged with a pin 239 fixed on a plate 238 which is fixed on the cam disc 221.

Three cam projections 241, 242 and 243 are formed on the lower edge of the mode change-over slide 230, for the rollers 169, 176 and 216. Another oblong hole 244 is made in the lever 235 near the pin 234, and is engaged with a pin 247 fixed on one end 246a of an inverted V-shaped lever 246 rotatably supported by a pin 245. A cam portion 248 is formed integrally with another end 246b of the lever 246. A cam plate 249 is fixed on the actuating shaft 220 in front of the base plate 104. A rotary switch 250 is attached to another end of the actuating shaft 220 behind the base plate 104.

Next, change-over operations of the idler mechanism 131 and the brake mechanism 132 by the mode change-over mechanism 219 will be described.

In the STOP mode, the actuating knob 124 is located at the STOP position A shown by the solid line on FIG. 13. The roller 228 is engaged with the recess 222a of the cam disc 221 to position the actuating knob 124. The mode change-over slide 230 is located at the position shown by the solid line on FIG. 13 or FIG. 4. The three rollers 169, 176 and 216 ride on the cam projections 241, 242 and 243 of the slide 230. The inverted V-shaped levers 166 and 173 are located at the positions rotated in the counter-clockwise direction (FIG. 4) against the tension springs 171 and 178. The FWD idler 162 and the REW idler 163 are separated from the reel mounts 130 and 129, respectively. The brake operating slide 211 is located at its lower position. The leaf spring 215 is bent downward at the central portion by the inverted L-shaped member 214. The brake levers 201 and 202 are rotated in the counter-clockwise direction and the clockwise direction (FIG. 4) against the tension springs 207 and 208, respectively. Accordingly, the brake shoes 209 and 210 are pressed to the circumferential surfaces of the rotary discs 146 of the reel mounts 129 and 130. Thus, the reel mounts 129 and 130 are in the braked condition.

Next, the power switch is turned on, and the actuating knob 124 is rotated from the STOP position A to the FWD position B shown by the dot-dash line on FIG. 13. Accordingly, the cam disc 221 is rotated through the actuating shaft 220 in the clockwise direction (FIG. 13). The roller 228 is displaced from the recess 222a to position the actuating knob 124 at the FWD position B. With the rotation of the cam disc 221, the lever 235 is rotated round the pin 234 to the position shown by the dot-dash line on FIG. 13 through the plate 238, the pin 239 and the oblong hole 237. The mode change-over slide 230 supported by the levers 235 and 232 slides horizontally leftward (FIG. 13) to the position shown by the dot-dash line on FIG. 13, or shown by the solid line on FIG. 10. Accordingly, the roller 216 is rolled down to the right bottom of the cam projection 243. The vertical brake operating slide 211 is restored to its original, or upper position. The leaf spring 215 is elastically restored to its original position. The brake levers 201 and 202 are rotated back in the clockwise direction and the counter-clockwise direction (FIG. 10) by the tension springs 207 and 208. The brake shoes 209 and 210 are separated from the rotary discs 146 of the reel mounts 129 and 130. The reel mounts 129 and 130 are released from braking. At the same time, the roller 169 is rolled down to the right bottom of the cam projection 241. Accordingly, the lever 166 is rotated in the clockwise direction (FIG. 10) through the lever 164 by the tension spring 171. The FWD idler 162 is pressed between the rotary disc 146 of the take-up reel mount 130 and the intermediate idler 157. On the other hand, the roller 176 continues to ride on the cam projection 242. Accordingly, the lever 173 is positioned as shown in FIG. 4, and the REW idler 163 remains separated from the rotary disc 146 of the supply reel mount 129.

With the change-over of the actuating knob 124 into the FWD position B, the rotary switch 250 is changed over to drive the electric motor 123. The rotational force of the motor 123 is transmitted to the intermediate shaft 156, the intermediate idler 157 and the pulley 160 as one body through the motor shaft 152, the pulley 153, the belt 159 and the pulley 158. The intermediate shaft 156, the intermediate idler 157 and the pulley 160 are rotated in the clockwise direction (FIG. 10). The intermediate idler 157 in turn rotates the rotary disc 146 of the take-up reel mount 130 through the FWD idler 162 in the clockwise direction (FIG. 10). The take-up reel mount 130 is frictionally driven through the frictional disc 147 by the rotary disc 146 in the clockwise direction (FIG. 10).

Figure 10:
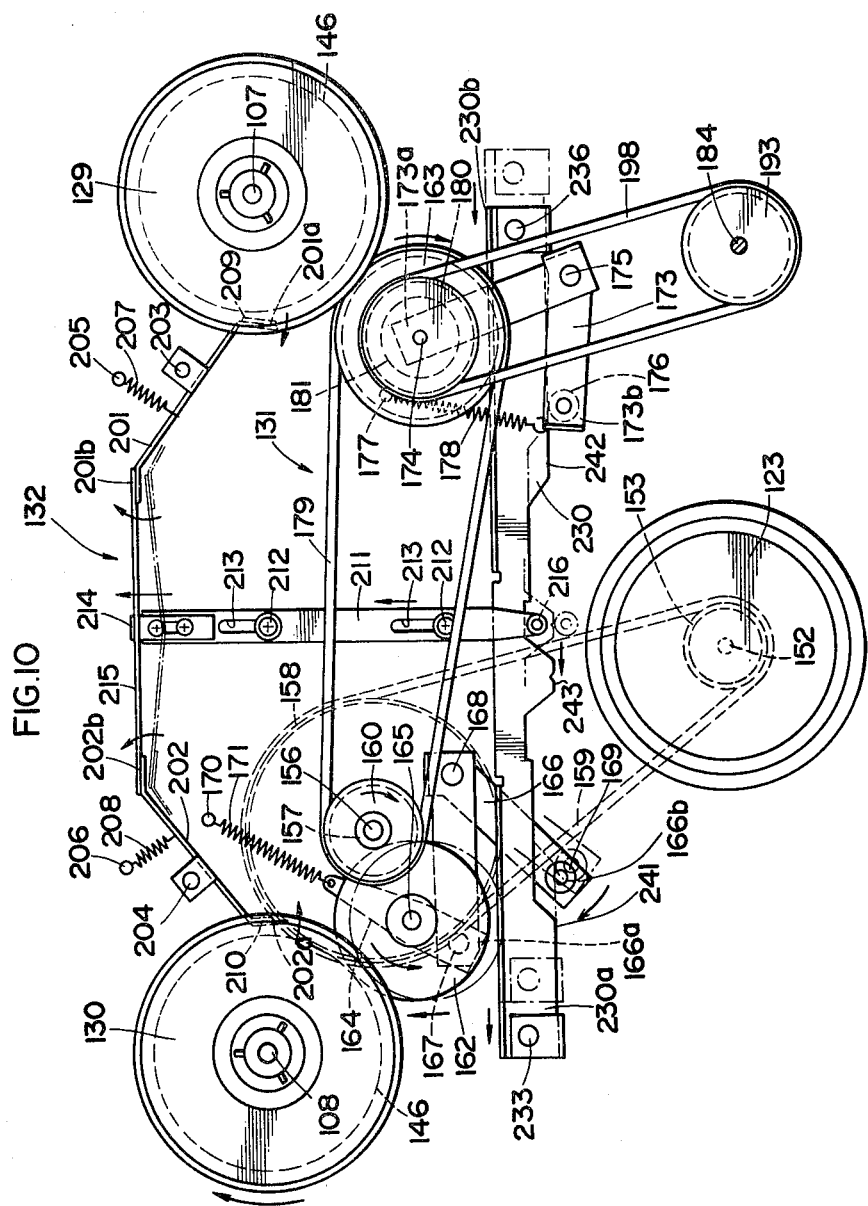
FIG. 10 and FIG. 11 are front views of the idler mechanism for explaining operations of the idler mechanism.
Figure 11:
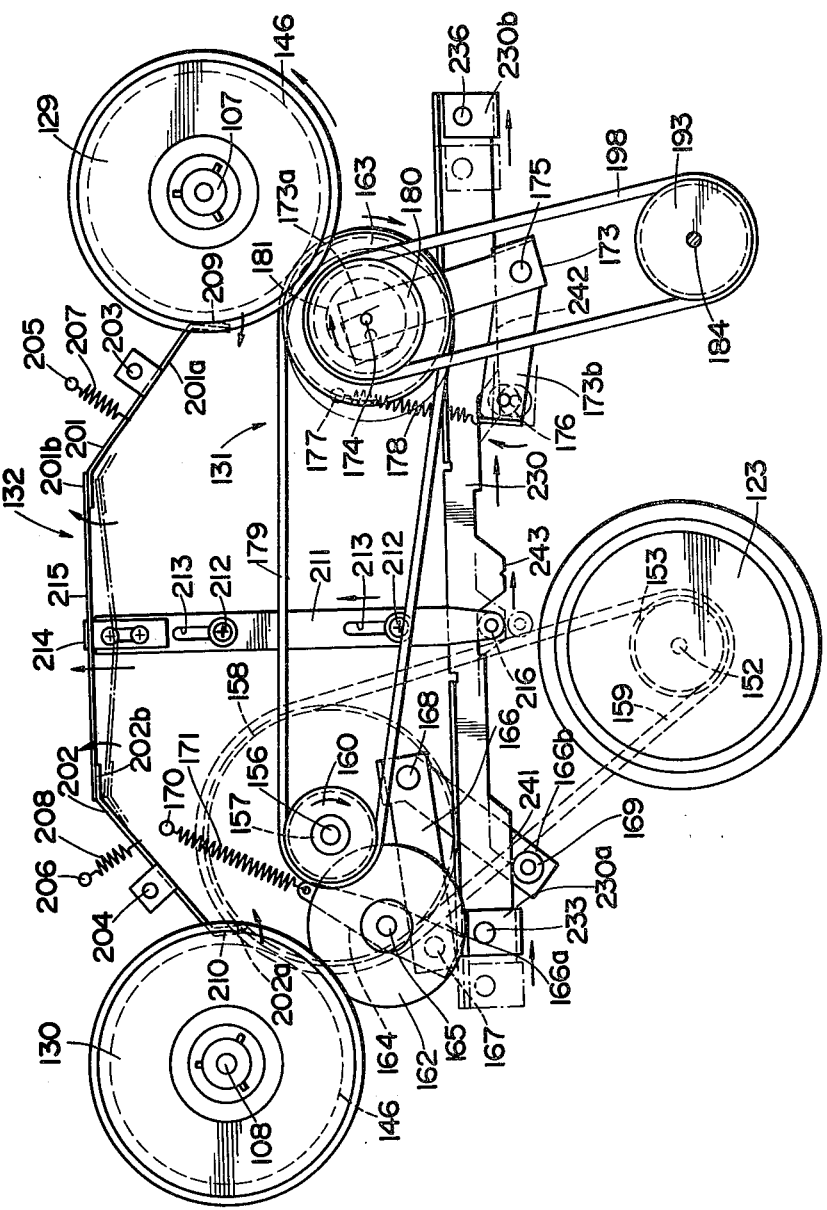

The rotational force of the intermediate shaft 156 is transmitted to the REW idler 163 through the pulley 160 and the belt 179 to rotate the REW idler 163 in the clockwise direction (FIG. 10). The rotational force of the REW idler 163 is in turn transmitted to the pulley 193 through the one-way clutch 181, the pulley 180 and the belt 198. The pulley 193 frictionally drives the sprocket shaft 184 through the frictional disc 195 and the rotary disc 194 in the clockwise direction (FIG. 10). The film supply sprocket 112 is driven in the clockwise direction (FIG. 10). On the other hand, the rotational force of the take-up sprocket 118 which is rotated in accordance with the take-up speed of the film 109, is transmitted to the supply sprocket 112 through the ladder chain 133, the ladder wheel 192 and the sprocket shaft 184. The sprockets 118 and 112 rotate at the same speed. The frictional drive of the pulley 193 will aid the supply sprocket 112 in rotating at the same speed as the take-up sprocket 118.

With the change-over of the actuating knob 124 into the FWD position B, the rotary switch 250 is changed over to drive the film advancing apparatus 113. The film 109 is transported forwardly.

In this telecine projector 101, the supply sprocket 112 is rotated in accordance with the take-up speed of the film 109, and moreover is aided in rotating, by the frictional drive of the pulley 193. Accordingly, the film 109 can be very stably and surely drawn out from the supply reel, from the beginning to the end thereof.

In the beginning of the operation of the telecine projector, or in the earlier stage of the take-up winding of the film 109, the coil of wound film on the take-up reel 111 is small in diameter, and so the take-up torque of the take-up reel 111 is large. Accordingly, the rotational torque of the take-up sprocket 118 driven by the film 109 is large. Similarly, the rotational torque of the supply sprocket 112 combined through the ladder chain 133 with the take-up sprocket 118 is large. On the other hand, the coil of wound film on the supply reel 110 is large in diameter. Thus, the film 109 can be easily drawn out from the supply reel 110 against the preloading force applied to the supply reel shaft 107. Moreover, since the take-up reel mount 130 is frictionally driven as described above, the film 109 will not be so strongly pulled beyond the feeding speed of the capstan 115 and pinch roller 116 and that the film 109 can slip as it passes between the capstan 115 and pinch roller 116, even though the coil of wound film on the take-up reel 111 is small in diameter. The film 109 fed from the capstan 115 and pinch roller 116 is taken up by the take-up reel 111 without slackening.

Near the end of the operation of the telecine projector, or in the late stage of the take-up winding of the film 109, the coil of wound film on the take-up reel 111 is large in diameter, and so the take-up torque of the take-up reel 111 is small. On the other hand, the coil of wound film on the supply reel 110 is small in diameter. Accordingly, it would be more difficult to draw out the film from the supply reel 110 due to the preloading force applied to the supply reel shaft 107. Eventually, if the preloading force were uncompensated, the supply sprocket 112 would stop rotating, and the supply of the film 109 would stop.

However, according to this embodiment, the supply sprocket 112 is aided in rotating by the frictional drive of the pulley 193. The rotational torque of the supply sprocket 112 is compensated near the end of the take-up winding of the film 109. Accordingly, the film 109 can be very stably and surely drawn out from the supply reel and fed to the film advancing apparatus 113, from the beginning to the end thereof.

When the actuating knob 124 is rotated from the STOP position A to the REW position C shown by the two-dot dash line on FIG. 13, the cam disc 221 is rotated in the counter-clockwise direction (FIG. 13) through the actuating shaft 220, and so the roller 228 is displaced from the recess 222a to the recess 222c to position the actuating knob 124 at the REW position C.

With the rotation of the cam disc 221, the lever 235 is rotated to the position shown by the two-dot dash line on FIG. 13 through the plate 238, the pin 239 and the oblong hole 237. The mode change-over slide 230 supported by the levers 235 and 232 is slided horizontally rightward (FIG. 13) to the position shown by the two-dot dash line on FIG. 13 or the position shown by the solid line on FIG. 11. The roller 216 is rolled down to the left bottom of the cam projection 243, and the brake operating slide 211 is restored to its upper position, in the same manner as in the FWD running to the film 109. The brake levers 201 and 202 are rotated back in the clockwise direction and counter-clockwise direction (FIG. 10). The reel mounts 129 and 130 are released from braking. At the same time, the roller 176 is rolled down to the left bottom of the cam projection 242, and the lever 173 is rotated in the clockwise direction (FIG. 11) by the tension spring 178. The REW idler 163 is pressed to the circumferential surface of the rotary disc 146 of the supply reel mount 129. On the other hand, the roller 169 remains rided on the cam projection 241. The lever 166 is maintained as shown in FIG. 4. The FWD idler 162 is separated from the rotary disc 146 of the take-up reel mount 130.

With the change-over of the actuating knob 124 into the REW position C, the rotary switch 250 is changed over to drive the electric motor 123. The REW idler 163 is driven in the clockwise direction (FIG. 11) to rotate the rotary disc 146 of the supply reel 129 in the counter-clockwise direction (FIG. 11). The supply reel mount 129 is frictionally driven through the frictional disc 147 by the rotary disc 146. The film advancing apparatus 113 is not operated at that time. Thus, the REW mode of the film 109 is effected.

The supply sprocket 112 is rotated in the counter-clockwise direction (FIG. 2). The rotational force of the supply sprocket 112 is transmitted to the pulley 180 through the belt 198. However, the counter-clockwise rotation of the pulley 180 is not transmitted to the REW idler 163, since the one-way clutch 181 is interposed between the pulley 180 and the REW idler 163. Accordingly, in the REW running of the film, the above described frictional drive of the supply sprocket 112 is not carried out.

Next, details of the take-up sprocket 118 and constructions associated with the take-up sprocket 118 will be described with reference to FIG. 14 to FIG. 19.

Figure 16:
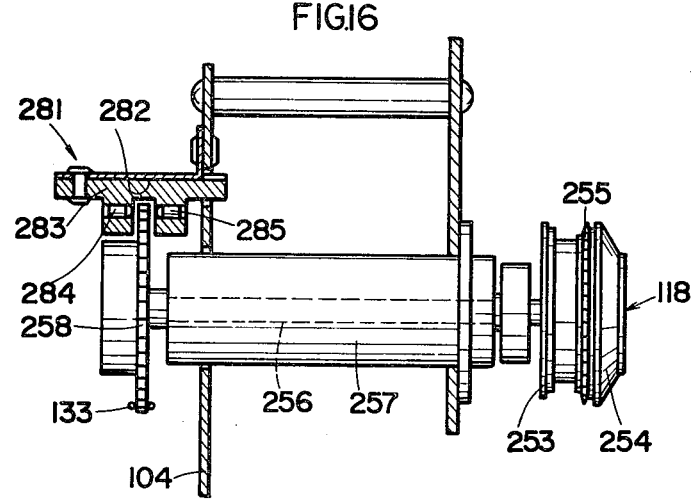
FIG. 16 is a cross-sectional view taken along the line 16—16 of FIG. 15.

Referring to FIG. 16, the take-up sprocket 118 consists of a pair of guide wheels 253 and 254 and a tooth disc 255 interposed between the guide wheels 253 and 254, in the same manner as the supply sprocket 112, which are fixed to one end of a sprocket shaft 256. The sprocket shaft 256 is rotatably supported by a bearing 257 fixed on the base plate 104. A ladder wheel 258 is fixed to another end of the sprocket shaft 256. The ladder chain 133 is meshes with the ladder wheel 258.

Figure 15:
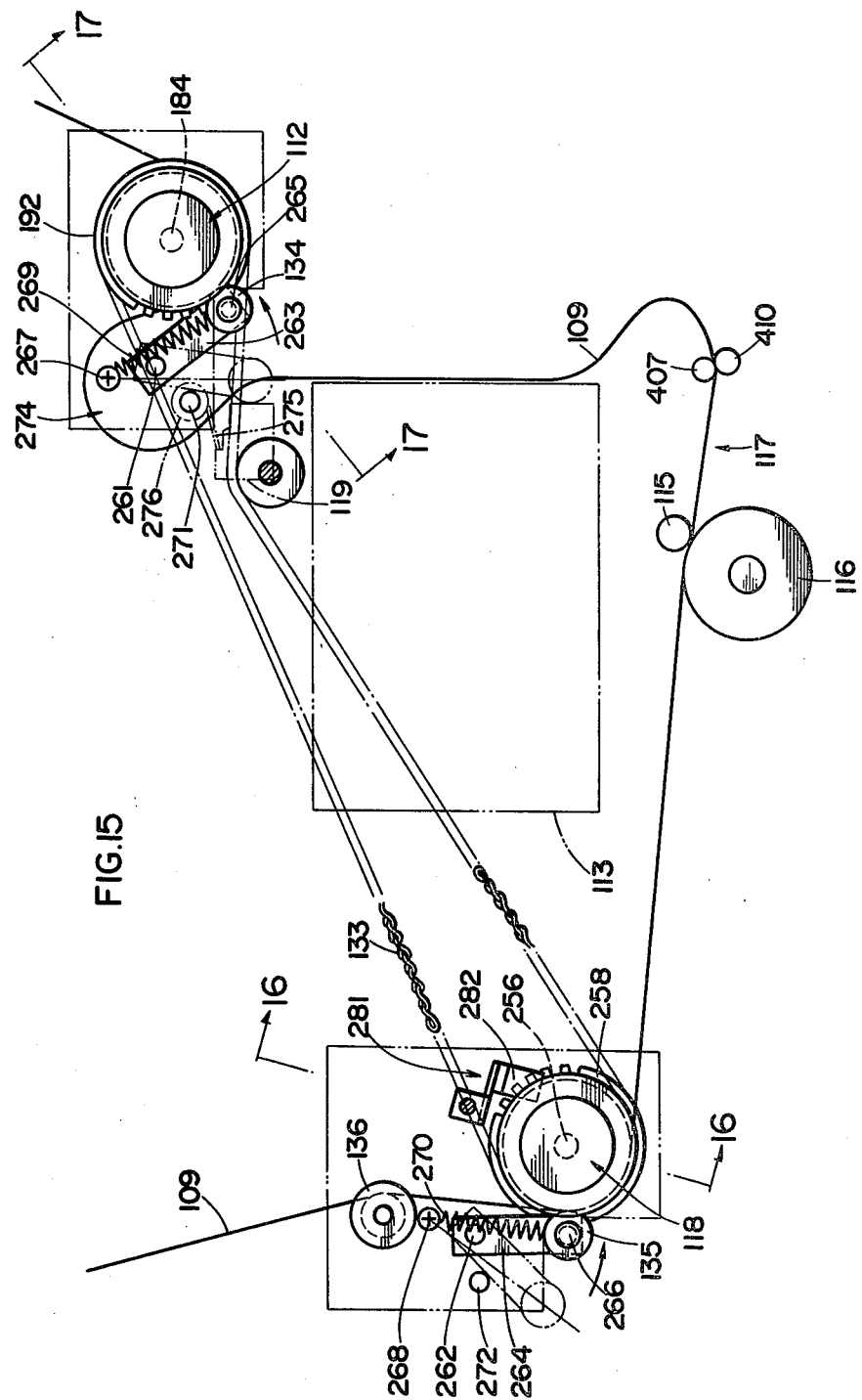
FIG. 15 is a front view of the sprockets of FIG. 14.
Figure 17:
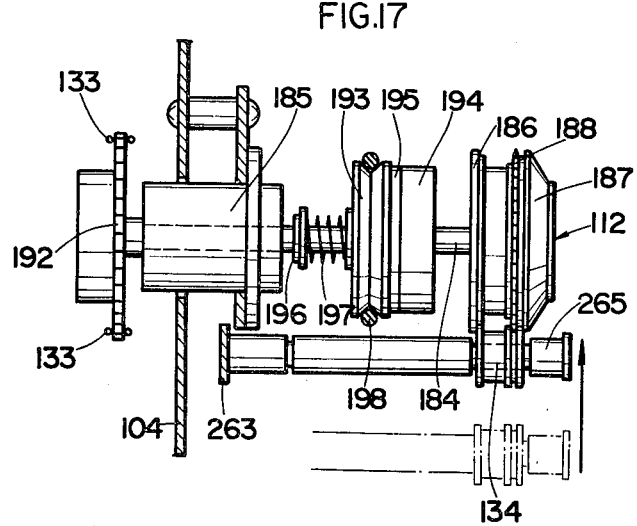
FIG. 17 is a cross-sectional view taken along the line 17—17 of FIG. 15.
Figure 20:
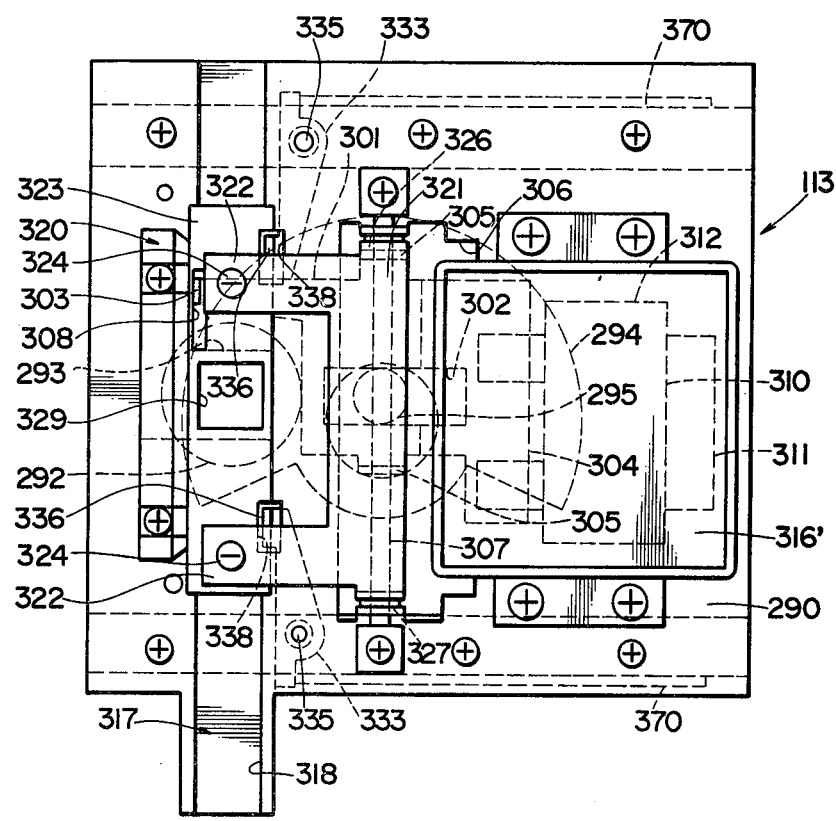
FIG. 20 is a front view of a film advancing apparatus in the telecine projector.
Figure 21:
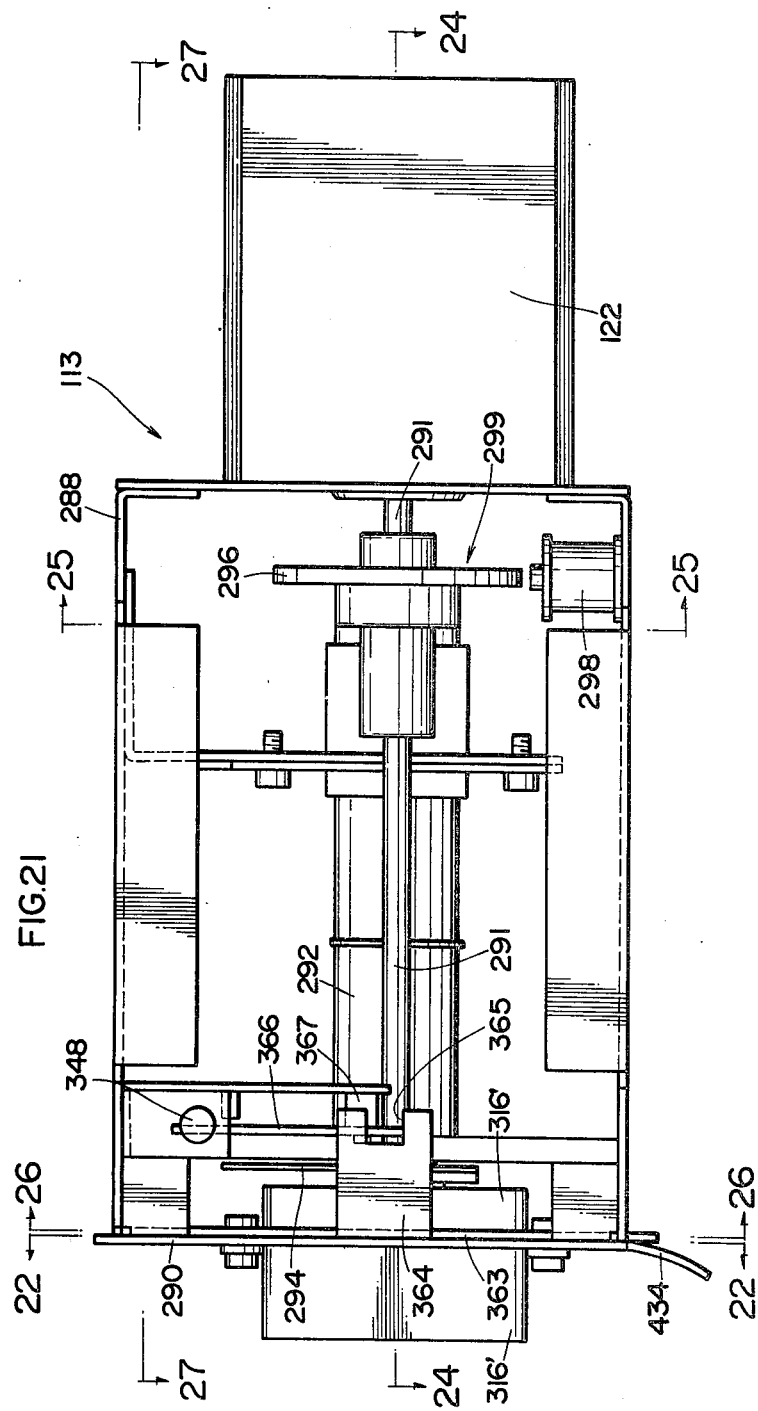
FIG. 21 is a side view of the film advancing apparatus.
Figure 23:
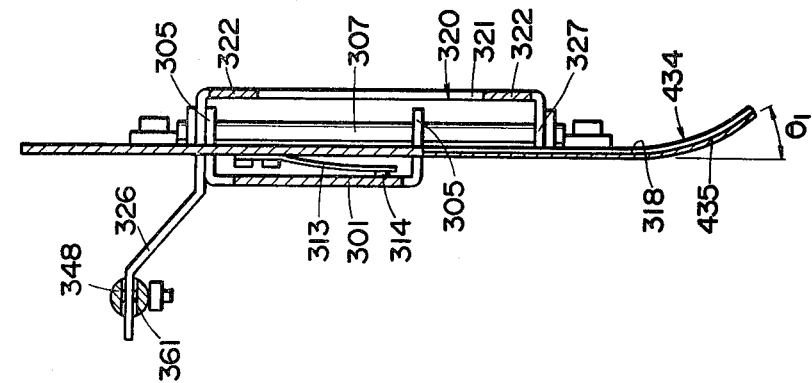
FIG. 23 is a cross-sectional view taken along the line 23—23 of FIG. 22.
Figure 22:
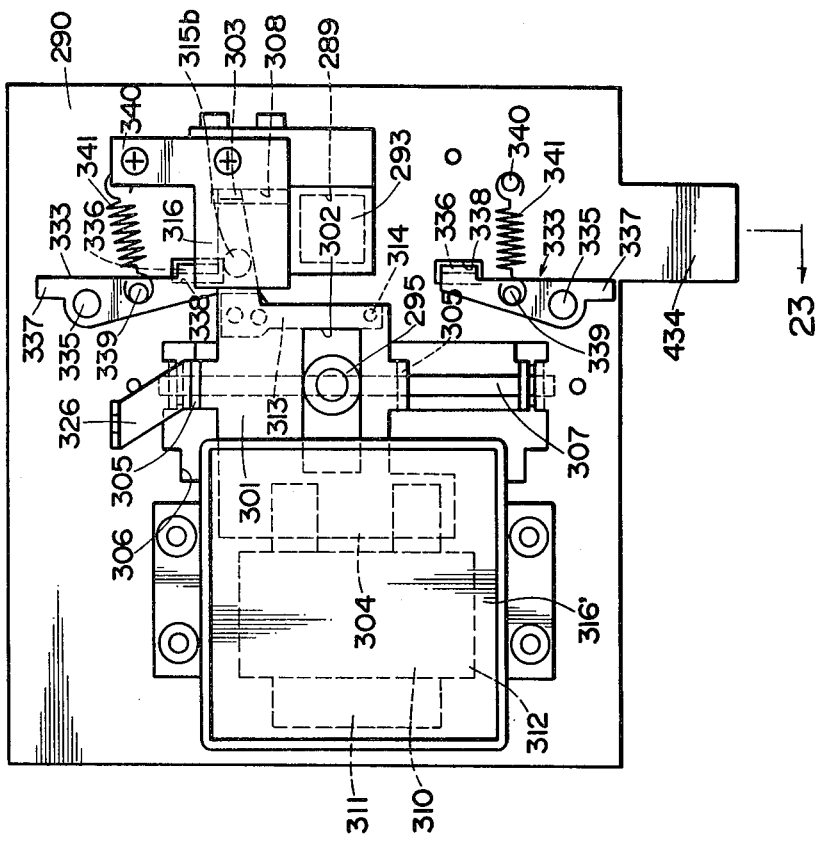
FIG. 22 is a cross-sectional view taken along the line 22—22 of FIG. 21.
Figure 27:
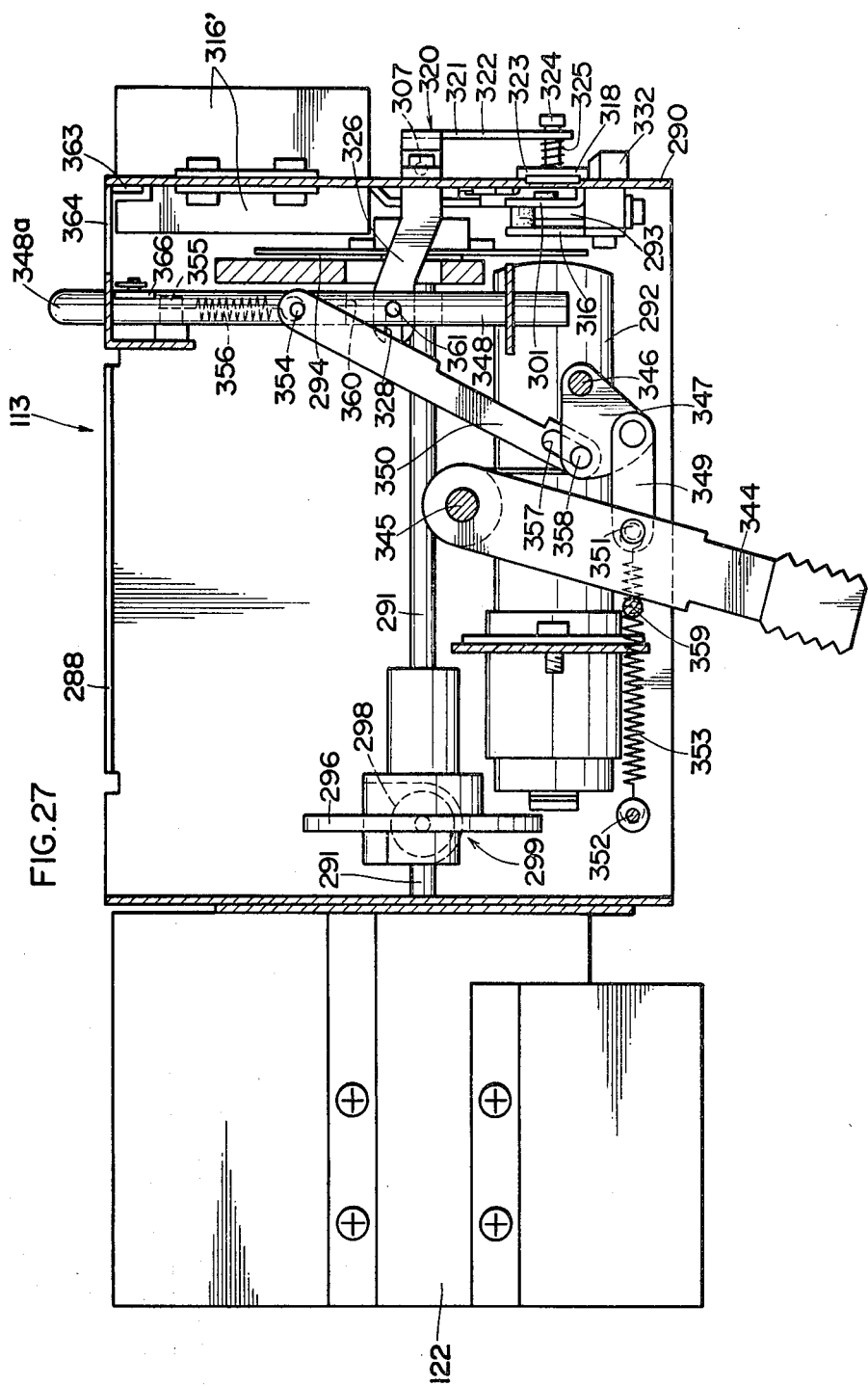
FIG. 27 is a cross-sectional view taken along the line 27—27 of FIG. 21.
Figure 40:
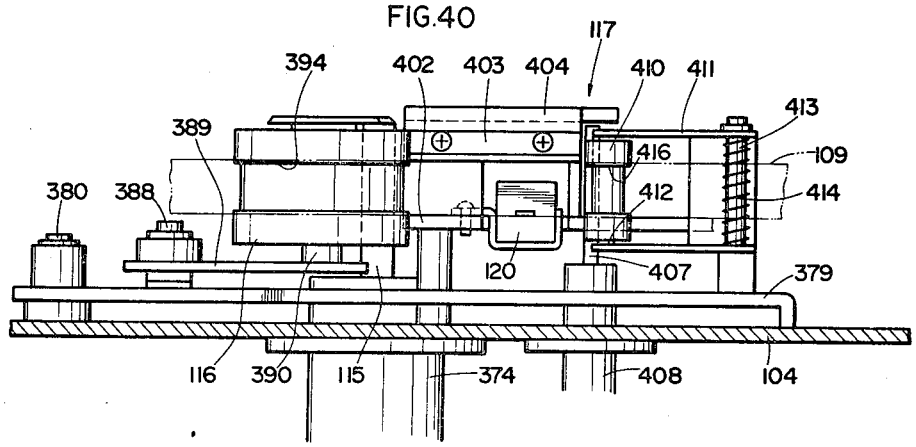
FIG. 40 is an enlarged bottom view of an important part of the film constant drive mechanism.
Figure 41:
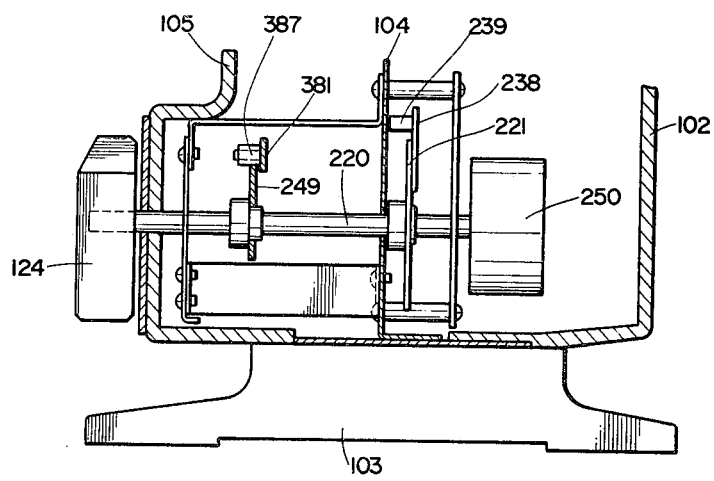
FIG. 41 is an enlarged cross-sectional view taken along the line 41—41 of FIG. 39.

The film pushing rollers 134 and 135 arranged adjacent to the supply sprocket 112 and the take-up sprocket 118, are rotatably supported, as shown in FIG. 15 and FIG. 17, by roller support pins 265 and 266 fixed to top ends of toggle levers 263 and 264 which are pivoted to support pins 261 and 262. Toggle springs 269 and 270 are extended between the roller support pins 265, 266 and spring receiving pins 267, 268 fixed to the base plate 104. Stoppers 271 and 272 are arranged for the toggle levers 263 and 264.

After the film 109 is threaded through the running path, the film pushing rollers 134 and 135 are turned from first positions shown by the dot-dash line to second positions shown by the solid line on FIG. 15 by the toggle springs 269 and 270. The rollers 134 and 135 are pressed to the sprockets 112 and 118. The film 109 is engaged between the guide wheels 186 and 187, and 253 and 254, where the perforations of the film 109 are engaged with the toothed discs 188 and 255.

The toothed discs 188 and 255 of the sprockets 112 and 118 each have the same in number of teeth and the same diameter. Also, the ladder wheels 192 and 258 each have the same number of teeth and the same diameter. Accordingly, the sprockets 112 and 118 connected to each other through the ladder chain 133 are equal to each other in peripheral speed. The film feeding speeds of the sprockets 112 and 118 are equal to each other. In the FWD running of the film, the film take-up speed of the take-up sprocket 118 is so designed as to be equal to the film supply speed of the supply sprocket 112.

For the interconnection between the sprockets 112 and 118, instead of the ladder chain 133, a normal chain, a timing belt or a so-called "slipless" transmitting means may be used.

Since the take-up speed of the film is so designed as to be equal to the supply speed (draw-out speed) of the film in the FWD running, the constant slack of the film can be always maintained between the sprockets 112 and 118 along the film running path. Accordingly, some slack of the film 109 in a film slacking portion 274 can be secured in a loop of film above the film advancing apparatus 113. Due to the loop and the margin of safety afforded by slack in the film, only a small loading force is applied to the film advancing apparatus 113, and so the film 109 can be very smoothly advanced at the frame advancing rate synchronized with the television field frequency (fifty or sixty frames per second) from the stop.

As shown in FIG. 18, the film urgent stop switch 119 comprises a micro switch arranged in the film slacking portion 274. A detecting roller 276 is pivoted to a top end of an actuator 275 of the micro switch 119, and arranged within the loop made by the film 109 in the film slacking portion 274.

When the film 109 is normally transported in the FWD running mode, the detecting roller 276 is not pushed by the slacked film 104, as shown by the solid line on FIG. 18; the switch 119 is not actuated. However, when the film 109 is tensioned for any reason in the film slacking portion 274 the detecting roller 276 is pushed down by the tensioned film 109 as shown by the dot-dash line on FIG. 18 the switch 276 is turned on through the actuator 275. With the turn-on of the switch 276, an electromagnet to be described hereafter, for the film advancing apparatus 113 is deenergized, and so the operation of the film advancing apparatus 113 is urgently stopped.

For example, if the film 109 is cut under the film advancing apparatus 113, or if the film slack detecting device 114 misoperates, the film 109 can be tensioned in the film slacking portion 274. One of the causes that the film slack detecting device 114 misoperates is as follows:

In this telecine projector 101, the motor 122 for the film advancing apparatus 113 is arranged independently of the motor 123 for the film running. The film advancing is synchronized with the film running in such a manner that some slack of the film 109 at the film slack detecting device 114 is optically detected by the film slack detecting device 114. For example, when the telecine projector 101 is quickly displaced from a very cold place to a warm room, the threshold voltage of a photo sensor to be described hereafter varies with the ambient temperature, so that the film slack detecting device 114 does not operate normally. Accordingly, even through the film slack is increased more than a predetermined amount at the film slack detecting device 114 by the film advancing apparatus 113, the film 109 continues to be advanced by the film advancing apparatus 113, and it is advanced at the higher rate than desired. The film slack then becomes decreased in the film slacking portion 274.

However, since the film urgent stop switch 119 is arranged in the telecine projector 101 according to this embodiment, the film advancing operation is urgently stopped whenever the film 109 is unexpectedly tensioned in the film slacking portion 274 above the film advancing apparatus 113. Accordingly, it the urgent stop switch 119 acts to prevent the perforations of the film 109 from being damaged by a shuttle 30 associated with the film advancing apparatus 113 and to be discussed below.

As shown in FIG. 15, FIG. 16 and FIG. 19, a frame advance converter 281 is adjacent to the ladder wheel 258. The number of teeth 258a of the ladder wheel 258 is in a fixed relationship with the number of teeth of the take-up sprocket 118. For example, the ratio of the number of the teeth 258a of the ladder wheel 258 to the number of the teeth of the take-up sprocket 118 can be one or integer. The advancing rate or an arbitrary the running speed of the film 109 is detected by counting the teeth of the rotating ladder wheel 258. In this embodiment, a photo-coupler 282 is used for count of the teeth of the ladder wheel 258. Instead of the photo-coupler, a micro switch may be used.

As shown in FIG. 16, the photo-coupler 282 consists of a light emitting element 283 and a photo sensor 285 which are assembled in a holder 283 having a substantially U-shaped cross-section. The holder 282 is fixed to the back of the base plate 104. The teeth 258a of the ladder wheel 258 are interposed between the photo sensor 285 and the light emitting element 284.

In the frame advance converter 281, the light from the light emitting element 284 is intermittently intercepted by the teeth 258a of the ladder wheel 258 which rotates in accordance with the film running speed. When the number of the teeth of the ladder wheel 258 is equal to the number of the teeth of the take-up sprocket 118, the ladder wheel 258 rotates by one tooth pitch with the advance of one frame (one perforation pitch) of the film 109. The light is intercepted once by the tooth 258a of the ladder wheel 258. In other words, the light is detected once by the photo-sensor 285. Thus, the film running speed or the frame advancing rate can be detected.

In the frame advance converter 281, the teeth 258a of the ladder wheel 258 are utilized as a shutter plate to be operated in accordance with the film running speed or the frame advancing rate. Alternatively, the teeth 258a may be utilized as an actuating cam for a micro-switch, to be operated in accordance with the film running speed or the frame advancing rate. A special shutter plate or accurate actuating cam is not required. Accordingly, the frame advance converter 281 requires a smaller number of parts and assembling steps. Moreover, it is very accurate.

Next, details of the film advancing apparatus 113 and constructions associated with the apparatus 113 will be described with reference to FIG. 20 to FIG. 37.

In the film advancing apparatus 113, an aperture plate having an aperture 289 is vertically fixed to the front side of a frame 288. The film 109 vertically passes by the aperture 289 in contact with the aperture plate 290. The electric motor 122 is fixed to the back of the frame 288. A motor shaft 291 of the motor 122 horizontally extends within the frame 288. A lamp 292 is arranged within the frame 288 to project the picture of the film 109 to the television camera through the optical system 121. The lamp 292 radiates light to the aperture 289. An opal glass 293 for scattering light is fixed behind the aperture 289. As apparently shown in FIG. 28, a sector shutter plate 294 and a crank 295 for driving a shuttle to be described hereafter are fixed to the top end of the motor shaft 291. The sector shutter plate 294 works to intercept the light from the lamp 292 once per one revolution of the motor 122. The crank 295 is eccentric from the motor shaft 291. A fly wheel 296 is fixed on the motor shaft 291. A magnet 297 is fixed on the periphery of the fly wheel 296. A coil 298 for detecting the position of the magnet 297 is arranged adjacent to the periphery of the fly wheel 296. A pulse generator 299 is constituted by the magnet 297 and the coil 298. One pulse is generated every revolution of the motor 122 from the pulse generator 299.

A shuttle 301 for advancing the film is attached to the aperture plate 290. As shown in FIG. 29 to FIG. 32, a horizontal oblong hole 302 for engaging with the crank is formed in a central portion 301a of the shuttle 301. A finger 303 is formed in one end portion 301b of the shuttle 301, to be engaged with the perforation 109a of the film 109 so as to advance the film 109. Another end portion 301c of the shuttle 301 consists of an iron member 304. A pair of support members 305 is formed on the upper and lower ends of the central portion 301a of the shuttle 301. The shuttle 301 is supported by a support shaft 307 at the support members 305 in the manner that the support members 305 and the iron member 304 are fitted into an opening 306 made in the aperture plate 290. The shuttle 301 is so designed as to be rotatable around the support shaft 307 and slidable along the latter. A vertical slit 308 is formed in the aperture plate 290 along the film running path. The finger 303 of the shuttle 301 are inserted into the vertical slit 308 and withdrawn from the vertical slit 308. An electromagnet 310 is arranged at one side of the aperture plate 290. The electromagnet 310 includes a U-shaped iron core 311 around which a pair of windings 312 is wound. With the energization of the windings 312, the iron member 304 of the shuttle 301 is magnetically attracted by pole pieces 311a and 311b of the iron core 311, so as to rotate the shuttle 301 in the counter-clockwise direction (FIG. 32) round the support shaft 307. A leaf spring 313 for pushing back the shuttle 301 is fixed to the back of the aperture plate 290. A contact member 314 made of low frictional material such as Nylon (synthetic polyamid), Delrin (polyacethal) or mixture of them is fixed to the top end of the leaf spring 313. The leaf spring 313 pushes the shuttle 301 at the contact member 314. Stopper members 315a and 315b made of low frictional material such as Nylon (Synthetic polyamid), Delrin (polyacethal) or mixture of them are fixed to both surfaces of the one end portion 301b of the shuttle 301. The one stopper member 315a is so designed as to contact with the back of the aperture plate 290, while the other stopper member 315b is so designed as to contact with a guide plate 316 fixed to the aperture plate 290.

With the energization of the windings 312 of the electromagnet 310, the shuttle 301 is rotated in the counter-clockwise direction (FIG. 32) against the leaf spring 313, so that the finger 303 of the shuttle 301 passes through the slit 308 to project from the front side of the aperture plate 290. The finger 303 engages with the perforation 109a of the film 109 pressed to the front surface of the aperture plate 290. The stopper member 315a of the shuttle 301 comes to contact with the back surface of the aperture plate 290. Thus, the projection of the finger 303 is regulated. In other words, an air gap 319 is maintained between the iron member 304 of the shuttle 301 and the pole pieces 311a and 311b of the iron core 311 of the electromagnet 310. The intervention of the stopper member 315a prevents the iron member 304 from colliding with the pole pieces 311a and 311b.

With the deenergization of the windings 312 of the electromagnet 310, the shuttle 301 is rotated back in the clockwise direction (FIG. 32) by the leaf spring 313. The finger 303 of the shuttle 301 is withdrawn from the slit 308. In other words, the finger 303 is disengaged from the perforation 109a of the film 109. At that time, the stopper member 315b of the shuttle 301 comes to contact with the guide plate 316. Thus, the withdrawal of the finger 303 is regulated.

The diameter of the crank 295 is equal to the width of the oblong hole 302. The crank 295 is fitted to the oblong hole 302, and the former is rotatable in the latter.

With the eccentric drive of the crank 295 by the motor shaft 291, the shuttle 301 is reciprocated by the stroke of twice the eccentric distance of the crank 295 along the support shaft 307. The electromagnet 310 is intermittently energized in correlation with the reciprocal motion of the shuttle 301. In cooperation with the leaf spring 313, the shuttle 301 is reciprocated along, and rotated back and forth round the support shaft 307.

In order to avoid magnetic influence on the external parts, the electromagnet 310 is shielded by a shield case 316'. A vertical groove 318 having a U-shaped cross-section is formed in a film running path 317 in order to prevent the picture 109b of the film 109 from being damaged with the direct contact of the aperture plate 290.

A film pushing device 320 is arranged in front of the aperture plate 289 in order to press the film 109 to the aperture plate 289. As shown in FIG. 33 and FIG. 35, the film pushing device 320 includes a substantially U-shaped lifter 321 and a pressure plate 323 attached to top ends of arm portions 322. A pair of pins 324 is fixed to both end portions of the pressure plate 323, and inserted through the top ends of the arm portions 322. The arm portions 322 are stopped by heads of the pins 324. Compression springs 325 are wound around the pins 324 between the arm portions 322 and the pressure plate 323. An elongated arm portion 326 and a supporting member 327 are formed integrally with the upper and lower ends of the lifter 321. The lifter 321 is rotatably supported at the elongated arm portion 326 and the supporting member 327 by the supporting shaft 307 which supports the shuttle 301. The end of the elongated arm portion 326 is within the frame 288. A cut-out portion 328 is formed in the end of the elongated arm portion 326. An aperture 329 is formed in the center of the pressure plate 323, and registered with the aperture 289 of the aperture plate 290. A groove 330 having a U-shaped cross-section is formed in the pressure plate 323, opposite to the groove 318 of the aperture plate 290.

As shown in FIG. 36 and FIG. 37, a film side guide 322 and a pair of film side stoppers 333 are arranged at both sides of the film running path 317 on the aperture plate 290. The film side guide 332 extends along the film running path 317, and fixed to the aperture plate 290 by screws 334. The film side stoppers 333 are rotatably supported by support pins 335 on the aperture plate 290, and arranged symmetrically with each other. Stopper members 336 are formed in one ends of the film side stoppers 333. Projections 337 are formed in the ends of the film side stoppers 333 opposite stopper members 336. The stopper members 336 are inserted through openings 338 made in the aperture plate 290. The film side stoppers 333 are urged in the clockwise direction and the counter-clockwise direction (FIG. 37) by tension springs 341 extended between spring receiving pins 339 fixed on the film side stoppers 333 and other spring receiving pins 340 fixed to the back surface of the aperture plate 290, so that the stopper members 336 are pressed to one sides of the film 109.

Next, operation mechanism of a film gate, which is constituted by the film pushing device 320 and the film side stopper 333, will be described.

As shown in FIG. 34 and FIG. 35, a film gate operating lever 344 is horizontally and rotatably supported by a support pin 345 under the upper wall of the frame 288. The lever 344 is projected from the front surface of the cover 105. Adjacent to the operating lever 344, a sector transmission lever 347 is rotatably supported by a support pin 346 under the upper wall of the frame 288. A slide rod 348 is horizontally arranged paralell to the aperture plate 290 under the upper wall of the frame 288, so as to be slidable in its axial direction. The film gate operating lever 344 is interconnected with the sector transmission lever 347 through a connecting link 349. And the sector transmission lever 347 is interconnected with the slide rod 348 through another connecting link 350. The film gate operating lever 344 is urged in the clockwise direction (FIG. 35) by a tension spring 353 extended between a pivotal pin 351 connecting the lever 344 with the connecting link 349 and a spring receiving pin 352 fixed to the frame 288. The slide rod 348 is urged in the downward direction (FIG. 35) by a tension spring 356 extended between a pivotal pin 354 connecting the rod 348 with the connecting link 350 and a spring receiving pin 355 fixed to the frame 288. A pin 358 fixed on the sector transmission lever 347 is engaged with an oblong hole 357 made in one end of the connecting link 350. The film gate operating lever 344 is located at one position D for closing the film gate, as shown by the dot-dash line on FIG. 35, or at another position E for opening the film gate, as shown by the solid line on FIG. 35. The position E is defined by a not shown click mechanism, and the other position D if defined by the contact of the lever 344 with a stopper pin 359 fixed on the frame 288.

As shown in FIG. 34, a slit 360 is made in the slide rod 348. The top end of the elongated arm portion 326 of the film pushing device 320 is inserted through the slit 360. The cut-out portion 328 of the elongated arm portion 326 is engaged with a pin 361 vertically fixed on the slide rod 348 in the slit 360.

As shown in FIG. 36 and FIG. 37, a slide member 363 is vertically and slidably arranged behind the aperture plate 290. A projection 364 is formed in the central portion of the slide member 363, and defines a cut-out portion 365. An L-shaped transmission lever 366 is rotatably supported by support pin 367 on the frame 288. An oblong hole 368 is formed in one end 366a of the transmission lever 366, and is engaged with a pin 369 fixed on the slide rod 348. Another end 366b of the transmission lever 366 is engaged with the cut-out portion 365 of the projection 364 of the slide member 363. A pair of slide rod members 370 are horizontally arranged behind the aperture plate 290 so as to be slidable in the axial direction. Both ends of the slide rod members 370 contact with the projections 337 of the film side stoppers 333 and both ends 363a and 363b of the slide member 363, respectively. Cam slants 371 are formed in the ends 363a and 363b of the slide member 363.

Figure 12:
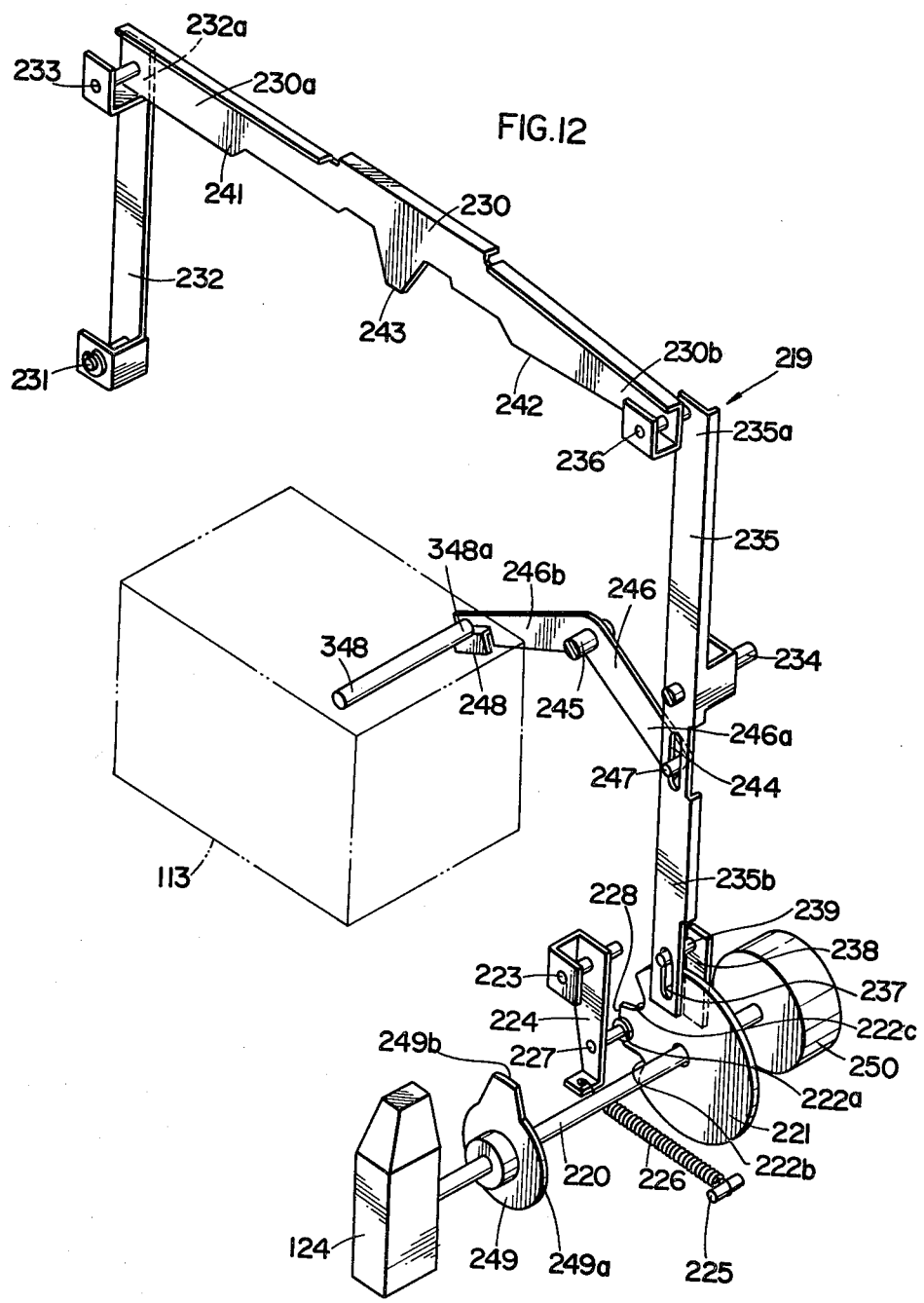
FIG. 12 is a perspective view of a mode change-over mechanism in the telecine projector.

As shown in FIG. 12, FIG. 34, and FIG. 35, one end 348a of the slide rod 384 is designed to contact with the cam portion 248 formed on the other end portion 246b of the inverted V-shaped lever 235 of the mode changeover mechanism 219.

Next, the operation of the film advancing apparatus 113 will be described.

When the film running path 317 in front of the aperture plate 290 is loaded with the film 109, the film gate is opened. As shown in FIG. 35, the film gate operating lever 344 is rotated from the one position D to the other position E against the tension spring 353. With the rotation of the film gate operating lever 344, the slide rod 348 slides downward (FIG. 35) urged by the connecting link 349, the sector transmission lever 347 and the connecting link 350 against the tension spring 356. Since the elongated arm portion 326 is engaged with the pin 361 fixed on the slide rod 348, the film pushing device 320 is rotated to the opened position as shown by the solid line in the counter-clockwise direction round the support pin 307 (FIG. 35).

With the downward slide (FIG. 35) of the slide rod 348, the slide member 363 slides upwardly (FIG. 36) urged by the transmission lever 366. The slide rod members 370 slide leftward (FIG. 36) by cam action of the cam slants 371 of the slide member 363. The projections 337 of the film side stopper 333 are pushed by one ends of the slide rod members 370. Accordingly, the upper and lower film side stoppers 333 are rotated to the opened positions in the clockwise direction and the counter-clockwise direction against the tension spring (FIG. 37). Thus, the film gate is opened. As shown in FIG. 36, the film running path 317 of the aperture plate 290 is loaded with the film 109.

Next, the film gate is closed. For closing the film gate, the film gate operating lever 344 is rotated back to the position D from the position E (FIG. 35). In the reverse order as described above, the slide rod 348 slides upwardly back (FIG. 35) urged by the tension spring 356. The film pushing device 320 is rotated to the closed position shown by the dot-dash line on FIG. 35 in the clockwise direction round the support pin 307.

At the same time, the slide member 363 is downwardly (FIG. 36). The slide rod members 370 are slid rightward urged by cam action of the cam slants 371 of the slide member 363. The upper and lower film side stoppers 333 are rotated to the original position shown by the dot-dash line on FIG. 37 in the clockwise direction and the counter-clockwise direction.

As a result of the movement of slide member 363, the pressure plate 330 of the film pushing device 320 is pressed to the aperture plate 290 against the compression springs 325. The film 109 is pressed between the aperture plate 290 and the pressure plate 330. At the same time, the stopper members 336 of the film side stoppers 333 are pressed leftward (FIG. 37) to the one side of the film 109. Accordingly, the other side of the film 109 is pressed to the film side guide 332. Thus, the film is accurately positioned on the film running path 317. The picture 109b on the film 109 is accurately registered with the aperture 289. The perforation 109a of the film 109 faces to the finger 303 of the shuttle 301. Thus, the film loading operation is finished. The film 109 can start to run forward.

Next, the advancing operation of the film 109 in the FWD running mode will be described.

As above described, the crank 295 is eccentrically driven by the motor shaft 291. The shuttle 301 is vertically reciprocated along the supporting shaft 307. In correlation with the reciprocal motion of the shuttle 301, the electromagnet 310 is intermittently energized at predetermined timed intervals and for a predetermined time. In cooperation with the leaf spring 313, the shuttle 301 is rotated back and forth round the support shaft 307.

As shown in FIG. 29, at the moment that the shuttle 301 reaches the upper position, or directly after the shuttle 301 reaches the upper position, the electromagnet 310 is energized to rotate the shuttle 301 in the counter-clockwise direction round the support shaft 307. The finger 303 of the shuttle 301 is moved in the direction shown by the arrow $a_1$ on FIG. 29, and comes to be engaged with one of the perforations 109a of the film 109. The energization of the electromagnet 310 is maintained for the predetermined time. Accordingly, while the finger 303 is engaged with the perforation 109a of the film 109, the finger 303 is vertically moved down as shown by the arrow $a_2$. The film 109 is vertically advanced down by the length F. Then, at the moment that the shuttle 301 reaches the lower position, or directly after the shuttle 301 reaches the lower position, the electromagnet 310 is deenergized. Accordingly, the shuttle 301 is rotated in the clockwise direction round the support shaft 307 by the leaf spring 313. The finger 303 is withdrawn from the perforation 109a in the direction shown by the arrow $a_3$, and so the finger 303 becomes disengaged from the perforation 109a. Then, the shuttle 301 is moved up to the upper position in the direction shown by the arrow $a_4$. The advance length F of the film 109 is designed to correspond to one pitch of the perforations 109a. Thus, the frames of the film 109 are intermittently advanced down one by one.

The shuttle 301 is moved in loop as the arrows $a_1 \rightarrow a_3 \rightarrow a_3 \rightarrow a_4$, in synchronization with the rotation of the motor 122. While the shuttle 301 is moved in loop, the electromagnet 301 is engaged at the predetermined timing to advance the film 109. If the electromagnet 301 is not energized, the film 109 is not advanced by the shuttle 301. The timing of the energization of the electromagnet 310 is controlled with the output of the film slack detecting device 114, independently of the rotation of the sector shutter plate 294. The film 109 can be advanced at an arbitrary rate between the stop and the frame advancing rate corresponding to the television field frequency (fifty or sixty frames per second).

On the other hand, the light from the lamp 292 to the picture 109b of the film 109 is intermittently intercepted by the sector shuttle plate 294 which is rotated with the motor shaft 291. The motor 122 is a DC motor, and is designed to rotate in accordance with the television field frequency. When the television field frequency is fifty fields per second, the motor 122 rotates at the rate of 3000 r.p.m. When the television field frequency is sixty fields per second, the motor 122 rotates at the rate of 3600 r.p.m. Accordingly, the video signal transmitted from the film 109 to the television camera through the optical system 121 is synchronized with television frequency (fifty or sixty fields per second).

When the actuating knob 124 is rotated from the FWD position B to the STOP position A, the forward running of the film 109 is stopped. And when the actuating knob 124 is rotated from the STOP position A to the REW position C, the inverted V-shaped lever 246 is rotated in the clockwise direction (FIG. 12). As shown in FIG. 34 and FIG. 35, the top end 348a of the slide rod 348 is pushed by the cam portion 248 of the inverted V-shaped lever 246. The slide rod 348 slides downward (FIG. 35). As a result, in the same manner as in the case when the film gate operating lever 344 is rotated to the position E, the film gate is opened, and the film 109 is smoothly run to be rewound on the supply reel.

When the film urgent stop switch 119 is turned on in the FWD running of the film 109, the electromagnet 310 is urgently deenergized, and the shuttle 301 is rotated in the clockwise direction (FIG. 29) by the leaf spring 313 to disengaged the finger 303 from the perforation 109a of the film 109. The FWD running of the film 109 is urgently stopped.

Next, the details of the film slack detecting device 114, the film constant drive mechanism 117 and constructions associated with them will be described with reference to FIG. 38 to FIG. 47.

The capstan 115 is rotatably supported by a bearing 374 on the base plate 104. A fly wheel 375 is fixed to a free end of the capstan 115. A pulley 376 is fixed to the fly wheel 375. A belt 377 is wound on the pulley 376 and the pulley 154 fixed to the motor shaft 152 of the film drive motor 123.

Behind the capstan 115 and the magnetic head 120, a movable base plate 379 is vertically arranged in front of the base plate 104. As shown in FIG. 38, the movable base plate 379 is supported near its leftward end by a support pin 380 so as to be rotatable relative to the base plate 104. An interconnecting lever 381 is arranged above the cam plate 249 fixed to the shaft 220 for the actuating knob 124. The interconnecting lever 381 is rotatably supported by a support pin 382. A pin 383 fixed on one end 381a of the interconnecting lever 381 is engaged with an oblong hole 384 made in a rightward end 379a of the movable base plate 379. The base plate 379 is urged in the clockwise direction (FIG. 38) round the support pin 380 by a tension spring 386 extended between a part of the movable base plate 379 and an anchor 385 fixed to the base plate 104. The clockwise rotation of the movable base plate 379 is restricted in the manner that a cam follower roller 387 pivoted to the interconnecting lever 381 contacts with the circumference of the cam plate 249. The cam plate 249 consists of a circular portion 249 concentric with the shaft 220, and a projected cam portion 249b.

Figure 43:
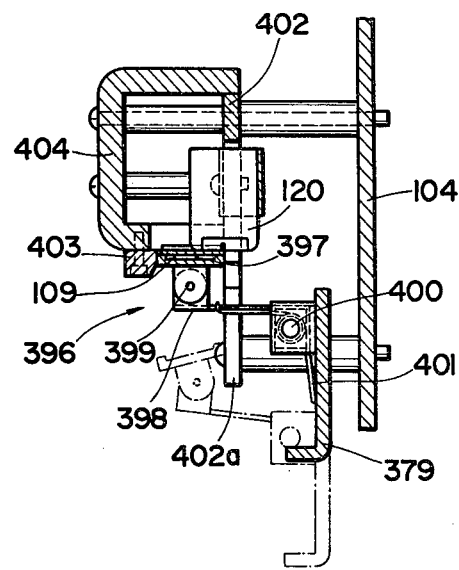
FIG. 43 is an enlarged cross-sectional view taken along the line 43—43 of FIG. 39.
Figure 44:
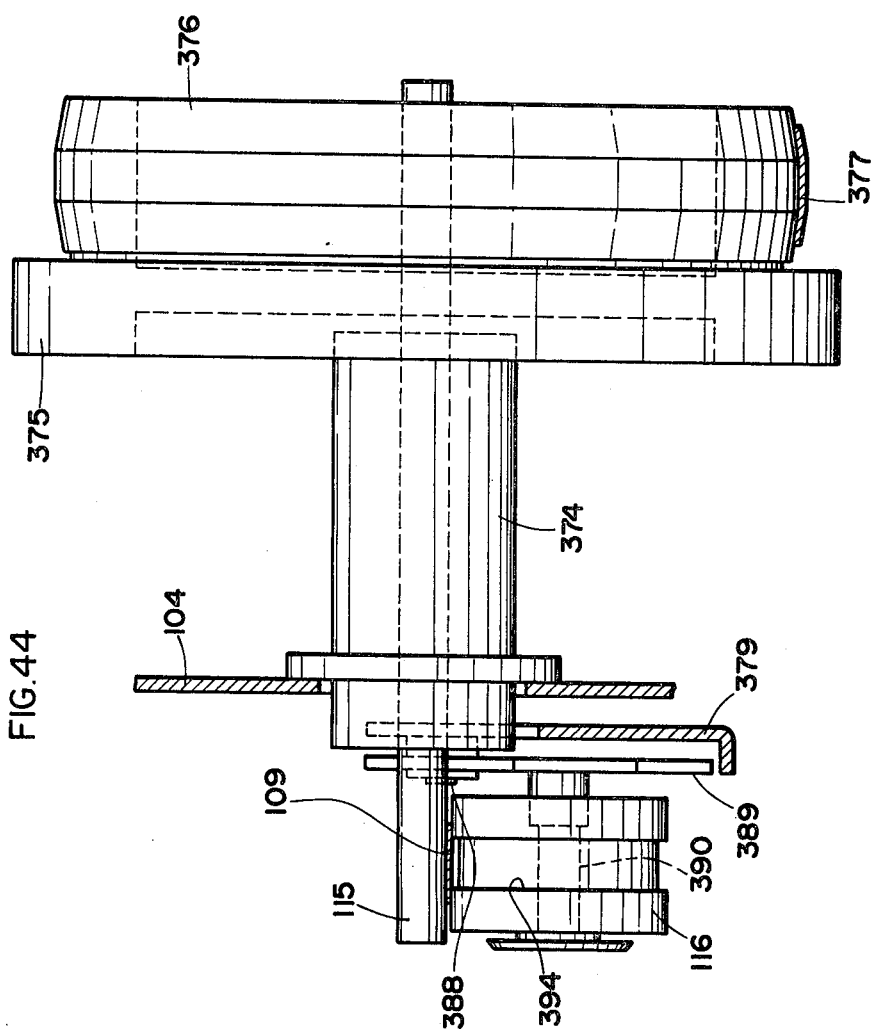
FIG. 44 is an enlarged cross-sectional view taken along the line 44—44 of FIG. 39.
Figure 45:
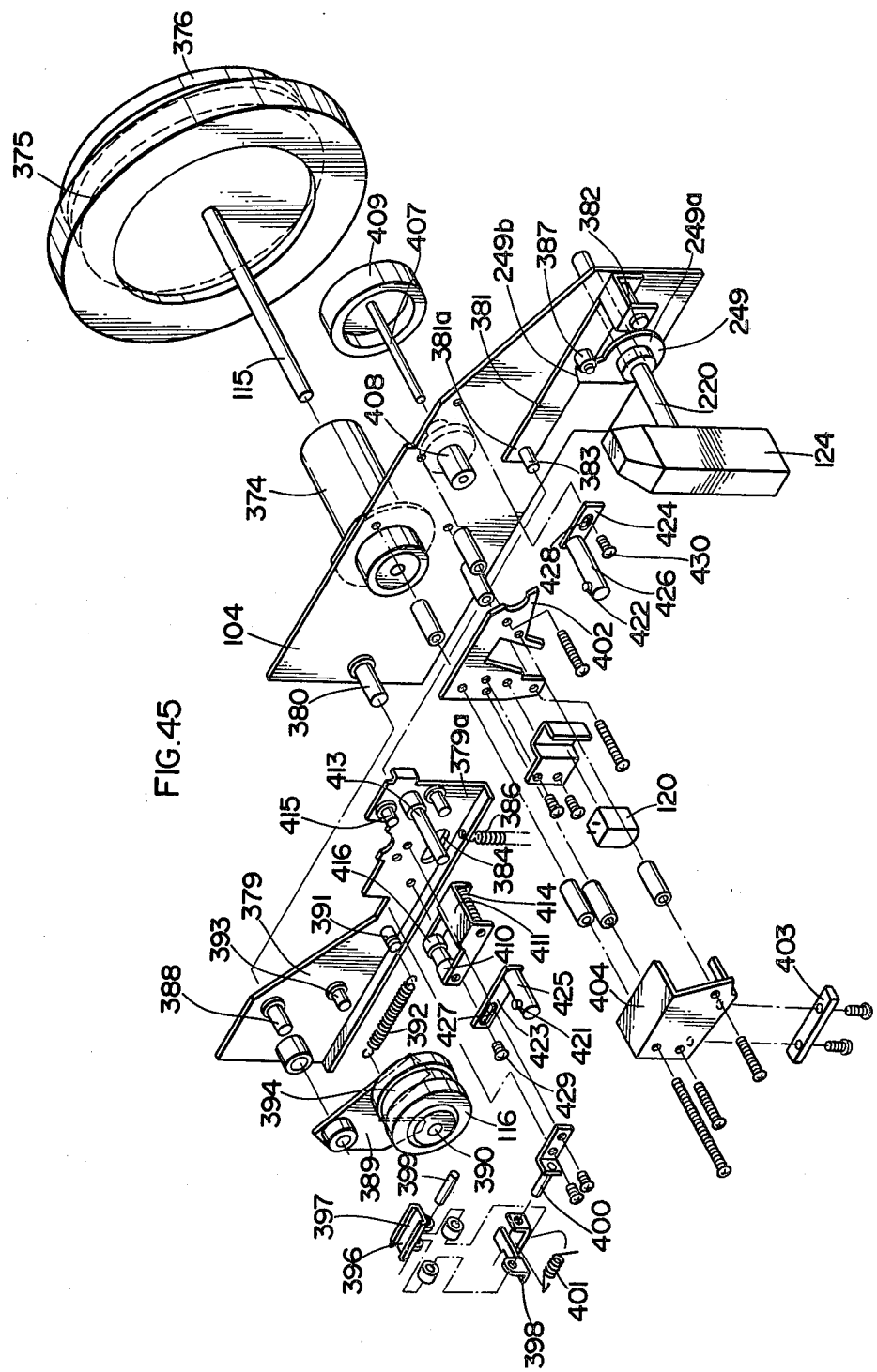
FIG. 45 is an enlarged and exploded perspective view of FIG. 38.
Figure 46:
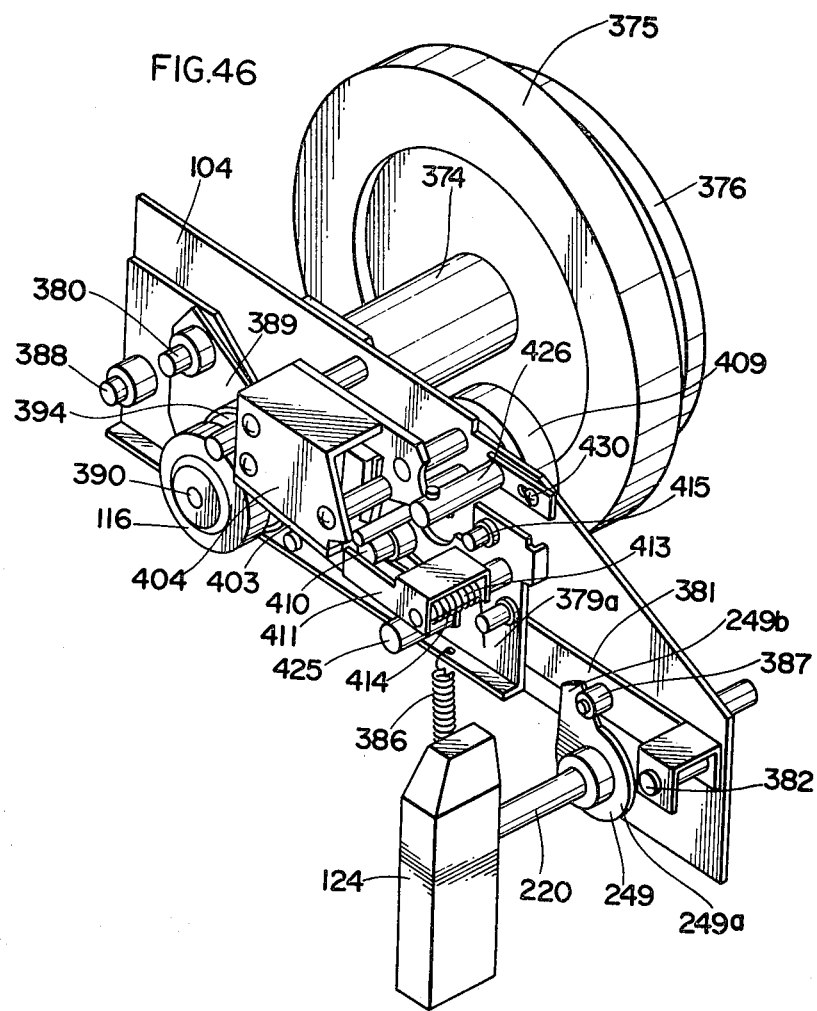
FIG. 46 is an enlarged perspective view of assembled parts of FIG. 45.

The pinch roller 116 is supported by a pin 390 fixed on one end 389a of a V-shaped pinch roller lever 389 which is rotatably supported by a support pin 388 on the movable base plate 379. The pinch roller lever 389 is urged in the counter-clockwise direction (FIG. 38) round the pin 388 by a tension spring 392 extended between another end 389b of the pinch roller lever 389 and a spring receiving pin 391 fixed on the movable base plate 379. The counter-clockwise rotation of the pinch roller lever 389 is restricted by contact of the pinch roller lever 389 with a stopper pin 393. An annular groove 394 is made in the circumference of the pinch roller 116 in order to prevent the picture 109b of the film 109 from being damaged with the contact of the circumference of the pinch roller 116. A film pushing member 396 is arranged for pressing the film 109 to the magnetic head 120 on the movable base plate 379. As shown in FIG. 43, the magnetic head 120 is downwardly supported on a head base plate 402. The film pushing member 396 is formed of a low frictional synthetic resin such as Delrin. A groove 397 having a V-shaped cross-section is formed in the film pushing member 396 in order to prevent the picture 109b of the film 109 from being damaged. The film pushing member 396 is pivoted to a pin 399 fixed on an upper end of an L-shaped support lever 398 which is rotatably supported at another end by a pin 400. The support lever 398 is urged in the clockwise direction (FIG. 43) by a torsion spring 401 wound on the pin 400. The film pushing member 396 is guided in contact with a part 402a of the head base plate 402. A film guide 403 is arranged adjacent to the magnetic head 120, and is fixed on the lower surface of a guide holder 404 fixed on the head base plate 402, parallel to the head base plate 402. The film 109 is restricted at both sides by the film guide 403 and the head base plate 402. The magnetic head 120 exactly contacts with a sound magnetic track on the film 109.

Figure 42:
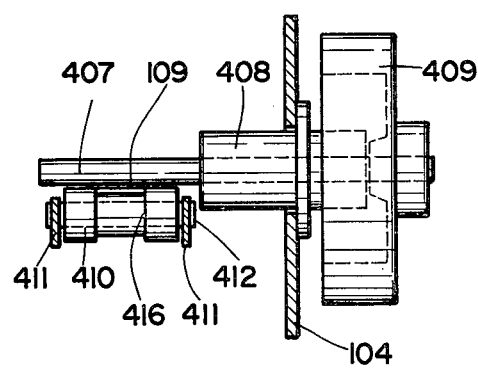
FIG. 42 is an enlarged cross-sectional view taken along the line 42—42 of FIG. 39.

In the film constant drive mechanism 117, as apparently shown in FIG. 38, the capstan 115 is arranged at the left side of the magnetic head 120. And an impedance roller constituting a rotary shaft providing a fly wheel effect is arranged at the right side of the magnetic head 120. As shown in FIG. 42, the impedance roller 407 is supported by a bearing 408 on the base plate 104. A fly wheel 409 is fixed to a free end of the impedance roller 407. A pinch roller 410 is arranged for pressing the film 109 to the impedance roller 407, and is rotatably supported by a pinch roller shaft 412 fixed on a top end of a U-shaped pinch roller lever 411 which is rotatably supported by a support pin 413 fixed on the left end 379a (FIG. 38) of the movable base plate 379, and urged in the clockwise direction by a torsion spring 414 wound on the support pin 413. The clockwise rotation of the pinch roller lever 411 is restricted by contact of the pinch roller lever 411 with a stopper pin 415 fixed on the movable base plate 379. An annular groove 416 is made in the pinch roller 410 in order to prevent the picture 109a of the film 109 from being damaged.

The film slack detecting device 114 is positioned at a film slacking portion 420 under the film advancing apparatus 113. The film slack detecting device 114 consists of a light emitting element 421 and a photo-sensing element 422. The light emitting element 421 is attached to the movable base plate 379, directed obliquely and upwardly, while the photo-sensing element 422 is attached to the base plate 104, directed obliquely and downwardly. The light emitting element 421 and the photo-sensing element 422 are fixed on end portions of poles 425 and 426 which are fixed on top ends of support levers 423 and 424, respectively. Oblong holes 427 and 428 are made in the support levers 423 and 424. The support levers 423 and 424 are fixed to the movable base plate 379 and the base plate 104 by screws 429 and 430 inserted through the oblong holes 427 and 428. The positions of the support levers 423 and 424, and therefore the positions of the light emitting element 421 and of the photo-sensing element 422 can be adjusted by loosening the screws 429 and 430.

When the movable base plate 379 is displaced to the position shown by the solid line on FIG. 39 for the FWD mode, the light R from the light emitting element 421 is incident on the photo-sensing element 422. Since the photo-sensing element 422 is directed downwardly, the external light from a room lamp is not incident on the photo-sensing element 422. Thus, misoperation can be prevented.

Next, operations of the film slack detecting device 114 and of the film constant drive mechanism 117 will be described.

In the stop mode, the actuating knob 124 is located at the STOP position. FIG. 38 shows the stop mode of the film slack detecting device 114 and the film constant drive mechanism 117. The roller 387 of the interconnecting lever 381 contacts with the circular portion 249a of the cam plate 249. The movable base plate 379 is maintained at the lower position by the tension spring 386. Accordingly, the pinch roller 116, the film pushing member 396 and the pinch roller 410 are separated from the capstan 115, the magnetic head 120 and the impedance roller 407, respectively.

Thus, when in the stop mode, the light R from the light emitting element 421 is not incident on the photo-sensing element 422. Even though the power switch is turned on in such a condition, the film advancing apparatus 113 does not operate to advance the film.

The film running path is loaded with the film 109 in the stop mode. The power switch is turned on. The actuating knob 124 is rotated to the FWD position B. As a result, the film slack detecting device 114 and the film constant drive mechanism 117 is displaced as shown in FIG. 39. With the rotation of the actuating knob 124, the roller 387 of the interconnecting lever 381 rides on the projected cam portion 249b of the cam plate 249. The interconnecting lever 381 is rotated to the horizontal position in the clockwise direction against the tension spring 386. With the rotation of the interconnecting lever 381, the movable base plate 379 is rotated to the horizontal position in the clockwise direction round the support pin 380 through the pin 383 fixed on the end of the interconnecting lever 381. As a result, the pinch roller 116, the film pushing member 396, and the pinch roller 410 are pressed to or contact with the capstan 115, the magnetic head 120 and the impedance roller 407, respectively. In such a condition, the light R from the light emitting element 421 is incident on the photo-sensing element 422.

With the rotation of the actuating knob 124 to the FWD position B, the motor 123 is driven, and the rotation of the motor shaft 152 is transmitted to the capstan 115 through the pulley 154, the belt 377 and the pulley 376. The capstan 115 is rotated in the clockwise direction (FIG. 39), providing a fly wheel effect. The film advancing apparatus 113 works. Some slack of the film 109 takes place in the film slacking portion under the film advancing apparatus 113. The film 109 is transported in the direction shown by the arrow by the capstan 115. The film 109 passes by the magnetic head 120 at the constant speed. Audio signals are reproduced from the film by the magnetic head 120.

In the film constant drive mechanism 117, the impedance roller 407 providing a fly wheel effect is arranged between the film slacking portion 420 and the magnetic head 120. The advanced film 109 is pressed between the impedance roller 407 and the pinch roller 410. In the FWD running of the film 109, the impedance roller 407 is rotated, according to the film advancing speed determined by the capstan 115 of the constant drive mechanism 117. The film 109 is run at a stable rate in tension between the impedance roller 407 and the capstan 115 and the film 109 is in stable contact with the magnetic head 120, and does not flutter when it passes adjacent to the magnetic head 120.

Since the film 109 is intermittently advanced down from the film advancing apparatus 113, shock is transmitted to the film 109 in the loop of film slacking portion 420. If the impedance roller 407 is not provided, the shock would be transmitted to the film 109 contacting with the magnetic head 120. The film 109 would flutter near the magnetic head 120 to generate some sound. Although no noise is reproduced from the magnetic track portions of the film 109 on which no audio signal is recorded, modulation noise due to the flutter of the film 109 is generated from the magnetic track portions of the film 109 on which audio signals are recorded.

According to this example of the film constant drive mechanism 117, the film 109 is pressed between the impedance roller 407 and the pinch roller 410 which are arranged between the film slacking portion 420 and the magnetic head 120. The shock is almost stopped at the impedance roller 407, and so it is little transmitted to the film 109 contacting with the magnetic head 120. The film 109 does not flutter at the magnetic head 120. The modulated noise is substantially prevented. Audio signals can be reproduced from the film 109 with high quality. With the reduction of the modulated noise, the flutter of the reproduced sound could be reduced by about fifty percent in comparison with a conventional telecine projector. Although the impedance roller 407 is not directly driven in this embodiment, it may be driven at a speed slightly lower than the capstan 115, by an electric motor.

A certain slack of the film 109 in the film slacking portion 420 is optically detected by the film slack detecting device 114 to control the film advancing apparatus 113.

Figure 47:
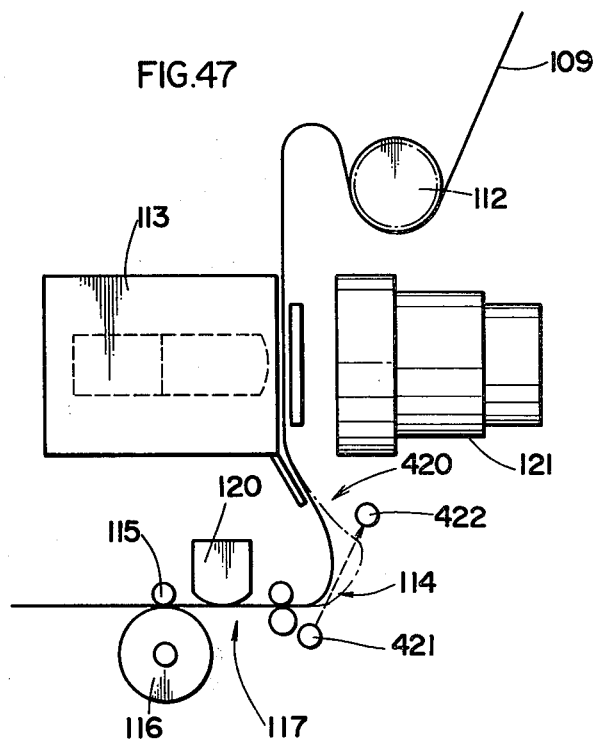
FIG. 47 is schematic side view of a film slack detecting device part in the telecine projector.

As shown in FIG. 47, when the slack of the film 109 is less than a predetermined amount, the light R from the light emitting element 421 is incident on the photo-sensing element 422. An output is obtained from the photo-sensing element 422. A gate in a power circuit for the electromagnet 310 is closed with the output of the photo-sensing element 422. The electromagnet 310 is energized at predetermined timed intervals to advance the film 109. The intermittent advance of the film continues. When the slack of the film 109 becomes more than the predetermined amount as shown by the dot-dash line in FIG. 47, the light R from the light emitting element 421 is intercepted by the film 109. The light R is no longer incident on the photo-sensing element 422. The output is not obtained from the photo-sensing element 422. The gate in the power circuit for the electromagnet 310 is opened. The electromagnet 310 comes not to be energized. The intermittent advance of the film 109 is stopped. The slack of the film 109 is decreased more and more with the film drive of the capstan 115. When the slack of the film 109 again becomes less than the predetermined amount, an output is provided from the photo-sensing element 422. Then, the intermittent advance of the film 109 is again started.

When the actuating knob 124 is rotated back to the STOP position A from the FWD position B in the FWD mode, the cam plate 249 is positioned as shown in FIG. 38. The movable base plate 379 is rotated to the position shown in FIG. 38, in the clockwise direction by the tension spring 386. The pinch roller 116, the film pushing member 396 and the pinch roller 410 are separated from the capstan 115, the magnetic head 120 and the impedance roller 407, respectfully. The beam of light R from the light emitting element 421 is deviated from the photo-sensing element 422, as shown in FIG. 38, and the photo-sensing element 422 does not provide an output. The intermittent advance of the film 109 by the film advancing apparatus 113 is stopped.

When the actuating knob 124 is rotated to the REW position C from the STOP position A, the roller 387 is not moved upward, since the roller 387 is positioned on the circular portion 249a of the cam plate 249. Thus, the movable base plate 379 is maintained at the position shown in FIG. 38.

The telecine projector 101 is so designed to be changed over to the REW running mode from the FWD running mode merely with the rotation of the actuating knob 124, so that the film 109 remains threaded in the film running path. After the motor 122 is deenergized, it still continues to rotate for several seconds (about three seconds) due to its inertia. If the slack of the film 109 in the film slacking portion 420 is less than the predetermined amount, and the output is obtained from the photo-sensing element 422, the electromagnet 310 is energized to drive the finger 303 of the shuttle 301 into the perforation 109a of the film 109. Accordingly, when the projector 101 is changed over continuously from the FWD running mode to the REW running mode through the STOP mode, the finger 303 would be engaged with the perforation 109a of the film 109 which is now running backward. The motion of the finger 303 engaged with the perforation 109a of the film 109 would be opposite to the motion of the film 109. Accordingly, the perforation 109a of the film 109 would be damaged by action of the finger 303.

However, according to the telecine projector 101 of the present invention, the light R from the light emitting element 421 is deviated from the photo-sensing element 422 with the rotation of the movable base plate 379, as soon as the actuating knob 124 is changed over from the FWD position B to the STOP position A. The output is not obtained from the photo-sensing element 422, and so the electromagnet 310 is deenergized. The finger 303 is withdrawn and disengaged from the perforation 109a of the film 109 by function of the leaf spring 313. Thus, the above-described interaction between the mode change-over mechanism 219 and the slack detecting device 114 prevents damage to the film 109 during rewind.

According to this embodiment, an extra switch is not required for shutting off electric power to the electromagnet 310 when the actuating knob 124 is changed over to the STOP position A from the FWD position B. The above-described damage to the film 109 can be prevented by a mechanism of comparatively simple construction. At the same time that the capstan 115 and the magnetic head 120 is pressed to the pinch roller 116 and the film pushing member 396, the light R from the light emitting element 421 is directed to the photo-sensing element 422, and the film is advanced in the above described manner. And at the same time that the capstan 115 and the magnetic head 120 are separated from the pinch roller 116 and the film pushing member 396, the intermittent advance of the film 109 is stopped. Thus, the projector 101 according to this embodiment provides smooth operation characterized by coordinated movement of the film 109 between the film constant drive mechanism 117 and the film advancing apparatus 113.

Figures 48, 49:
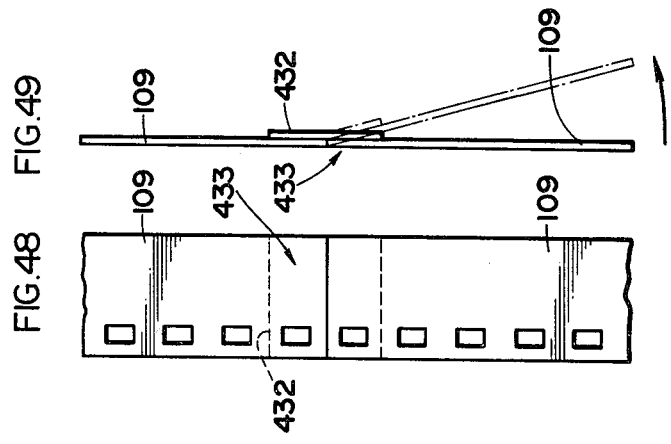
FIG. 48 is a front view showing the connection of the film.
FIG. 49 is a side view of FIG. 48.

Quite often, it happens that two films 109 are connected to each other by a splicing tape 432, as shown in FIG. 48 and FIG. 49. Such a film 109 is apt to be bent at a sharp angle at its splice or connection portion 433. Accordingly, there is the possibility that the film slack detecting device 114 can be misoperated as a result of the sharp bend at the connection portion 433 of the film 109.

However, according to this embodiment, a film guide 434 is formed at the lower end of the film running path 317 of the aperture plate 290, as shown in FIG. 23, FIG. 30, FIG. 33 and FIG. 47, to avoid the above-described fear. For example, the film guide 434 is arcuately formed integrally with the lower end of the film running path 317.

Figure 50:
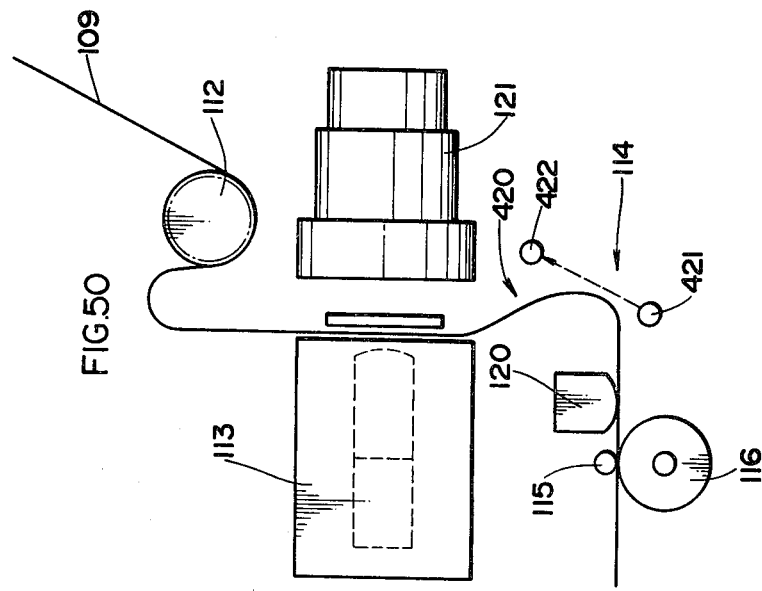
FIG. 50 is a side view showing the comparison example for FIG. 47.

FIG. 50 shows a part of a telecine projector having no such a film guide shown for sake of comparison. In that telecine projector, the connecting portion 433 of the film 109 behaves as shown in FIG. 51A to FIG. 51D, in the film slacking portion 420 under the film advancing apparatus 113.

In FIG. 51A, the connecting portion 433 of the film 109 is positioned at the lower end of the pressure plate 323 of the film pushing device 320. The upper part 109c of the film 109 above the connecting portion 433 is straight, while the lower part 109d of the film 109 under the connecting portion 433 is arcuately bent in the film slacking portion 420.

In FIG. 51B, the film 109 is advanced from the position of FIG. 51A. The connecting portion 433 is withdrawn from the pressure plate 323 of the film pushing device 320. Since the upper portion 109c of the film 109 is straight, the lower portion 109d of the film 109 is bent sharply. The light R from the light emitting element 421 is still incident on the photo-sensing element 422. Accordingly, the film 109 is further advanced from the position of the FIG. 51B.

In FIG. 51C, the upper portion 101C is bent near the connecting portion 433. Accordingly, the connecting portion 433 is moved sharply rightward. The light R from the light emitting element 421 is intercepted by the film 109, although the slack of the film 109 is actually less than the predetermined amount. The film advance is temporarily stopped. Thus, the film advancing mechanism 113 tends to misoperate when the film 109 contains a splice.

The film 109 is driven by the capstan 115, and the light R from the light emitting element 421 is again incident on the photo-sensing element 422, as shown in FIG. 51D. However, the slack of the film 109 is undesirably little.

On the other hand, in the telecine projector 101 according to this embodiment, the connecting portion 433 of the film 109 behaves as shown in FIG. 52A to FIG. 52D.

In FIG. 52A, the film 109 behaves substantially in the same manner as in FIG. 51A. However, in FIG. 52B, the connecting portion 433 is guided along the film guide 434, and so the lower end of the upper portion 109C of the film 109 is gently curved. The film 109 is not angledly bent at the connecting portion 433. The connecting portion 433 has little influence on the loop of the film 109 in the film slacking portion 420.

As shown in FIG. 52C, when the film 109 is further advanced from the position of FIG. 52B, the film 109 is less bent at the connecting portion 433 than the film 109 in FIG. 51C. The connecting portion 433 is not moved rightward so much as the connecting portion 433 in FIG. 51C. Accordingly, the light R from the light emitting element 421 is not unexpectedly intercepted by the film 109. The misoperation is avoided.

The film 109 is further advanced from the position of FIG. 52C, and the normal slack of the film 109 is maintained.

The inclination angle $\theta_1$ (FIG. 23 and FIG. 53) of the arcuate film guide 434 is preferably 20° to 45°, and most preferably 30°. As shown in FIG. 53, a guide roller 436 may be arranged at the lower end of the film guide 434. At that case, the film 109 tensioned as shown by the dot-dash line on FIG. 53 can be prevented from damaging at the lower end of the film guide 434.

As shown in FIG. 54, a triangular block 437 having a slant surface 437a may be used as the film guide 434. Or as shown in FIG. 55, an inclined plate 438 may be used as the film guide 434. The inclination angle $\theta_2$ of the film guides 437 and 438 is preferably about 30°. The film guide 438 of FIG. 55 is fixed by an adjust screw 439, and so the inclination angle $\theta_2$ of the film guide 438 can be adjusted to a desired angle.

Next, control of the film advancing apparatus 113 will be described with reference to the block diagram of FIG. 56.

Figure 56:
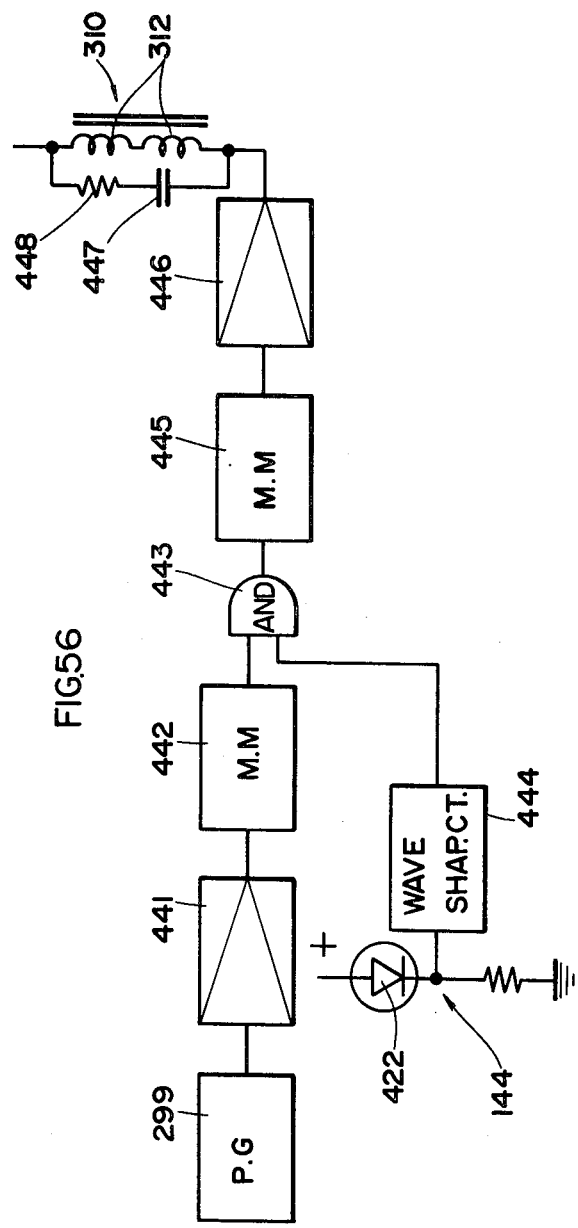
FIG. 56 is a block diagram of a control circuit for an electromagnet in the film advancing apparatus.

In the control circuit shown in FIG. 56, output of a pulse generator 299 is applied through an amplifying-/waveform-shaping circuit 441 and a monostable multivibrator for delay 442 to one input terminal of an AND gate 443. An output terminal of the photo-sensing element 422 in the film slack detecting device 114 is connected to an input terminal of a waveform shaping circuit 444. An output terminal of the waveform shaping circuit 444 is connected to another input terminal of the AND gate 443. An output terminal of the AND gate 443 is connected to an input terminal of a monostable multivibrator 445. Output of the monostable multivibrator 445 is applied through an amplifier 446 to the winding 312 of the electromagnet 310. A damper circuit consisting of a resistor 448 and a capacitor 447 is connected in parallel with the winding 312.

In the FWD running of the film 109, the running speed of the film 109 is detected by the film advance converter 281. The ladder wheel 258 is rotated with the FWD running of the film 109. Pulse signals are generated from the photo-sensing element 285 of the photo-coupler 282 in synchronization with the running speed of the film 109.

The detecting signal of the film advance converter 281 is compared with a reference signal which can be arbitrarily set. The film drive motor 123 is controlled with the comparison signal, so as to rotate at the constant speed. Accordingly, the capstan 115 is rotated at the constant rate to drive the film 109 at the constant speed.

On the other hand, the motor 122 in the film advancing apparatus 113 is rotated at the rate corresponding to the television field frequency. When the television field frequency is sixty fields per second, the motor 122 is rotated at the rate of 3600 r.p.m. Or when the television field frequency is fifty fields per second, the motor 122 is rotated at the rate of 3000 r.p.m.

As described above, the rotational speed of the motor 122 is detected by the pulse generator 299. Pulse signals are generated from the coil 298 of the pulse generator 299 in synchronization with the rotational speed of the motor 122. The rotation of the motor 122 is converted to the reciprocal motion of the shuttle 301. Accordingly, the pulse signals generated from the pulse generator 299 are in synchronism with the reciprocal motion of the shuttle 301.

On the other hand, in the film slacking portion 114. When the slack of the film 109 is less than the predetermined amount, the output is obtained from the photo-sensing element 422. And when the slack of the film 109 becomes more than the predetermined amount, the output is not obtained from the photo-sensing element 422.

In the control circuit of FIG. 56, the pulse signals are generated from the pulse generator 299 at the same frequency as the television field frequency. The pulse signals are amplified and waveshaped by the amplifying/waveshaping circuit, delayed by a predetermined time by the monostable multivibrator 442, and then applied to the one input terminal of the AND gate 443.

At the moment that the slack of the film 109 in the film slacking portion 420 becomes less than the predetermined amount, the output is generated from the photo-sensing element 422, waveshaped by the waveshaping circuit 444 and then applied to the other input terminal of the AND gate 443. And at the moment that the slack of the film 109 in the film slacking portion 420 becomes more than the predetermined amount, the output from the photo-sensing element 422 ceases, and so no output is applied to the other input terminal of the AND gate 443. So long as the slack of the film 109 in the film slacking portion 420 is less than the predetermined amount, pulse signals are obtained from the AND gate 443, and are applied through the monostable multivibrator 445 to the amplifier 446. The amplifier 446 is constituted as a switching circuit. When the pulse signals from the monostable multivibrator 445 are at the higher level, the amplifier 446 is connected to ground. When the pulse signals from the monostable multivibrator 445 are at the lower level, the amplifier 446 is disconnected from ground.

The delay time of the monostable multivibrator 442 is so selected that the time when the shuttle 301 reaches the upper position coincides with the leading edge of the pulse signal from the monostable multivibrator 445, and the width of the pulse signal from the monostable multivibrator 442 is so determined as to coincide with the length F of the advance of the film 109.

So long as the slack of the film 109 in the film slacking portion 420 is less than the predetermined amount, the output is obtained from the AND gate 443, and the winding 312 of the electromagnet 310 is intermittently energized at the above described timing to advance the film 109. At the moment that the slack of the film 109 becomes more than the predetermined amount, the output is not obtained from the AND gate 443, and the winding 312 of the electromagnet 310 is deenergized to stop the advance of the film 109. And at the moment that the slack of the film 109 becomes less than the predetermined amount, the advance of the film 109 is started.

According to this embodiment, the film 109 can be advanced in accordance with the arbitrarily predetermined running speed of the film 109. Accordingly, the film 109 can be advanced at any rate between the zero frequency (stop) and the television field frequency. The so called "shutter bar" never appears on the picture of the television receiver.

The telecine projector 101 according to one embodiment of this invention can be used in synchronization with a tape recorder. Such a method is called "pulse synchronization method". Next, the method will be described with reference to the control circuit of FIG. 57.

Figure 57:
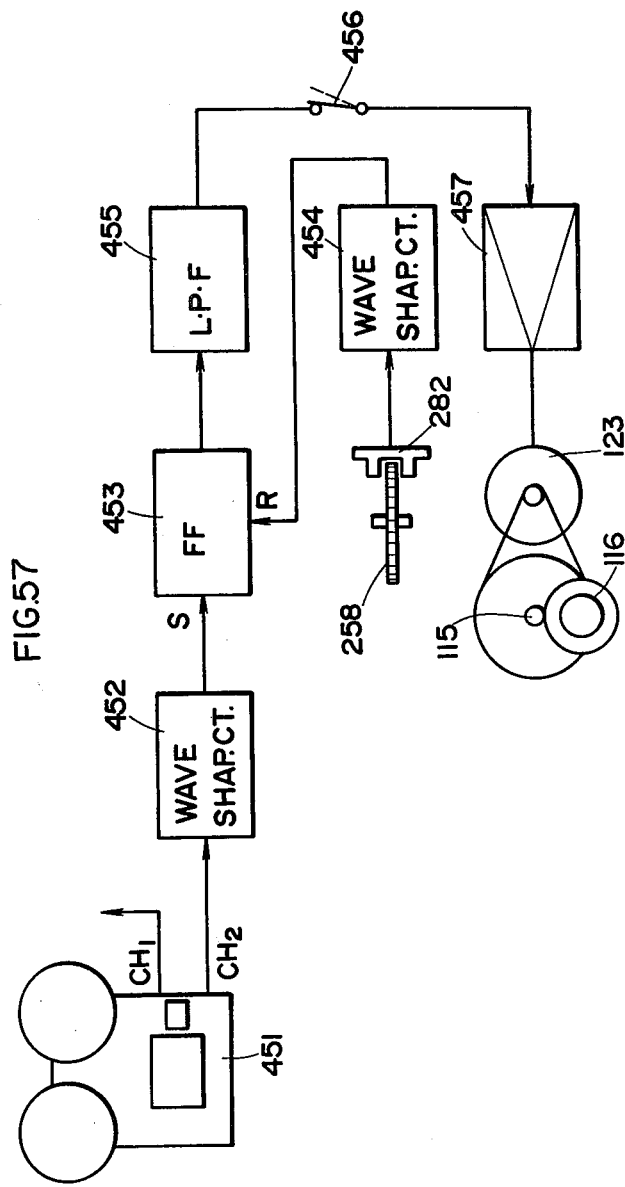
FIG. 57 is a block diagram of a synchronization drive circuit for the projector and a tape recorder.

Referring to FIG. 57, sound signals are reproduced from a first channel $CH_1$ of a magnetic tape in a tape recorder 451 Frame pulse signals at regular intervals are reproduced from a second channel $CH_2$ of the magnetic tape. The frame pulse signals are applied to a waveshaping circuit 452. An output terminal of the waveshaping circuit 425 is connected to a set terminal S of a flip-flop 453. An output terminal of the photo-sensing element 285 of the photo-coupler 282 in the film advance converter 281 is connected to another waveshaping circuit 454. An output terminal of the waveshaping circuit 454 is connected to a reset terminal R of the flip-flop 453. The output of the flip-flop 453 is applied through a low pass filter 455 and a change-over switch 456 for pulse synchronization and pulse asynchronization to a servo-amplifier 457 for the film drive motor 123.

In the FWD running of the film 109, the frame pulse signals at the regular intervals are reproduced from the second channel $CH_2$ at the same time that the audio signals are reproduced from the first channel $CH_1$. The frame pulse signals are waveshaped by the waveshaping circuit 452, and applied to the set terminal S of the flip-flop 453 to set the flip-flop 453 at the regular intervals.

The running speed of the film 109 is detected by the frame advance converter 281. Pulse signals are generated from the photo-sensing element 285 of the photocoupler 282 in synchronization with the film-frame advancing rate, waveshaped by the waveshaping circuit 454 and then applied to the reset terminal R of the flip-flop 453 to reset the latter. The width of the pulse signal from the flip-flop 453 corresponds to the phase difference between the frame pulse signals from the tape recorder 451 and the pulse signals synchronized with the film-frame advance rate from the photo-sensing element 285 of the photo-coupler 282. The output of the flip-flop 453 is applied to the low-pass filter 453 to be converted to a level signal corresponding to the phase difference.

When the switch 456 is changed over to the position for pulse synchronization shown by the solid line on FIG. 57, the level signal is applied to the servo-amplifier 457 to control the motor 123. Thus, the running of the film 109 driven by the capstan 115 is automatically controlled so as to be synchronized with the frame pulse signals from the tape recorder. As the result, the film-frame advancing rate is synchronized with the frame pulses from the tape recorder 455. The picture of the film 109, reproduced on the screen of the television receiver is synchronized with the audio signals reproduced in the tape recorder 455.

Figure 58:
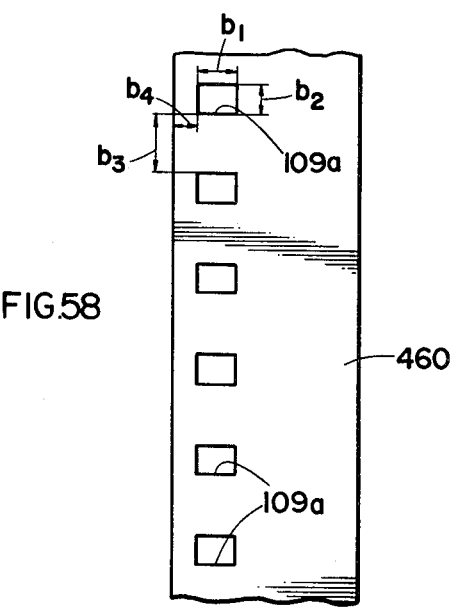
FIG. 58 and FIG. 59 are front views of 8 mm films.
Figure 59:
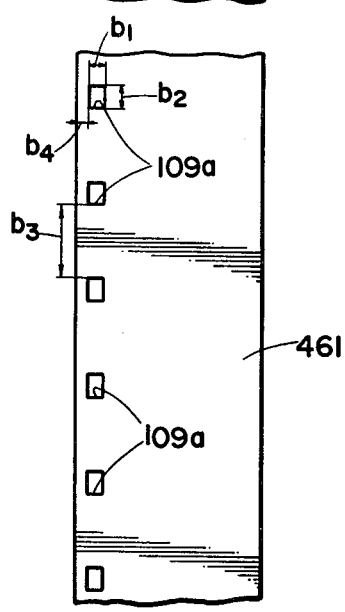

There are normally two kinds of films as the 8 mm film. One is known as "regular eight" or "R-8", shown in FIG. 58. The other is known as "super eight" or "S-8", shown in FIG. 59. In the R-8 film 460 of FIG. 58, length $b_1$ of the perforation 109a is 1.8 mm, width $b_2$ thereof is 1.2 mm, pitch $b_3$ of the perforations 109a is 2.5 mm and distance $b_4$ between the perforation 109a and one edge of the film 109 is 1 mm. On the other hand, in the S-8 film 461 of FIG. 59, $b_1$, $b_2$, $b_3$ and $b_4$ are 0.8 mm, 1 mm, 3 mm and 0.5 mm, respectively.

The finger 303 of the shuttle 301 is operated within the slit 308 made in the aperture plate 290. When the position of the finger 303 is designed for the perforation 109a of the S-8 film 461, the R-8 film 460 should be displaced by 0.5 mm sideways from the position for the S-8 film 461 in order that the finger 303 can be engaged with the perforation 109a of the R-8 film 460.

Figure 62:
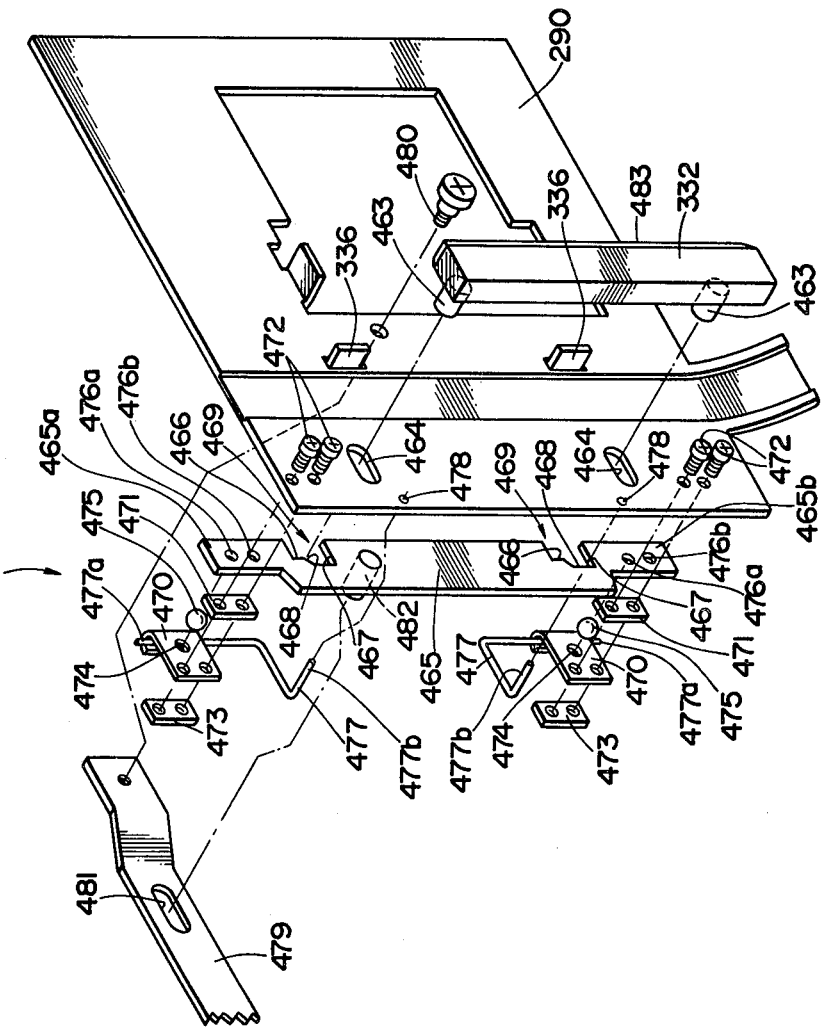
FIG. 62 is an exploded perspective view of FIG. 61.

Next, a film format change-over apparatus 462 for adjusting the film position will be described with reference to FIG. 60–FIG. 62.

A pair of cam follower pins 463 is fixed to both ends of the film side guide 332. The pins 463 are inserted through oblong holes 464 made in the aperture plate 290, and projected from the back of the aperture plate 290. Behind the aperture plate 290, a slide member 465 is arranged in parallel with the film side guide 332. In the slide member 465, a pair of cut-out portions 469 is made near upper and lower ends 465a and 465b. The cut-out portions 469 consist of upper and lower steps 466 and 467, and slants 468 connecting the upper steps 466 with the lower steps 467, respectively. The cam follower pins 463 are engaged with the cut-out portions 469. A pair of leaf springs 470 is arranged behind the upper and lower ends 465a and 465b of the slide member 465. The leaf springs 70 are fixed at their one end portions to the aperture plate 290 with spacers 471 interposed between the leaf springs 470 and the aperture plate 290, by means of screws 472 and rectangular nuts 473. In the leaf springs 470, round holes 474 for holding steel balls are made near central portions of the leaf spring 470. A pair of steel balls 475 is interposed between the round holes 474 of the leaf springs 470 and the backs of the upper and lower ends 465a and 465b of the slide member 465. Positioning holes 476a and 476b are made in the upper and lower ends 465a and 465b of the slide member 465, respectively. The slide member 465 is located at the upper position or lower position in such a manner that the steel balls 475 are fitted selectively to the positioning hole 476a or 476b of the slide member 465. The ends of the leaf springs 470 remote from the screws 472 are bent into a U shape. Portions at one end 477a of each of wire springs 477 are fixed to the U-shaped ends of the leaf springs 470. The other ends 477b of the wire springs 477 are inserted through holes 478 made in the aperture plate 290 and fixed thereto. The pins 463 of the film side guide 332 are pressed to the upper steps 466 of the cut-out portions 469 or to the lower steps 467 of the cut-out portions 469, by the wire springs 477. The upper and lower ends 465a and 465b of the slide member 465 are pressed to the spacers 471 by action of the wire springs 477. Accordingly, the slide member 465 slides upward and downward along the spacers 471, restricted by the latter.

A film format change-over lever 479 is pivoted to a support pin 480 fixed on the aperture plate 290. A pin 482 fixed on the slide member 465 is engaged with an oblong hole 481 made in the film format change-over lever 479.

In the film format change-over apparatus 462, when the change-over lever 479 is changed over to a position H for the S-8 film as shown by the dot-dash line, a film contact surface 483 of the film side guide 332 is positioned at a S-8 film regulation position h. The slide member 465 is located at the lower position. The pins 463 of the film side guide 332 contact with the upper steps 466 of the cut-out portions 469. The steel balls 475 are fitted to the upper positioning holes 476a of the slide member 465 to position the latter at the lower position.

When the R-8 film 460 is used in the telecine projector 101, the change-over lever is rotated to another position G for the R-8 film as shown by the solid line, in the clockwise direction. The slide member 465 is slided upward to the upper position as shown by the solid line FIG. 61 through the oblong hole 481 and the pin 482 fixed on the slide member 465. The steel balls 475 click into the lower positioning holes 476b of the slide member 465 to position the latter at the upper position. With the upward slide of the slide member 465, the pins 463 inserted through the oblong holes 464 are pushed leftward (FIG. 61) by the wire springs 477. The pins 463 are slided from the upper steps 466 to the lower steps 467 through the slants 468. Thus, the film side guide 332 is moved leftward (FIG. 61) to the other position. The displacement of the film side guide 332 corresponds to the distance (about 0.5 mm) between the upper steps 466 and the lower steps 467 in the horizontal direction. Thus, the film contact surface 483 of the film side guide 332 is positioned at a R-8 film regulation position g.

As above described, the film 460 or 461 is pressed to the film contact surface 483 of the film-side guide 332 by the film side stoppers 333.

FIG. 63 to FIG. 68 show one modification of the film advancing apparatus which can be effectively employed in the telecine projector 101, and by which the film 109 can be advanced not only downward, but also upward.

A pair of shuttles 492 and 493 is arranged in this modification. Fingers 494 and 495, and iron members 496 and 497 are formed in one end portions of the shuttles 492 and 493, and in another end portions of the shuttles 492 and 493. The shuttles 492 and 493 are supported by support shafts 499 and 498 aligned with each other, so as to be rotatable round the support shafts 499 and 498, and to be slidable in the axial direction of the support shafts 499 and 498, respectively.

The lower shuttle 492 is designed for the downward advance of the film (FWD running), while the upper shuttle 493 is designed for the upward advance of the film (Reverse running). Accordingly, the top ends of the pair of the fingers 494 of the shuttle 492 are inclined downward toward the film 109, while the top ends of the pair of the fingers 495 are inclined upward toward the film 109.

A pair of electromagnets 501 and 502 is arranged adjacent to the iron members 496 and 497 to magnetically attract the latter. Leaf springs 503 and 504 are arranged adjacent to the shuttles 492 and 493 to return the latter to the original positions with the deenergization of the electromagnets 501 and 502. Stopper members 505a and 505b are fixed on both surfaces of the shuttles 492 and 493 to regulate the rotation of the latter. A guide member 506 for the stopper member 505b is arranged adjacent to the stopper member 505b.

The shuttles 492 and 493 are faced to each other. Oblong holes 507 and 508 registered with each other are formed in central portions of the shuttles 492 and 493 for engaging with crank. A crank 510 for advancing the film, attached to the top end of the motor shaft 291 is engaged with the oblong hole 507 of the shuttle 492 for the downward advance of the film. The motor shaft 291 is supported by a bearing 511. The shutter plate 294 is fixed to the top end of the motor shaft 291.

A crank shaft 513 is combined through a bearing 512 with the aperture plate 290, substantially in alignment with the motor shaft 291. The bearing 512 supporting the crank shaft 513 can be finely adjusted in position.

Another crank 514 fixed to the top end of the crank shaft 513 is engaged with the oblong hole 508 of the shuttle 493 for the upward advance of the film. The bearing 512 is fitted into an oblong hole 515 made in the aperture plate 290. An adjust screw 516 screwed to the aperture plate 290 contacts with the upper surface of the bearing 512 which is urged at the lower surface by a compression spring 517. The position of the crank shaft 513 can be finely adjusted in the vertical direction together with the bearing 512, by the adjust screw 516 in cooperation with the compression spring 517. The distance between the fingers 494 and 495 of the shuttles 492 and 493 can be finely adjusted with the adjustment of the crank shaft 513. Crank pins 518 and 519 fixed in the cranks 510 and 514 are inserted into holes of bearings 520 and 521, to about half of the lengths of the holes of the bearings 520 and 521, respectively. A ball 524 is fitted into recesses 522 and 523 faced to each other, and defined by the holes of the bearings 520 and 521, and the crank pins 518. The diameter of the holes of the bearings 520 and 521, namely the inner diameter of the bearings 520 and 521 are slightly larger than the diameter of the ball 524. The position of the crank shaft 513 can be finely adjusted in the vertical direction, since there is some clearance between the ball 524 and the bearings 520 and 521. The ball 524 may be made of steel or of synthetic resin such as Nylon (polyamid). In order to make little noise and vibration, the ball 524 is preferably made of synthetic resin. The eccentricities of the cranks 510 and 514 to the motor shaft 291 and the crank shaft 513 are equal to each other. The fingers 494 and 495 are inserted through a common slit 525 made in the aperture plate 290.

Next, operation of the above-described film advancing apparatus 491 will be described.

The one crank 510 is eccentrically rotated with the rotation of the motor shaft 291. The eccentric rotation of the crank 510 is transmitted through the ball 524 to the other crank 514. The other crank 514 is eccentrically rotated. Accordingly, the shuttles 492 and 493 are simultaneously reciprocated upward and downward along the supporting shafts 498 and 499 by the cranks 510 and 514.

When the film 109 is advanced downward (FWD running), the one electromagnet 501 is energized at the predetermined timed intervals. The shuttle 492 for the forward advance is reciprocated upward and downward, while intermittently rotated back and forth to project the fingers 494 from the aperture plate 290. The fingers 494 move in loop $C_1$ shown in FIG. 64. The fingers 494 are intermittently engaged with the perforation of the film 109 to advance the film forward. On the other hand, the shuttle 493 for the backward advance of the film is merely reciprocated upward and downward.

When the film 109 is advanced upward (Reverse running), the other electromagnet 502 is energized at the predetermined timed intervals to rotate the shuttle 493 for the backward advance of the film 109. The electromagnet 502 is energized at the time when the shuttle 493 reaches the lower position, and deenergized at the time when the shuttle 493 reaches the upper position. The fingers 495 move in loop $C_2$ shown in FIG. 64. The fingers 495 are intermittently engaged with the perforations of the film 109 to advance the film backward. On the other hand, the shuttle 493 for the forward advance of the film is merely reciprocated upward and downward.

Figure 67:
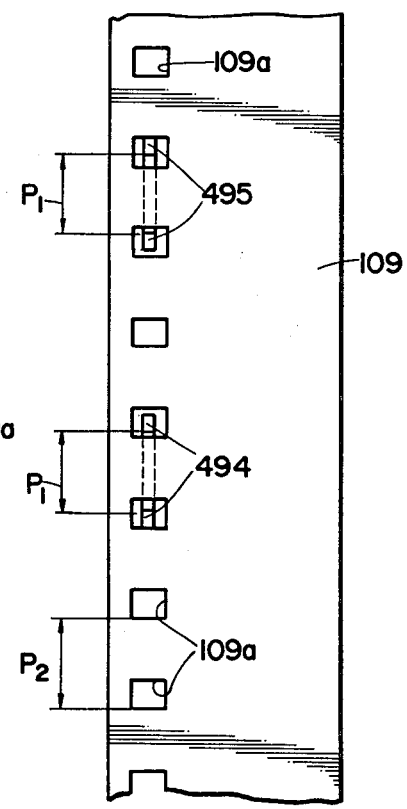
FIG. 67 is a front view illustrating the relationship between the film and a finger for advancing the film.

As shown in FIG. 67, the fingers 494 or 495 are engaged with the two adjacent perforations 109a of the film 109 in the forward advance of the film or in the backward advance of the film.

The distance $P_1$ of the fingers 494 and 495 is designed to be slightly smaller than the pitch $P_2$ of the perforations 109a of the film 109. One of the fingers 494 or 495 contacts with one edge of the perforation 109a of the film 109 to advance the film 109 forward or backward. Another of the fingers 494 or 495 contacts occasionally with one edge of the damaged or deformed perforation 109a of the film 109 to advance the film 109 forward or backward.

Figure 68:
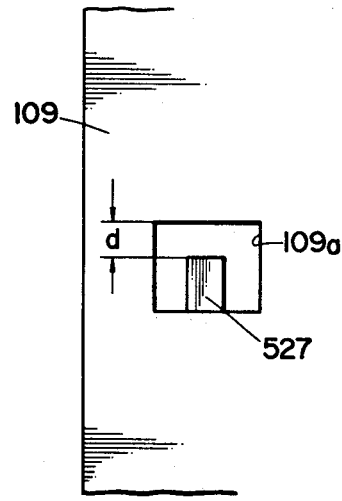
FIG. 68 is an enlarged front view illustrating the relationship between the film and finger in a conventional telecine projector.

As shown in FIG. 68, there is a clearance d between a rear edge of the perforation 109 of the advanced film 109 and a finger 527 in a conventional telecine projector. Accordingly, when the film 109 is changed over from the forward advance mode to the backward advance mode, the picture or frame 109b of the film 109 is not registered with the aperture 289, but deflected from the aperture 289.

However, in the film advancing apparatus 491, the position of the crank shaft 513, and therefore the distance between the top and bottom of the vertical distance travelled by pairs of fingers 494 and 495 can be finely adjusted by means of the adjust screw 516. The clearance d is altered between a front edge of the perforation 109a of the film 109 to be advanced, and the finger. Accordingly, even when the film 109 is changed over from the forward advance mode to the backward advance mode, or from the backward advance mode to the forward advance mode, the picture or frame 109b of the film 109 is not deflected from the aperture 289, but registered with the aperture 289.

Since the shuttles 492 and 493 are reciprocated through the cranks by the common motor shaft, the film 109 is not damaged with the fingers 494 and 495 engaged with the perforations 109a of the film 109, even when both of electromagnets 501 and 502 are erroneously energized at the same time to rotate the shuttles 492 and 493.

Although one illustrative embodiment of the invention has been described in detail herein with reference to the accompanying drawings, it is to be understood that the invention is not limited to this precise embodiment, and that various changes and modifications can be effected therein by one skilled in the art without departing from the scope and spirit of the invention as defined in the appended claims.

What is claimed is:

1. A telecine projector for motion picture film capable of being set into a forward mode and a rewind mode comprising film supply means and take-up means between which a film running path is formed;

film constant-speed drive means for advancing said film at an arbitrary predetermined constant speed;

shutter means for permitting illumination of said film intermittently at a predetermined constant rate;

intermittent film advancing means operatively linked to said shutter means for advancing the film past said shutter means during the intervals between intermittent periods of illumination;

film slack detecting means for detecting slack in a loop of film formed between said intermittent film advancing means and said film constant-speed drive means;

control means selectively enabling and disabling said intermittent film advancing means depending upon whether said slack in the loop of film exceeds a predetermined amount;

first and second sprocket means engaged with said film and rotated with the running of said film said first sprocket means being interposed in said film running path between said film supply means and said intermittent film advancing means, and said second sprocket means being interposed in said film running path between said film constant speed drive means and said film take-up means;

slipless transmission means interconnecting said first and second sprocket means to assure that film is fed to said film take-up means and drawn from said film supply means at the same rate;

frictional drive means coupled with said slipless transmission means for aiding the latter in the rotation of said sprocket means in the sense to compensate for variations in forces exerted on the film by said film supply means and take-up means in the course of the running of the film between said film supply means and take-up means;

urgent stop switch means actuable by the film at a location in said film running path between said supply means and said intermittent film advancing means for disabling said intermittent film advancing means without affecting the operation of the film constant-speed drive means whenever tension in the film between said supply means and said intermittent film advancing means exceeds a predetermined amount; and film guide means between said intermittent film advancing means and said film slack detecting means to assist in forming said loop so as to prevent an irregularity in said film from causing misoperation of said film slack detecting means;

said intermittent film advancing means including a shuttle movable into the plane of said film for engaging apertures in said film and movable parallel to said film for advancing said film, said shuttle having a pair of fingers for advancing said film, said shuttle having a pair of fingers engageable with consecutive apertures in said film, in which the spacing between said fingers is smaller than the pitch of said apertures in said film by an amount sufficient to assure that said shuttle provides accurate registration of a sequence of frames of said film in respect to said shutter means despite the occurrence of damaged or deformed apertures therein.

2. In a telecine projector for motion picture film comprising film supply means and take-up means between which a film running path is formed, film constant-speed drive means for advancing said f-lm at an arbitrary predetermined constant speed, shutter means for permitting illumination of said film intermittently at a predetermined constant rate, intermittent film advancing means operatively linked to said shutter means for advancing the film past said shutter means during the intervals between intermittent periods of illumination, film slack detecting means for detecting slack in a loop of film formed between said intermittent film advancing means and said film constant-speed drive means, control means selectively enabling and disabling said intermittent film advancing means depending upon whether said slack in said loop of film exceeds a predetermined amount, and first and second sprocket means engaged with said film and rotated with the running of said film, said first sprocket means being interposed in said film running path between said film supply means and said intermittent film advancing means, said second sprocket means being interposed in said film running path between said film constant-speed drive means and said film take-up means; the projector further comprising slipless transmission means interconnecting said first and second sprocket means to assure that film is fed to said film take-up means and drawn from said film supply means at the same rate, and frictional drive means coupled with said slipless transmission means for aiding the latter in the rotation of said sprocket means in the sense to compensate for variations in the force exerted on the film by said film supply means and take-up means in the course of the running of the film between said film supply means and said film take-up means.

3. A telecine projector for motion picture film comprising film supply means and take-up means;

film constant-speed drive means for advancing said film at an arbitrary predetermined constant speed;

shutter means for permitting intermittent illumination of said film at a predetermined constant rate;

intermittent film advancing means operatively linked to said shutter means for advancing the film past said shutter means during the intervals between intermittent periods of illumination;

film slack detecting means for detecting slack in a loop of film formed between said film constant-speed drive means and said intermittent film advancing means;

control means selectively enabling and disabling said intermittent film advancing means depending upon whether said slack in said loop of film exceeds a predetermined amount; and film guide means between said intermittent film advancing means and said film slack detecting means to assist in forming said loop so as to prevent an irregularity in said film from causing misoperation of said slack detecting means, wherein said film guide means includes an arcuate guide member integral with said intermittent film advancing means.

4. A telecine projector according to claim 3, wherein said guide member forms an inclination angle of between 20 and 45 degrees in said film loop with respect to the film path passing through said intermittent film advancing means.

5. A telecine projector according to claim 4, wherein said inclination angle is approximately 30 degrees.

6. A telecine projector according to claim 3, wherein said film guide means includes a guide roller at the portion of said guide member remote from said intermittent film advancing means for preventing damage to the film guide member.

7. A telecine projector for motion picture film including film supply and take-up means, film constant speed drive means for running said film at a constant arbitrarily predetermined speed, film advancing means for intermittently advancing said film, a light source, shutter means for intercepting light from said light source, drive means for driving said shutter means in synchronization with a television synchronizing signal, and film slack detecting means for detecting slack in said film between said film advancing means and said film constant speed drive means;

means to cause said film advancing means to advance said film upon each said television synchronizing signal so long as said film slack detecting means detects less than a predetermined slack in the film;

first and second sprockets engaged with said film and rotated with the running of said film, said first sprocket being arranged in the path of the film between said film supply means and said film advancing means, said second sprocket being arranged in the path of the film between said film constant speed drive means and said film take-up means, and slipless transmission means interconnecting said sprockets to assure that film is drawn from said film supply means and fed to said film take-up means at the same rate; and further including frictional drive means for assisting said first sprocket in rotating and compensating for variations in forces exerted on the film by said supply means and take-up means in the course of the running of the film between said film supply means and take-up means.

* * * * *